US011990762B2

(12) United States Patent
Elshafie et al.

(10) Patent No.: US 11,990,762 B2
(45) Date of Patent: May 21, 2024

(54) CHANNEL REPORTING FOR ENERGY HARVESTING AT A DEVICE

(71) Applicant: QUALCOMM Incorporated, San Diego, CA (US)

(72) Inventors: Ahmed Elshafie, San Diego, CA (US); Sony Akkarakaran, Poway, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/331,458

(22) Filed: May 26, 2021

(65) Prior Publication Data

US 2022/0385104 A1    Dec. 1, 2022

(51) Int. Cl.
*H02J 50/00* (2016.01)
*H02J 50/20* (2016.01)
(Continued)

(52) U.S. Cl.
CPC ............ *H02J 50/001* (2020.01); *H02J 50/20* (2016.02); *H02J 50/40* (2016.02); *H04B 17/309* (2015.01); *H04L 1/0009* (2013.01)

(58) Field of Classification Search
CPC ........ H02J 50/001; H02J 50/80; H04B 17/309
See application file for complete search history.

(56) References Cited

U.S. PATENT DOCUMENTS

| | | | |
|---|---|---|---|
| 2012/0213261 A1* | 8/2012 | Sayana | H04L 5/0094 375/224 |
| 2018/0085593 A1 | 3/2018 | Fayram et al. | |

(Continued)

FOREIGN PATENT DOCUMENTS

| | | |
|---|---|---|
| EP | 2930873 A1 | 10/2015 |
| WO | WO-2020236665 A1 | 11/2020 |

OTHER PUBLICATIONS

Gautam S., et al., "Wireless Multi-group Multicast Precoding with Selective RF Energy Harvesting", 2019 27th European Signal Processing Conference (EUSIPCO), EURASIP, Sep. 2, 2019, pp. 1-5, XP033660182, Section IV.
Hu L., et al., "Dynamic Power Splitting Policies for AF Relay Networks with Wireless Energy Harvesting", arxiv.org, Cornell University Library, 201 Olin Library Cornell University Ithaca, NY 14853, Mar. 23, 2015, 5 Pages, XP081332930, Sections I and II.

(Continued)

*Primary Examiner* — Hal Kaplan
*Assistant Examiner* — Joseph N Inge
(74) *Attorney, Agent, or Firm* — Holland & Hart LLP/QUALCOMM Incorporated

(57) ABSTRACT

Methods, systems, and devices for wireless communications are described. A device may include an energy harvesting circuit configured to convert radio frequency energy associated with signals detected by the device to direct current (DC) energy for storage at the device. The device may additionally include a signal decoding circuit configured to decode the signals detected by the device to identify transmissions from other devices in the wireless communications system. The device may rely on power splitting or time switching to direct radio frequency energy to both the energy harvesting circuit and signal decoding circuit of the device. The device may employ various methods for channel estimation, channel reporting, and communications with another device based on utilizing power splitting or time switching to both perform energy harvesting and signal decoding.

27 Claims, 25 Drawing Sheets

(51) Int. Cl.
  *H02J 50/40* (2016.01)
  *H04B 17/309* (2015.01)
  *H04L 1/00* (2006.01)

(56) References Cited

U.S. PATENT DOCUMENTS

| | | | |
|---|---|---|---|
| 2020/0106308 A1* | 4/2020 | Kim | H04W 52/24 |
| 2020/0169122 A1* | 5/2020 | Prakriya | H01M 10/46 |
| 2020/0359375 A1 | 11/2020 | Hwang et al. | |
| 2021/0067991 A1 | 3/2021 | Zhu et al. | |
| 2021/0119726 A1* | 4/2021 | Kim | G06N 3/08 |
| 2021/0126488 A1* | 4/2021 | Kim | H02J 50/001 |
| 2022/0070836 A1* | 3/2022 | Balasubramanian | H04J 11/004 |
| 2022/0225402 A1* | 7/2022 | Elkotby | H04W 74/004 |
| 2022/0248432 A1* | 8/2022 | Balasubramanian | H04L 5/0051 |
| 2022/0385109 A1 | 12/2022 | Elshafie | |

OTHER PUBLICATIONS

International Search Report and Written Opinion—PCT/US2022/027401—ISA/EPO—dated Nov. 15, 2022 (2102026WO).

Wang F., et al., "Relay and Power Splitting Ratio Selection for Cooperative Networks with Energy Harvesting" 2015 IEEE 21st International Conference on Parallel and Distributed Systems (ICPADS), IEEE, Dec. 14, 2015, pp. 52-59, 8 Pages, XP032850816, Section II.A.

Kang J-M., et al., "Dynamic Power Splitting for SWIPT With Nonlinear Energy Harvesting in Ergodic Fading Channel", IEEE Internet of Things Journal, IEEE, USA, vol. 7, No. 6, Mar. 11, 2020, pp. 5648-5665, XP011793078, DOI: 10.1109/JIOT.2020.2980328 [retrieved on Jun. 12, 2020] p. 5651.

Partial International Search Report—PCT/US2022/027401—ISA/EPO—dated Aug. 26, 2022 (2102026WO).

Wang F., et al., "Relay Selection and Power Allocation for Cooperative Communication Networks With Energy Harvesting", IEEE Systems Journal, IEEE, US, vol. 12, No. 1, Mar. 1, 2018, pp. 735-746, XP011679977, ISSN: 1932-8184, DOI: 10.1109/JSYST.2016.2524634 [retrieved on Mar. 23, 2018] pp. 736, 737 p. 738, left-hand column, Section IV. A, p. 741.

\* cited by examiner

CHANNEL REPORTING FOR ENERGY HARVESTING AT A DEVICE

INTRODUCTION

The following relates to wireless communications, including managing energy harvesting at a device.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a first device is described. The method may include receiving, from a second device, a first indication of multiple power ratios associated with energy harvesting at the first device. The method may further include receiving a reference signal from the second device based on receiving the first indication of the multiple power ratios, and transmitting, to the second device, a second indication of a channel quality metric associated with the reference signal for at least one of the multiple power ratios.

An apparatus for wireless communication at a first device is described. The apparatus may include a processor and memory coupled to the processor. The processor and memory may be configured to receive, from a second device, a first indication of multiple power ratios associated with energy harvesting at the first device, receive a reference signal from the second device based on receiving the first indication of the multiple power ratios, and transmit, to the second device, a second indication of a channel quality metric associated with the reference signal for at least one of the multiple power ratios.

Another apparatus for wireless communication at a first device is described. The apparatus may include means for receiving, from a second device, a first indication of multiple power ratios associated with energy harvesting at the first device, means for receiving a reference signal from the second device based on receiving the first indication of the multiple power ratios, and means for transmitting, to the second device, a second indication of a channel quality metric associated with the reference signal for at least one of the multiple power ratios.

A non-transitory computer-readable medium storing code for wireless communication at a first device is described. The code may include instructions executable by a processor to receive, from a second device, a first indication of multiple power ratios associated with energy harvesting at the first device, receive a reference signal from the second device based on receiving the first indication of the multiple power ratios, and transmit, to the second device, a second indication of a channel quality metric associated with the reference signal for at least one of the multiple power ratios.

Some examples of the method, apparatuses, and non-transitory computer-readable medium described herein may further include operations, features, means, or instructions for transmitting, to the second device, a third indication of a set of power ratios associated with the energy harvesting, the receiving the first indication of the multiple power ratios based on transmitting the third indication.

Some examples of the method, apparatuses, and non-transitory computer-readable medium described herein may further include operations, features, means, or instructions for receiving, from the second device, a third indication of multiple sets of power ratios associated with the energy harvesting, the receiving the first indication of the multiple power ratios including receiving the first indication of one set of the multiple sets of power ratios, the one set including the multiple power ratios.

Some examples of the method, apparatuses, and non-transitory computer-readable medium described herein may further include operations, features, means, or instructions for receiving the third indication via a media access control-control element (MAC-CE), radio resource control (RRC) signaling, or a combination thereof.

Some examples of the method, apparatuses, and non-transitory computer-readable medium described herein may further include operations, features, means, or instructions for receiving the first indication via a RRC signaling, a MAC-CE, control information, or a combination thereof.

Some examples of the method, apparatuses, and non-transitory computer-readable medium described herein may further include operations, features, means, or instructions for receiving the first indication of resources corresponding to the reference signal, the multiple power ratios associated with the resources corresponding to the reference signal.

Some examples of the method, apparatuses, and non-transitory computer-readable medium described herein may further include operations, features, means, or instructions for transmitting, for each of the multiple power ratios, a first resource indicator associated with first resources of the reference signal having a first channel quality metric that may be higher than channel quality metrics associated with remaining resources of the reference signal, a second resource indicator associated with second resources of the reference signal associated with an energy accumulation that may be greater than remaining resources of the reference signal, or a combination thereof, where the first channel quality metric or the second channel quality metric may be the channel quality metric.

Some examples of the method, apparatuses, and non-transitory computer-readable medium described herein may further include operations, features, means, or instructions for transmitting the second indication based on the channel quality metric for the at least one of the multiple power ratios being higher than channel quality metrics for the remaining of the multiple power ratios.

In some examples of the method, apparatuses, and non-transitory computer-readable medium described herein, the at least one of the multiple power ratios includes a first power ratio and the first power ratio may be associated with the channel quality metric that may be higher than channel quality metrics associated with remaining power ratios of the multiple power ratios associated with one or more remaining of the multiple power ratios, an energy harvesting that may be greater than the remaining power ratios, or a combination thereof.

In some examples of the method, apparatuses, and non-transitory computer-readable medium described herein, each of the multiple power ratios indicates a first portion of a radio frequency power associated with received signals directed to an energy harvesting circuit, a second portion of the radio frequency power associated with the received signals directed to a signal decoding circuit of the first device, or both.

A method for wireless communication at a first device is described. The method may include receiving, from a second device, an indication associated with a precoding matrix indicator (PMI) for a channel state information (CSI) report that is based on one or more of an energy accumulation associated with the PMI or a signal quality associated with the PMI, receiving, from the second device, a reference signal for the CSI report, determining, in accordance with the indication, the PMI based on one or more of the energy accumulation associated with applying the PMI to the reference signal and the signal quality associated with applying the PMI to the reference signal, and transmitting, to the second device, the CSI report indicating the PMI based on the determining.

An apparatus for wireless communication at a first device is described. The apparatus may include a processor and memory coupled to the processor. The processor and memory may be configured to receive, from a second device, an indication associated with a PMI for a CSI report that is based on one or more of an energy accumulation associated with the PMI or a signal quality associated with the PMI, receive, from the second device, a reference signal for the CSI report, determine, in accordance with the indication, the PMI based on one or more of the energy accumulation associated with applying the PMI to the reference signal and the signal quality associated with applying the PMI to the reference signal, and transmit, to the second device, the CSI report indicating the PMI based on the determining.

Another apparatus for wireless communication at a first device is described. The apparatus may include means for receiving, from a second device, an indication associated with a PMI for a CSI report that is based on one or more of an energy accumulation associated with the PMI or a signal quality associated with the PMI, means for receiving, from the second device, a reference signal for the CSI report, means for determining, in accordance with the indication, the PMI based on one or more of the energy accumulation associated with applying the PMI to the reference signal and the signal quality associated with applying the PMI to the reference signal, and means for transmitting, to the second device, the CSI report indicating the PMI based on the determining.

A non-transitory computer-readable medium storing code for wireless communication at a first device is described. The code may include instructions executable by a processor to receive, from a second device, an indication associated with a PMI for a CSI report that is based on one or more of an energy accumulation associated with the PMI or a signal quality associated with the PMI, receive, from the second device, a reference signal for the CSI report, determine, in accordance with the indication, the PMI based on one or more of the energy accumulation associated with applying the PMI to the reference signal and the signal quality associated with applying the PMI to the reference signal, and transmit, to the second device, the CSI report indicating the PMI based on the determining.

Some examples of the method, apparatuses, and non-transitory computer-readable medium described herein may further include operations, features, means, or instructions for receiving a MAC-CE or RRC signaling indicating that the PMI for the CSI report may be based on the energy accumulation associated with the PMI, the signal quality associated with the PMI, or both.

Some examples of the method, apparatuses, and non-transitory computer-readable medium described herein may further include operations, features, means, or instructions for receiving the indication of resources corresponding to the reference signal, the PMI for the CSI report being based on the energy accumulation associated with the PMI, the signal quality associated with the PMI, or both based on the resources corresponding to the reference signal.

In some examples of the method, apparatuses, and non-transitory computer-readable medium described herein, the indication associated with the PMI indicates that the PMI for the CSI report may be based on the energy accumulation associated with the PMI and determining the PMI includes determining the PMI based on the energy accumulation associated with applying the PMI to the reference signal.

In some examples of the method, apparatuses, and non-transitory computer-readable medium described herein, the indication associated with the PMI indicates that the PMI for the CSI report may be based on the signal quality associated with the PMI and determining the PMI includes determining the PMI based on the signal quality associated with applying the PMI to the reference signal.

Some examples of the method, apparatuses, and non-transitory computer-readable medium described herein may further include operations, features, means, or instructions for determining a first PMI based on the energy accumulation associated with applying the first PMI to the reference signal and determining a second PMI based on the signal quality associated with applying the PMI to the reference signal, the CSI report indicating the first PMI, the second PMI, or both.

A method for wireless communication at a first device is described. The method may include transmitting, to a second device, a capability of the first device to update a power ratio associated with energy harvesting at the first device, receiving, from the second device, a signal having a radio frequency power that is based on the capability of the first device to update the power ratio associated with the energy harvesting, and converting a portion of the radio frequency power according to an updated power ratio of the energy harvesting to direct current (DC) power.

An apparatus for wireless communication at a first device is described. The apparatus may include a processor and memory coupled to the processor. The processor and memory may be configured to transmit, to a second device, a capability of the first device to update a power ratio associated with energy harvesting at the first device, receive, from the second device, a signal having a radio frequency power that is based on the capability of the first device to update the power ratio associated with the energy harvesting, and converting a portion of the radio frequency power accord to an updated power ratio of the energy harvesting to DC power.

Another apparatus for wireless communication at a first device is described. The apparatus may include means for transmitting, to a second device, a capability of the first device to update a power ratio associated with energy harvesting at the first device, means for receiving, from the second device, a signal having a radio frequency power that is based on the capability of the first device to update the power ratio associated with the energy harvesting, and means for converting a portion of the radio frequency power according to an updated power ratio of the energy harvesting to DC power.

A non-transitory computer-readable medium storing code for wireless communication at a first device is described. The code may include instructions executable by a processor to transmit, to a second device, a capability of the first device to update a power ratio associated with energy harvesting at the first device, receive, from the second device, a signal having a radio frequency power that is based on the capability of the first device to update the power ratio associated with the energy harvesting, and converting a portion of the radio frequency power accord to an updated power ratio of the energy harvesting to DC power.

Some examples of the method, apparatuses, and non-transitory computer-readable medium described herein may further include operations, features, means, or instructions for receiving, from the second device based on the transmitting, an indication to increase the power ratio associated with the energy harvesting to the updated power ratio, the receiving the signal based on receiving the indication.

In some examples of the method, apparatuses, and non-transitory computer-readable medium described herein, increasing, based on the transmitting, the power ratio associated with the energy harvesting to the updated power ratio, the receiving the signal having the radio frequency power based on the increasing and decreasing the updated power ratio of the energy harvesting to a decreased power ratio based at least in part receiving at least a portion of the signal.

Some examples of the method, apparatuses, and non-transitory computer-readable medium described herein may further include operations, features, means, or instructions for receiving a first portion of the signal via first resources associated with a cyclic prefix while the energy harvesting circuit may be associated with the updated power ratio and receiving a second portion of the signal via second resources associated with data while the energy harvesting circuit may be associated with the decreased power ratio.

Some examples of the method, apparatuses, and non-transitory computer-readable medium described herein may further include operations, features, means, or instructions for receiving a first portion of the signal corresponding to a synchronization signal while the energy harvesting circuit may be associated with the updated power ratio and receiving a second portion of the signal corresponding to a control channel while the energy harvesting circuit may be associated with the decreased power ratio.

In some examples of the method, apparatuses, and non-transitory computer-readable medium described herein, the capability of the first device to update the power ratio includes a first indication of a time associated with updating the power ratio associated with the energy harvesting, a second indication of a set of possible power ratios associated with the energy harvesting, or a combination thereof.

In some examples of the method, apparatuses, and non-transitory computer-readable medium described herein, the signal includes a synchronization signal, a tracking reference signal (TRS), a CSI-reference signal (CSI-RS), a demodulation reference signal (DMRS), or a combination thereof.

In some examples of the method, apparatuses, and non-transitory computer-readable medium described herein, the updated power ratio indicates the portion of the radio frequency power directed to an energy harvesting circuit, a second portion of the radio frequency power directed to a signal decoding circuit of the first device, or both.

A method for wireless communication at a first device is described. The method may include receiving, from a second device, a capability of the second device to update a power ratio associated with energy harvesting at the second device by converting radio frequency power to DC power and transmitting, to the second device, a signal having a radio frequency power that is based on the capability of the second device to update the power ratio associated with the energy harvesting.

An apparatus for wireless communication at a first device is described. The apparatus may include a processor and memory coupled to the processor. The processor and memory may be configured to receive, from a second device, a capability of the second device to update a power ratio associated with energy harvesting at the second device by converting radio frequency power to DC power and transmit, to the second device, a signal having a radio frequency power that is based on the capability of the second device to update the power ratio associated with the energy harvesting.

Another apparatus for wireless communication at a first device is described. The apparatus may include means for receiving, from a second device, a capability of the second device to update a power ratio associated with energy harvesting at the second device by converting radio frequency power to DC power and means for transmitting, to the second device, a signal having a radio frequency power that is based on the capability of the second device to update the power ratio associated with the energy harvesting.

A non-transitory computer-readable medium storing code for wireless communication at a first device is described. The code may include instructions executable by a processor to receive, from a second device, a capability of the second device to update a power ratio associated with energy harvesting at the second device by converting radio frequency power to DC power and transmit, to the second device, a signal having a radio frequency power that is based on the capability of the second device to update the power ratio associated with the energy harvesting.

Some examples of the method, apparatuses, and non-transitory computer-readable medium described herein may further include operations, features, means, or instructions for transmitting, to the second device based on the receiving, an indication to increase the power ratio associated with the energy harvesting to an updated power ratio, the transmitting the signal based on transmitting the indication.

Some examples of the method, apparatuses, and non-transitory computer-readable medium described herein may further include operations, features, means, or instructions for transmitting the indication includes transmitting the indication via RRC signaling, a MAC-CE, control information, or a combination thereof.

In some examples of the method, apparatuses, and non-transitory computer-readable medium described herein, the capability of the second device to update the power ratio includes a first indication of a time associated with updating the power ratio associated with the energy harvesting, a second indication of a set of possible power ratios associated with the energy harvesting, or a combination thereof.

Some examples of the method, apparatuses, and non-transitory computer-readable medium described herein may further include operations, features, means, or instructions for transmitting the signal via a set of synchronization beams, where a first transmission power of one or more synchronization beams from the set that may be associated with transmissions to the second device may be greater than a second transmission power of one or more remaining synchronization beams from the set.

In some examples of the method, apparatuses, and non-transitory computer-readable medium described herein, the signal includes a synchronization signal, a TRS, a CSI-RS, a DMRS, or a combination thereof.

DETAILED DESCRIPTION

Figure 1:
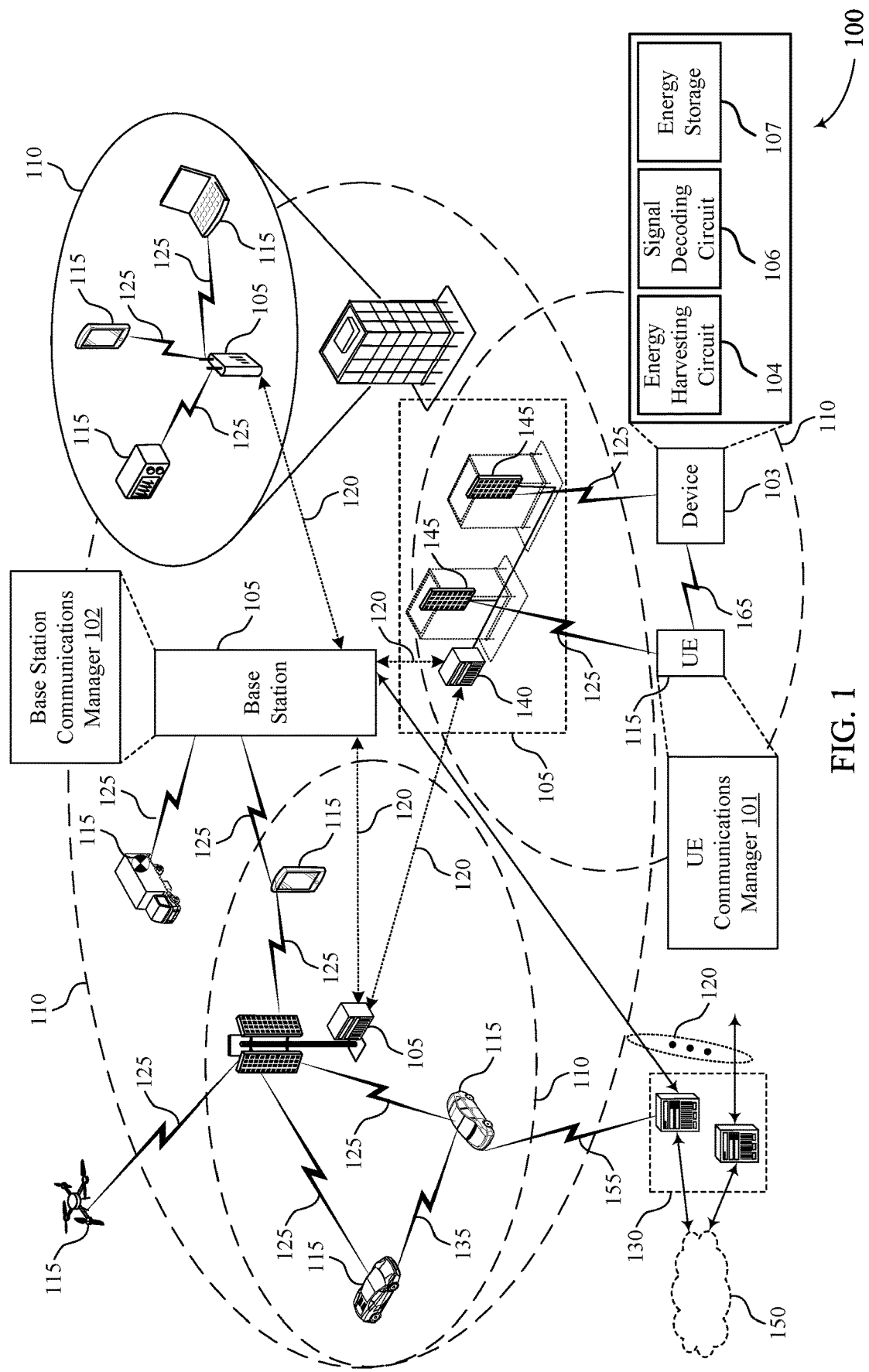
FIG. 1 illustrates an example of a wireless communications system that supports channel reporting for energy harvesting at a device in accordance with one or more aspects of the present disclosure.

In some cases, wireless communication systems may support techniques for radio frequency energy harvesting. For example, a wireless communications system may include various devices, such as a UE, a base station, a wearable device, or other devices. In some cases, a first device (e.g., a UE, a base station, any sidelink enabled device) may be configured to perform energy harvesting by converting received radio frequency power associated with wireless signals received from a second device (e.g., a UE, a base station, any sidelink enabled device) to DC power. In some examples, the first device may be configured to convert received radio frequency power to DC power and store the converted DC power at the first device. For example, the second device may transmit signals with a determined radio frequency power to the first device. The first device may include a signal decoding circuit to receive and decode signals from the second device as well as an energy harvesting circuit to convert radio frequency power to DC power. In some examples, the energy harvesting circuit may perform (e.g., take inputs and produce outputs) according to one or more characteristics (e.g., a threshold power parameter, an energy conversion efficiency factor, power levels, or the like).

In some examples, a device may rely on power-splitting to harvest energy and decode signals. When the device detects a signal having a radio frequency power, the device may utilize a power splitter to direct a first portion of the radio frequency power to the energy harvesting circuit and a second portion of the radio frequency power to the signal decoding circuit. In some other examples, a device may rely on time-splitting to harvest energy and decode signals. Here, the device may utilize a time splitter to direct a full amount of detected radio frequency power to the energy harvesting circuit for a first time and direct a full amount of detected radio frequency to the signal decoding circuit for a second time.

A device that performs energy harvesting using power-splitting techniques may direct portions of the detected radio frequency power to the energy harvesting circuit and signal decoding circuit according to a power ratio. In some cases, the device may have the capability to operate the energy harvesting circuit according to multiple possible power ratios. Operating the energy harvesting circuit according to different power ratios may impact both an ability of the device to successfully receive and decode signals and an ability of the device to harvest energy from received signals. To determine an impact of each of the multiple possible power ratios on both energy harvesting and signal decoding the device may perform channel estimations based on each of the multiple possible power ratios. The device may additionally perform CSI reporting based on the multiple possible power ratios. In some instances, performing channel estimations based on each of the multiple possible power ratios may improve a reliability of communications at the device (e.g., when compared to a device that performs channel estimations using one of multiple possible power ratios).

Additionally, a device that performs energy harvesting using time-splitting techniques may determine a first PMI (e.g., precoder) for signal decoding and a second PMI (e.g., a different PMI) for energy harvesting. In some cases, the device may determine the PMI for signal decoding based on a signal quality of a received reference signal. For example, the device may determine a PMI such that applying the determined PMI results in a higher signal quality of the received reference signal (e.g., when compared to one or more other PMIs). Additionally, the device may determine the PMI for energy harvesting based on an accumulation of energy resulting from applying the determined PMI to the received reference signal. For example, the device may determine a PMI such that applying the determined PMI results in a higher level of energy harvested from the received reference signal (e.g., when compared to one or more other PMIs). In some cases, the device may determine the PMI based on signal decoding, energy harvesting, or both based on signaling received from another device. That is, the other device may indicate, to the device, whether to determine the PMI based on signal decoding, energy harvesting, or both. Additionally, the device may indicate (e.g., within a CSI report), whether the CSI report is based on a PMI associated with signal decoding, energy harvesting, or both. In some instances, determining a PMI for signal decoding and a PMI for energy harvesting may improve a reliability of communications at the device and an efficiency of energy harvesting at the device (e.g., when compared to a device that determines a single PMI).

In some instances, a device that is performing energy harvesting according to power-splitting techniques may have the capability to the power ratio associated with the energy harvesting circuit while communicating with another device in the wireless communications system. If the device has the capability to change the power ratio, the device may indicate this capability to another device. In some cases, the other device may adjust a transmission power used to transmit certain signals in response to receiving the indication of the capability of the device to adjust the power ratio. Additionally, the device that has the capability to adjust the power ratio associated with the energy harvesting circuit may adjust the power ratio when receiving signals that the device does not need to decode from the other device. Based on increasing the power ratio when receiving signals that the device does not decode and based on the other device increasing a transmission power associated with signals that the device does not decode, the device may harvest more energy when receiving signals that the device does not decode (e.g., when compared to a device that does not indicate a capability to adjust the power ratio).

Aspects of the disclosure are initially described in the context of a wireless communications system. Aspects of the disclosure are then described in the context of circuitry, a power diagram, energy harvesting schemes, wireless communications systems, resource configurations, and process flows. Aspects of the disclosure are further illustrated by and described with reference to apparatus diagrams, system diagrams, and flowcharts that relate to channel reporting for energy harvesting at a device.

FIG. 1 illustrates an example of a wireless communications system 100 that supports channel reporting for energy harvesting at a device in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The communication links 125 may be over a universal mobile telecommunications system (UMTS) air interface, which may be referred to as a Uu interface or Uu link. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. A UE 115 may also include or may be referred to as a wearable device (e.g., smartwatch or any other wearable device), a health monitoring device, an extended reality (XR) head mounted display (HMD) device, a sensor, a smart home appliance (e.g, smart thermostat, smart entry key), or other smart devices.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or DFT-S-OFDM). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). In some systems, the D2D communication link 135 may be an example of a communication channel, such as a sidelink communication channel. One or more UEs 115 utilizing D2D communications may be within the geographic coverage area 110 of a base station 105, where the one or more UEs 115 may be in communication with the base station 105 over a communication link 125 (e.g., Uu interface), and the UEs 115 may be in communication with each other via the D2D communication link 135 (e.g., sidelink communication channel). In some cases, a sidelink communication link as described herein may additionally or alternatively represent an example of a relay link 165, where the relay link 165 may be used to relay information (e.g., data, control information) from a first UE 115 to a second UE 115. In some cases, the relay link 165 may additionally or alternatively be an example of a communication link 135. In this case, the UEs 115 communicating via D2D communication link 135 may be connected to the network via the communication links 125 (e.g., Uu interface). In some examples, the base station 105 may control the sidelink discovery and communication resource allocation, and the network may utilize the Uu interface to support sidelink communication channel operation through sidelink communication channel authorization and provisioning.

Other UEs 115 in such a group may be outside the geographic coverage area 110 of a base station 105 or be otherwise unable to receive transmissions from a base station 105. In some examples, at least one UE 115 may be connected to the network via the base station 105 and communication link 125 (e.g., Uu interface). In this case, the UEs 115 out of coverage may communicate with an in coverage UE 115 via the D2D communication link 135 (e.g., sidelink communication channel), where the in coverage UE 115 may operate as a relay, thereby connecting the UEs 115 not in coverage, to the network. For example, in the case where a UE 115 may communicate with a base station 105, and the UE 115 communicates with wearable devices (e.g., smartwatch, health monitoring device, or other wearable devices) via a D2D communication link 135 (e.g, sidelink communication channel), or in the case where a UE 115 communicates with a base station 105 and the UE 115 communicates with an XR HMD via a D2D communication link 135. The Uu interface may support the operation of the sidelink communication channel through authorization and provisioning, or the sidelink communication channel provisioning information may be preconfigured.

In some examples, groups of the UEs 115 communicating via D2D communications may utilize a one-to-many (1:M) system in which each UE 115 transmits to every other UE 115 in the group. For example, in the case of a wireless mesh (e.g., UE to UE) relay, or where sensors, such as smart home appliances (e.g., smart thermostats, entry keys), communicate with each other. In some examples, a base station 105 facilitates the scheduling of resources for D2D communications. In other cases, D2D communications are carried out between the UEs 115 without the involvement of a base station 105. In this case, the UEs 115 may not be connected to the network, and therefore the sidelink communication channel between the UEs 115 may not operate with the support of the Uu interface. In some examples, sidelink communication channel provisioning information may be pre-configured for discovery and communication resource allocation.

The overall structure of a sidelink communication channel may differ from a Uu communication channel such as communication link 125. For example, a sidelink communication channel may be composed of multiple slots where the resource allocation in the time domain may be one slot. In some examples, every slot may have a number of symbols (e.g., 14 OFDM symbols or less). The minimum resource allocation unit for a sidelink communication channel in the frequency domain may be a sub-channel where each sub-channel may be composed of an amount of resource blocks (RBs) (e.g., up to 1 physical resource block (PRB)). In some examples, some slots may not be available for sidelink communication. In other examples, some slots may contain feedback resources.

The slot structure for a sidelink communication channel may differ depending on whether the sidelink communication channel is configured with or without feedback resources. In the case where the sidelink communication channel is configured without feedback resources, the first symbol of a slot may be repeated on the preceding symbol for automatic gain control (AGC) settling. A gap symbol may be present after a physical channel such as, a physical sidelink shared channel (PSSCH). The sub-channel size of a sidelink communication channel may be preconfigured to a number of PRBs (e.g., up to 100). The physical sidelink control channel (PSCCH) and PSSCH may be transmitted in the same slot.

In the case where a sidelink communication channel may be configured with feedback resources, where a UE 115 may send data to another device (e.g., a wearable device), and the wearable device returns an acknowledgement (ACK) or negative acknowledgement (NACK) over a physical sidelink feedback channel (PSFCH). The resources for a PSFCH may be configured with a period of slots (e.g., {0, 1, 2, 4}). An OFDM symbol may be dedicated to the PSFCH. The first PSFCH symbol may be a repetition of the second PSFCH symbol for AGC settling. A gap symbol may be placed after the PSFCH symbols.

There may be four physical sidelink channels defined for sidelink communication channels (e.g., PSCCH, PSSCH, PSFCH, physical sidelink broadcast channel (PSBCH)). Additionally, there may be sidelink reference signals (e.g., a DMRS for PSCCH, a DMRS for PSSCH, a DMRS for PSBCH, a CSI-RS, a sidelink-primary synchronization signal (S-PSS), a sidelink-secondary synchronization signal (S-SSS), a phase-tracking reference signal (PTRS) for FR2). In some cases, control signaling (e.g., RRC messages), may be preconfigured at a UE 115 for sidelink communication channels, or configured by a base station 105. Sidelink communications may occur in transmission or reception resource pools.

The sidelink communication channel may use sidelink control information (SCI). SCI may occur in two stages for forward compatibility. The first stage of control information (SCI-1) may be transmitted on PSCCH and may contain information for resource allocation and decoding the second stage of control information (SCI-2). SCI-2 may be transmitted on PSSCH and may contain information for decoding data that may be sent over the PSSCH. SCI-1 may be decodable by UEs 115. Additionally, SCI-2 may be decodable by a subset of UEs 115 (e.g., the subset of UEs 115 that have a capability to decode SCI-2). Both SCI-1 and SCI-2 may use a physical downlink control channel (PDCCH) polar code.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands (e.g., in the range of 300 megahertz (MHz) to 300 gigahertz (GHz)). In some cases, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a PMI or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the media access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The wireless communications system 100 may support various techniques for energy harvesting. For example, a device (e.g., a base station 105, a UE 115) may be equipped with an energy harvesting circuit that enables the device to convert radio frequency energy to DC energy (e.g., for storage at the device). In some cases, the device may be configured to both harvest radio frequency energy (e.g., using the energy harvesting circuit) and decode radio frequency transmissions (e.g., using a signal decoding circuit). Additionally, radio frequency sources (e.g., radio frequency transmissions) may provide controllable and relatively constant energy transfer over distances, where the energy harvested may be predictable and relatively stable over time. In some cases, radio frequency energy may be harvested according to a random, multipath, fading channel linear model, where the energy harvested at node j from a transmitting node i is given by Equation (1):

$$E_j = \eta P_i |g_{i \cdot j}|^2 T \quad (1)$$

In Equation 1, the amount of energy transmitted from node i may be $P_i$, $g_{i \cdot j}$ may be a complex number corresponding to a channel attenuation factor (e.g., representing path fading) that may depend on channel conditions such as channel quality, interference, or the like between the transmitting node i and the receiving node j, T may represent the time allocated for energy harvesting, and q may be the radio frequency to DC conversion efficiency of the energy harvesting circuit (e.g., q may be between 0 and 1). Thus, Equation 1 may represent the amount of energy accumulated over time in joules.

The wireless communications system 100 may include a device 103 that is configured to perform energy harvesting. That is, the device 103 may include an energy harvesting circuit 104 that has the capability to convert received radio frequency power to DC power. In some cases, the device 103 may then store the DC power (e.g., converted by the energy harvesting circuit 104 from radio frequency power) at an energy storage 107 (e.g., a battery) of the device 103.

In some cases, the device 103 (e.g., a base station 105, a UE 115) may perform energy harvesting using power-splitting techniques. Here, the device 103 may direct portions of the detected radio frequency power to an energy harvesting circuit 104 and a signal decoding circuit 106 according to a power ratio. In some cases, the device 103 may have the capability to operate the energy harvesting circuit 104 according to multiple possible power ratios. Here, operating the energy harvesting circuit according to different power ratios may impact both an ability of the device 103 to successfully receive and decode signals and an ability of the device 103 to harvest energy from received signals. To determine an impact of each of the multiple possible power ratios on both energy harvesting and signal decoding, the device 103 may perform channel estimations based on each of the multiple possible power ratios. The device 103 may additionally perform CSI reporting based on the multiple possible power ratios.

Additionally, a device 103 that performs energy harvesting using time-splitting techniques may determine a first PMI (e.g., precoder) for signal decoding and a second PMI (e.g., a different PMI) for energy harvesting. In some cases, the device 103 may determine the PMI for signal decoding based on a signal quality of a received reference signal. For example, the device 103 may determine a PMI such that applying the determined PMI results in a higher signal quality of the received reference signal (e.g., when compared to one or more other PMIs). Additionally, the device 103 may determine the PMI for energy harvesting based on an accumulation of energy resulting from applying the determined PMI to the received reference signal. For example, the device 103 may determine a PMI such that applying the determined PMI results in a higher level of energy harvested from the received reference signal (e.g., when compared to one or more other PMIs). In some cases, the device 103 may determine the PMI based on signal decoding, energy harvesting, or both based on signaling received from another device (e.g., another base station 105, another UE 115). That is, the other device may indicate, to the device 103, whether to determine the PMI based on signal decoding, energy harvesting, or both. Additionally, the device 103 may indicate (e.g., within a CSI report), whether the CSI report is based on a PMI associated with signal decoding, energy harvesting, or both.

In some instances, a device 103 that is performing energy harvesting according to power-splitting techniques may have the capability to adjust the power ratio associated with the energy harvesting circuit while communicating with another device (e.g., another base station 105, another UE 115) in the wireless communications system 100. If the device 103 has the capability to change the power ratio, the device 103 may indicate this capability another device. In some cases, the other device may adjust a transmission power used to transmit certain signals in response to receiving the indication of the capability of the device 103 to adjust the power ratio. Additionally, the device 103 that has the capability to adjust the power ratio associated with the energy harvesting circuit 104 may adjust the power ratio when receiving these certain signals (e.g., signals that the device 103 does not need to decode) from the other device. Based on increasing the power ratio when receiving signals that the device does not decode and based on the other device increasing a transmission power associated with signals that the device does not decode, the device 103 may harvest more energy when receiving signals that the device does not decode (e.g., when compared to a device that does not indicate a capability to adjust the power ratio).

One or more of the operations performed by the base station 105 or the device 103 may be performed by a base station communications manager 102, which may be an example of a communications manager 1220, 1320, 1420, or 1520 as described with reference to FIGS. 12 through 15. In some cases, a transceiver may perform receiving or transmitting operations and a processor may determine one or more radio frequency powers.

Additionally, one or more of the operations performed by the UE 115 or the device 103 (e.g., which may be an example of a base station 105, UE 115, or another type of device configured to perform wireless communications) may be performed by a UE communications manager 101, which may be an example of the communications manager 1220, 1320, 1420, or 1520 as described with reference to FIGS. 12 through 15. In some cases, a transceiver may perform the receiving or transmitting operations and a processor may perform administrative tasks such as preparing indications, decoding data, storing converted radio frequency power, or any other task at the UE 115.

Figure 2:
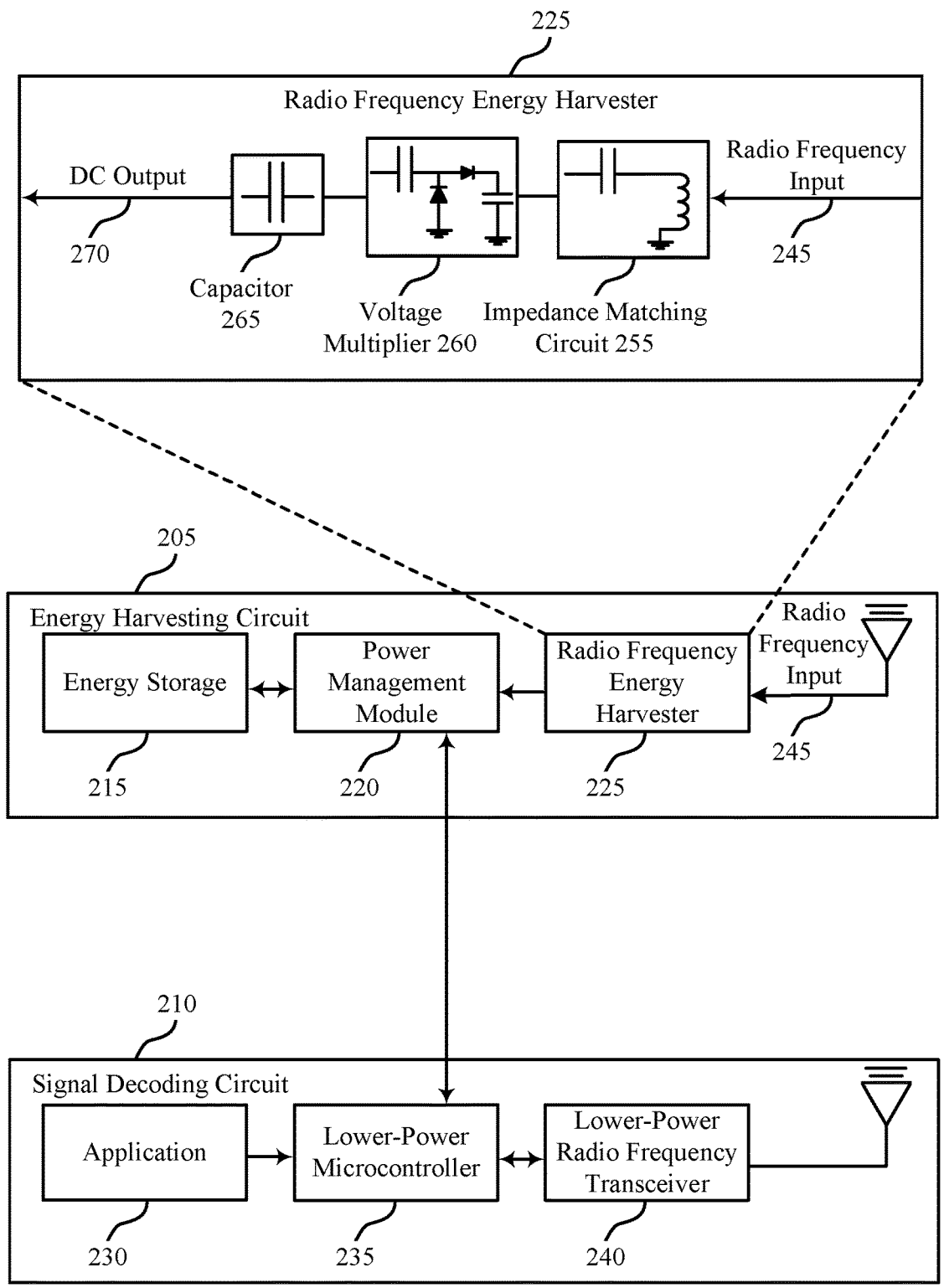
FIG. 2 illustrates an example of circuitry that supports channel reporting for energy harvesting at a device in accordance with one or more aspects of the present disclosure.

FIG. 2 illustrates an example of circuitry 200 that supports channel reporting for energy harvesting at a device in accordance with one or more aspects of the present disclosure. In some examples, circuitry 200 may implement aspects of the wireless communications system 100 as described with reference to FIG. 1. For example, a device, such as a UE 115 or a base station 105, may be equipped with circuitry 200 to perform radio frequency energy harvesting and receive radio frequency signals.

The circuitry 200 may include an energy harvesting circuit 205 and a signal decoding circuit 210. The energy harvesting circuit 205 may convert a radio frequency input 245 from an electromagnetic domain to an electrical domain. For example, the energy harvesting circuit 205 may receive the radio frequency input 245 (e.g., having power associated with an electromagnetic field) and may convert the radio frequency input 245 to DC output 270 (e.g., having power associated with a voltage and current). The energy harvesting circuit 205 may include a radio frequency energy harvester 225, a power management module 220, and an energy storage 215. The radio frequency energy harvester 225 may include impedance matching circuit 255, voltage multiplier 260, and capacitor 265. In some examples, the radio frequency energy harvester 225 may receive radio frequency input 245 (e.g., radio frequency signals) from an antenna. In order to convert the radio frequency input 245 into DC output 270 (e.g., DC power), the radio frequency energy harvester 225 may include an impedance matching circuit 255, voltage multiplier 260, and capacitor 265. Once the radio frequency energy harvester 225 converts the radio frequency input 245 into DC output 270, the radio frequency energy harvester 225 may transfer the DC output 270 to the power management module 220. The power management module 220 may determine whether to store DC output 270 into energy storage 215 or use the DC output 270 for tasks (e.g., decoding, running filters, low power transmissions, or other tasks associated with low power consumption when compared to other tasks performed by the device).

The signal decoding circuit 210 may perform tasks related to signal transmission and reception. The signal decoding circuit 210 may include a lower-power radio frequency transceiver 240, a lower-power microcontroller 235, and an application 230. The lower-power radio frequency transceiver 240 may transmit and receive signals via an antenna. In some examples, the lower-power microcontroller 235 may process signals received from the lower-power radio frequency transceiver 240. In other examples, the lower-power microcontroller 235 may process signals received from the application 230 and transmit the processed signals to the lower-power radio frequency transceiver 240 for transmission via an antenna. The lower-power microcontroller 235 may process signals using power received from the power management module 220 of the energy harvesting circuit 205. For example, the power management module 220 may direct energy output from the radio frequency energy harvester 225 to the lower-power microcontroller 235. In another example, the power management module 220 may direct energy from the energy storage 215 to the lower-power microcontroller 235.

A device (e.g., a UE, a base station) may be equipped with circuitry 200 in order to perform energy harvesting and receive signals. In some cases, a device (e.g., a base station 105, a UE 115) may perform energy harvesting (e.g., via the energy harvesting circuit 205) using power-splitting techniques. Here, the device may direct a first portion of the detected radio frequency power to the energy harvesting circuit 205 and a second portion of the detected radio frequency power to the signal decoding circuit 210 according to a power ratio. In some cases, the device may have the capability to operate the energy harvesting circuit 205 according to multiple possible power ratios. Here, operating the energy harvesting circuit according to different power ratios may impact both an ability of the device to successfully receive and decode signals and an ability of the device to harvest energy from received signals. To determine an impact of each of the multiple possible power ratios on both energy harvesting and signal decoding, the device may perform channel estimations based on each of the multiple possible power ratios. The device may additionally perform CSI reporting based on the multiple possible power ratios.

In some instances, a device that is performing energy harvesting according to power-splitting techniques may have the capability to adjust the power ratio associated with the energy harvesting circuit 205 while communicating with another device in the wireless communications system. If the device has the capability to change the power ratio, the device may indicate this capability another device. In some cases, the other device may adjust a transmission power used to transmit certain signals in response to receiving the indication of the capability of the device to adjust the power ratio. Additionally, the device that has the capability to adjust the power ratio associated with the energy harvesting circuit 205 may adjust the power ratio when receiving these certain signals (e.g., signals that the device does not need to decode) from the other device. Based on increasing the power ratio when receiving signals that the device does not decode and based on the other device increasing a transmission power associated with signals that the device does not decode, the device may harvest more energy when receiving signals that the device does not decode (e.g., when compared to a device that does not indicate a capability to adjust the power ratio).

Figure 3:
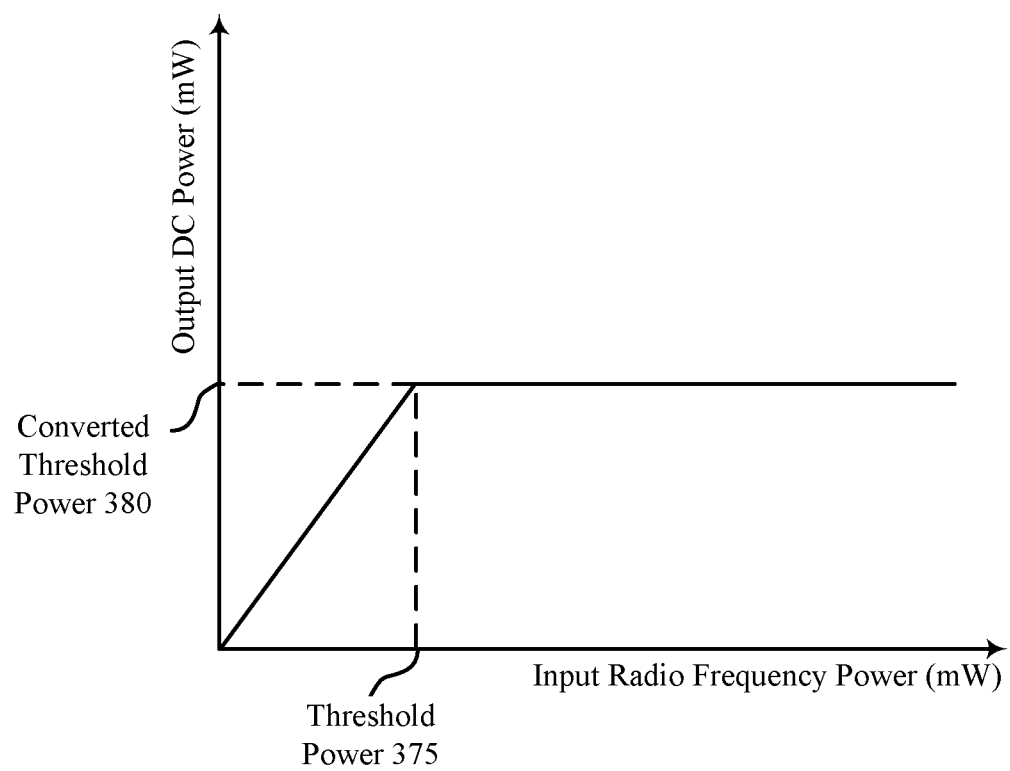
FIG. 3 illustrates an example of a power diagram that supports channel reporting for energy harvesting at a device in accordance with one or more aspects of the present disclosure.

FIG. 3 illustrates an example of a power diagram 300 that supports channel reporting for energy harvesting at a device in accordance with one or more aspects of the present disclosure. In some examples, power diagram 300 may implement aspects of the wireless communications system 100 and circuitry 200 as described with reference to FIGS. 1 and 2. For example, a device (e.g., a UE, a base station) may be equipped with circuitry (e.g., as described with reference to FIG. 2) which may allow the device to perform energy harvesting according to Equation 1, described herein.

Power diagram 300 may relate input radio frequency power (e.g., radio frequency input 245) to output DC power (e.g., DC output 270) according to an energy harvesting model. The energy harvesting model may be a linear energy harvesting model, a non-linear energy harvesting model (e.g., a polynomial model), or any other energy harvesting model. Power diagram 300 may illustrate an example of a piece-wise linear energy harvesting model, where the amount of DC power output from a radio frequency energy harvester 225 may increase linearly as the amount of radio frequency power input into the radio frequency energy harvester 225 increases, up to a threshold. The threshold may include a threshold amount of output DC power (e.g., converted threshold power 380) that has been converted by an energy harvester (e.g., radio frequency energy harvester 225). The threshold may also include a threshold amount of input radio frequency power (e.g., threshold power 375) input into a radio frequency energy harvester (e.g., radio frequency energy harvester 225).

For example, once the amount of input radio frequency power reaches the threshold power 375, the amount of output DC power may also reach the converted threshold power 380. That is, once the amount of input radio frequency power reaches the converted threshold power 380, increasing the amount of input radio frequency power may not increase the amount of output DC power beyond the converted threshold power 380. Therefore, the energy harvesting circuit (e.g., energy harvesting circuit 205) may have a saturation power, such as the converted threshold power 380, where an input radio frequency power equal (or substantially equivalent) to the converted threshold power 380 may allow the energy harvesting circuit to harvest a maximum amount of output DC power substantially equivalent to the converted threshold power 380. In some cases, in order to improve channel estimations and CSI reporting, a device (e.g., a UE 115, a base station 105) may utilize the threshold power 375 and the converted threshold power 380, to efficiently harvest energy and determine the impact of energy harvesting on signal decoding as described herein.

Figure 4A:
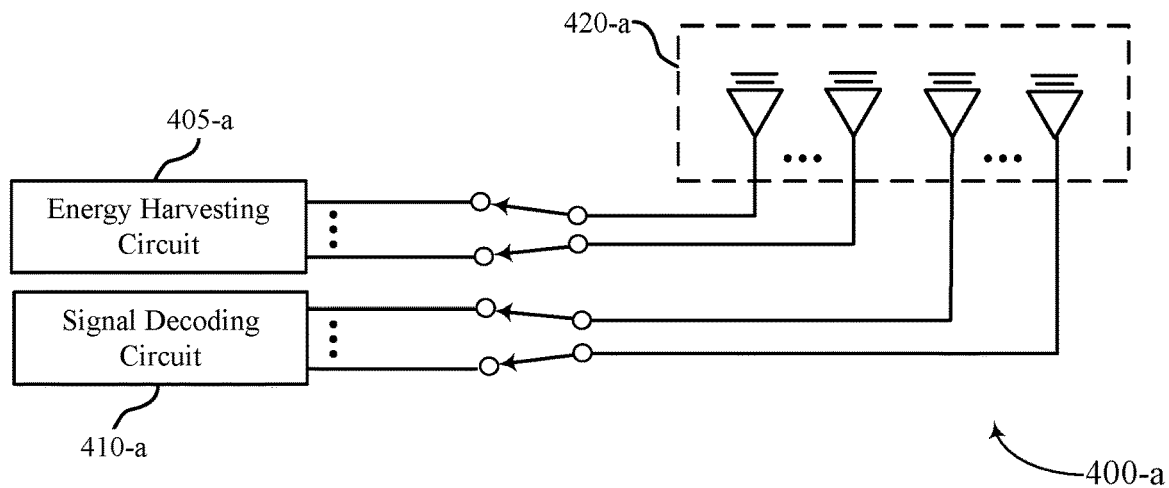
FIGS. 4A through 4C illustrate examples of energy harvesting schemes that support channel reporting for energy harvesting at a device in accordance with one or more aspects of the present disclosure.
Figure 4B:
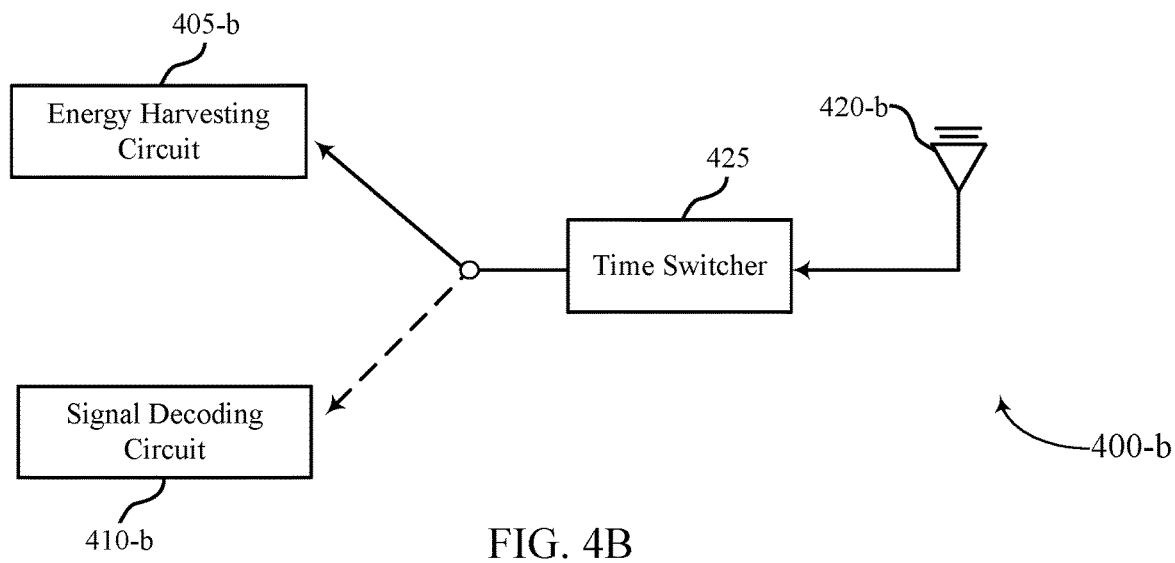
Figure 4C:
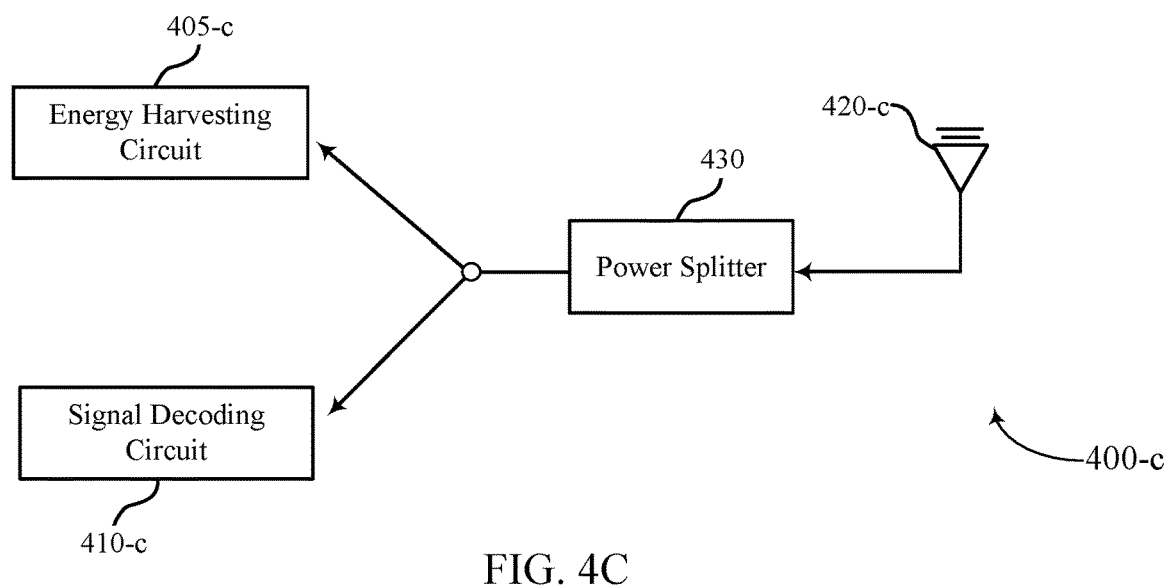

FIGS. 4A through 4C illustrate examples of energy harvesting schemes 400, that support channel reporting for energy harvesting at a device in accordance with one or more aspects of the present disclosure. In some examples, energy harvesting schemes 400 may implement aspects of the wireless communications system 100 and circuitry 200 as described with reference to FIGS. 1 through 3. For example, a device (e.g., a UE 115, a base station 105, or any other device) may be configured to support energy harvesting. That is, the device may include circuitry (e.g., circuitry 200) that may perform energy harvesting and signal receiving according to an energy harvesting schemes 400. FIG. 4A may illustrate an energy harvesting scheme 400-a associated with a separated receiver architecture, FIG. 4B may illustrate an energy harvesting scheme 400-b associated with a time switching architecture, and FIG. 4C may illustrate an energy harvesting scheme 400-c associated with a power splitting architecture.

The device may be equipped with or coupled to at least one energy harvesting circuit 405, at least one signal decoding circuit 410, and one or more antennas 420. The antennas 420 may receive radio frequency signals (e.g., by detecting radio frequency power associated with the received radio frequency signals). The radio frequency power obtained by the antennas 420 may be directed to an energy harvesting circuit 405, a signal decoding circuit 410, or a combination thereof.

FIG. 4A illustrates an energy harvesting scheme 400-a associated with a separated receiver architecture. A device that implements the energy harvesting scheme 400-a associated with a separated receiver architecture may be equipped with a set of antennas 420-a where a first portion of the set of antennas 420-a may be coupled to an energy harvesting circuit 405-a and a second portion of the set of antennas 420-a may be coupled to a signal decoding circuit 410-a. For example, the set of antennas 420-a may include one hundred antennas. The first portion of set of antennas 420-a may include four antennas coupled with the energy harvesting circuit 405-a. The second portion of the set of antennas 420-a may include the remaining 96 antennas coupled to the signal decoding circuit 410-a. The quantity of antennas for energy harvesting and the quantity of antennas for signal decoding may be fixed (e.g., predefined during a manufacturing stage), configurable (e.g., based on autonomous determination at the device), or a combination thereof.

A device relying on the separated architecture energy harvesting scheme 400-a may receive and harvest radio frequency power via the first portion of antennas 420-a (e.g., using the energy harvesting circuit 405-a) while concurrently receiving and decoding the radio frequency signals via the second portion of antennas 420-a (e.g., using the signal decoding circuit 410-a). That is, by dedicating a first portion of the set of antennas 420-a to harvesting energy and a second portion to decoding the received signal, the device may have the capability to harvest energy while contemporaneously decoding the received signal over a given time period. In some instances, spatial domain degrees of freedom may be decreased when using the separated architecture energy harvesting scheme 400-a (e.g., when compared to other energy harvesting schemes 400) since the first portion of antennas may be leveraged for decoding or the second portion of antennas may be leveraged for energy harvesting. In some cases, an energy harvesting scheme 400 associated with a switching architecture (e.g., a time switching architecture or a power switching architecture) may be associated with an increased spatial domain degree of freedom when compared to the energy harvesting scheme 400-a. That is, energy harvesting schemes 400 associated with switching architectures may allow a device to leverage the full set of antennas 420 of a device for energy harvesting or signal decoding, thereby limiting the spatial domain degrees of freedom that may be lost FIG. 4B illustrates an energy harvesting scheme 400-b associated with a time switching architecture. In the example of the time switching architecture energy harvesting scheme 400-b, a device may include a time switcher 425 that allows the device to direct received radio frequency power to either the energy harvesting circuit 405-b or the signal decoding circuit 410-b during a given time period. For example, an antenna 420-b may receive a signal and the device may divert the signal to the energy harvesting circuit 405-b for a first time period determined by the time switcher 425 in order to harvest the radio frequency power associated with the signal. Once the first time period expires, the time switcher 425 may then divert the signal to the signal decoding circuit 410-b for a second time period.

In the example of the energy harvesting scheme 400-b that is associated with the time switching architecture, the amount of energy harvested by the device (e.g., node j) may be based on the operation of the time switcher 425 according to Equation 2:

$$E_j = \eta P_i |g_{i,j}|^2 T\alpha \qquad (2)$$

In Equation 2, $\alpha$ may represent a fraction of time (e.g., between 0 and 1) allocated for energy harvesting and T may represent the total amount of time resources allocated to receive the transmission of the signal (e.g., T may equal the total number of slots allocated, a total amount of time in milliseconds, seconds, or any other unit of time). For example, the time switcher 425 may determine that energy will be harvested for a first time period, $\alpha T$, where $\alpha T$ represents the fraction of the total time T that the device may be harvesting energy at the energy harvesting circuit 405-b. For the remaining fraction of time, $(1-\alpha)T$, the device may decode the signal at signal decoding circuit 410-b. The fraction of time, $\alpha$, may be predefined at the device, determined at the device (e.g., based on a QoS), signaled by another device, or a combination thereof.

The data rate and the amount of energy accumulated may be impacted by time switching between energy harvesting and decoding signals due to the fact that the full set of antennas 420-b may be dedicated to energy harvesting or signal decoding for a fraction of the time the signal may be received. The impact on the data rate may be illustrated by Equation 3:

$$R_{i-j} = (1-\alpha)\log_2\left(1 + \frac{|g_{i-j}|^2 P_i}{kW}\right) \tag{3}$$

In Equation 3, $R_{i-j}$ may represent the data rate, and k and W may denote the noise spectral density and the channel bandwidth, respectively. A device (e.g., a transmitting or receiving device) may determine the impact of energy harvesting on signal decoding, the impact of signal decoding on energy harvesting, or a combination thereof (e.g., based on CSI reporting determined by a PMI). As described in further detail with reference to FIGS. 6 and 11, a different PMI may be determined based on whether the device is prioritizing energy harvesting or signal decoding. Here, the device may additionally report different CSI based on whether a PMI associated with energy harvesting or a PMI associated with signal decoding is used.

FIG. 4C illustrates an energy harvesting scheme 400-c associated with a power splitting architecture. In the example of the power splitting architecture energy harvesting scheme 400-c, a device may include a power splitter 430 that may split detected radio frequency power associated with a received signal between energy harvesting circuit 405-c and signal decoding circuit 410-c. For example, the device may split radio frequency power detected at the one or more antennas 420-c, directing a first portion of the radio frequency power to the energy harvesting circuit 405-c and a second portion of the radio frequency power to the signal decoding circuit 410-c, where each portion of radio frequency power may be determined by the power splitter 430. Based on the energy harvesting scheme 400-c, the amount of energy harvested (e.g., accumulated) from the detected radio frequency power may be dependent on the operation of the power splitter 430 and illustrated by Equation 4:

$$E_j = \eta \eta P_i |g_{i-j}|^2 T \tag{4}$$

In the example of Equation 4, $\rho$ may represent a power ratio (e.g., a fraction of the received power $P_i$ directed to the energy harvesting circuit 405-c at the device between 0 and 1) allocated for energy harvesting over a total time, T. That is, the power splitter 430 may be configured to split detected radio frequency power, directing a first portion of the detected radio frequency power substantially equivalent to $\rho P_i$ (e.g., weighted by $\rho$) to the energy harvesting circuit 405-c and directing a second portion of the radio frequency power substantially equivalent to $(1-\rho)P_i$ (e.g., weighted by $1-\rho$) to the signal decoding circuit 410-c.

An impact of energy harvesting on the signal decoding may be determined by the data rate associated with the energy harvesting scheme 400-c associated with a power splitting architecture which may be represented by Equation 5:

$$R_{i-j} = \log_2\left(1 + \frac{|g_{i-j}|^2(1-\rho)P_i}{kW}\right) \tag{5}$$

In some examples, a device implementing the energy harvesting scheme 400-c may have the capability to operate the energy harvesting circuit 405-c according to multiple possible power ratios (e.g., multiple possible values of $\rho$). In this case, different power ratios may impact the device's ability to receive and decode signals. Therefore, the device may determine the impact of each of the multiple possible power ratios on both energy harvesting and signal decoding as described in further detail with reference to FIGS. 5 and 10. In other examples, a device implementing the energy harvesting scheme 400-c associated with a power splitting architecture may have the capability to adjust a power ratio associated with the energy harvesting circuit 405-c while communicating with another device in the wireless communications system 100. If the device has the capability to change the power ratio, the device may indicate this capability to another device and the other device may adjust a transmission power used to transmit certain signals. Additionally, the device that has the capability to adjust the power ratio associated with the energy harvesting circuit may adjust the power ratio when receiving these certain signals (e.g., signals that the device does not need to decode) from the other device as described in further detail with reference to FIGS. 7 and 12.

Figure 5:
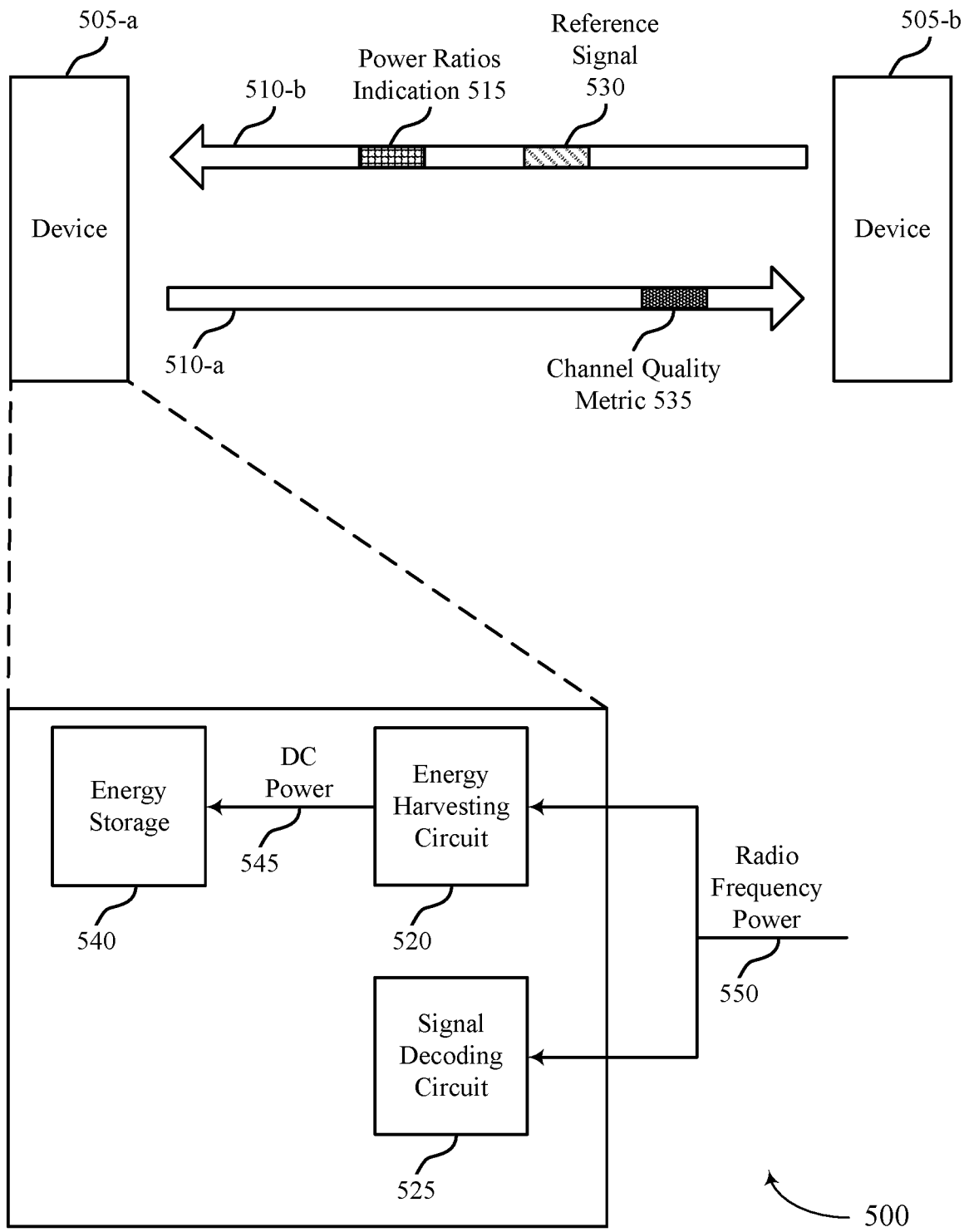
FIGS. 5 through 8 illustrate examples of wireless communications systems that support channel reporting for energy harvesting at a device in accordance with one or more aspects of the present disclosure.

FIG. 5 illustrates an example of a wireless communications system 500 that supports channel reporting for energy harvesting at a device in accordance with one or more aspects of the present disclosure. In some examples, the wireless communications system 500 may implement aspects of the wireless communications system 100 or may be implemented by aspects of the wireless communications system 100. For example, the wireless communications system 500 may include a device 505-a and a device 505-b. The devices 505 may be examples of a UE 115 or a base station 105, or any other device such as a wearable device, a smart appliance, a medical device, or any combination thereof.

In the wireless communications system 500, the device 505-a may have the capability to harvest radio frequency energy. In some cases, the device 505-a may include an energy harvesting circuit 520 which may be an example of the energy harvesting circuit 104 as described with reference to FIG. 1, a signal decoding circuit 525 which may be an example of the signal decoding circuit 106 as described with reference to FIG. 1, and an energy storage 540 which may be an example of the energy storage 107 as described with reference to FIG. 1. The device 505-a may implement an energy harvesting scheme associated with power splitting. As such, the device 505-a may include a power splitter (e.g., power splitter 430) to direct a portion of radio frequency power 550 associated with radio signals to the energy harvesting circuit 520 and the signal decoding circuit 525 according to a power ratio (e.g., $\rho$ where $0 \leq \rho \leq 1$ as defined by Equation 5) associated with the energy harvesting circuit 520. For example, the device 505-b may transmit a reference signal 530 over the communication link 510-b to the device 505-a, and the device 505-a may divert a first portion of detected radio frequency power 550 associated with the reference signal 530 to the energy harvesting circuit 520 and a second portion of the detected radio frequency power 550 to the signal decoding circuit 525. Here, the energy harvesting circuit 520 may be configured to convert the received radio frequency power 550 to DC power 545 and communicate the DC power 545 to the energy storage 540, which may be configured to store the DC power 545 at the device 505-a. In some cases, the amount of the first portion and the second portion of the detected radio frequency power 550 may be determined by the power ratio.

The device 505-a may have the capability to operate the energy harvesting circuit 520 according to multiple different power ratios. In some instances, operating the energy harvesting circuit 520 according to different power ratios may impact an ability of the device 505-a to both harvest energy and decode signals received from the device 505-b (e.g., using the signal decoding circuit 525). That is, higher power ratios may increase the energy harvested by the device 505-a and may decrease a reliability of decoding signals. Additionally, decreased power ratios may decrease the energy harvested by the device 505-a and may increase a reliability of decoding signals.

In some cases, the device 505-a may perform channel estimation and reporting procedures using multiple different power ratios (e.g., as indicated by the power ratios indication 515). For example, the device 505-b may transmit the power ratios indication 515 to the device 505-a, where the power ratios indication 515 indicates multiple power ratios for the device 505-a to use when performing channel estimation procedures. The power ratios indication 515 may be transmitted via RRC signaling, a MAC-CE, or downlink control information (DCI). In cases that the devices 505 are communicating via sidelink communication links 510, the power ratios indication 515 may be transmitted via SCI or PSSCH.

In some cases, the power ratios indication 515 may indicate a set of preconfigured power ratio values. For example, the device 505-b may indicate the preconfigured power ratio values (e.g., via the power ratios indication 515) globally, via control signaling, such as RRC, MAC-CE, or any other control signaling. Additionally or alternatively, the device 505-a may transmit an indication of possible power ratio values to the device 505-b. Here, the power ratios indication 515 may indicate a subset of the possible power ratio values for the device 505-a to use for performing channel estimation procedures. In another example, the device 505-b may first configure multiple sets of power ratios (e.g., via RRC signaling, via a MAC-CE). Here, the power ratios indication 515 may indicate one of the multiple sets of power ratios (e.g., via a MAC-CE, via control information such as SCI, PSSCH). In some examples, each of the multiple sets of power ratios may be associated with a given reference signal may be represented by an index during configuration. Here, the power ratios indication 515 may indicate the index associated with the reference signal 530 (and corresponding set of power ratios). That is, the device 505-a may identify the multiple power ratios to use for channel estimation procedures based on the resource or resource set for the reference signal 530.

In some instances, the power ratios indication 515 may include a value for an initial power ratio (e.g., $\rho_0$), where the power ratio may be set to 0 (or to a substantially low value), effectively turning off the power splitter. In some cases, energy harvesting may be performed in the analog domain at the energy harvesting circuit 520, the device 505-a may remove the impact of the initial power ratio in the SNR domain before transitioning to the digital domain for operations performed by the signal decoding circuit 525.

After transmitting the power ratios indication 515, the device 505-b may transmit the reference signal 530 to the device 505-a via the communication link 510-b. Based on receiving the reference signal 530, the device 505-a may perform one or more channel estimation procedures using the multiple power ratios (e.g., indicated by the power ratios indication 515). For example, the device 505-a may determine (e.g., based on receiving the reference signal 530) channel quality metrics associated with each of the multiple power ratios indicated by the power ratios indication 515. That is, for each of the multiple power ratios indicated by the power ratios indication 515, the device 505-a may determine one or more of an SNR, a signal to interference to noise ratio (SINR), a channel quality indicator (CQI), a rank indicator (RI), a reference signal received power (RSRP), a PMI, or any other channel quality metric.

For example, the power ratios indication 515 may indicate multiple power ratios 1 through 5 (e.g., $\rho_1$=0.2, $\rho_2$=0.3, $\rho_3$=0.5, $\rho_4$=0.7, $\rho_5$=0.9, or any other combination of power ratios where $0 \leq \rho_i \leq 1$). The device 505-a may determine channel quality metrics such as CQI, RI, PMI, RSRP (e.g., L1-RSRP), SNR, SINR, and/or any other channel quality metric (e.g., to be included in a CSI report) for each power ratio indicated by the power ratios indication 515 (e.g., power ratios 1 through 5). That is, for the first power ratio (e.g., $\rho_1$ where $\rho_1$ may be equal to 0.2), the device 505-a may determine a first set of channel quality metrics that may include a $CQI_1$, an $RI_1$, a $PMI_1$, an $RSRP_1$, $SNR_1$, or a combination of these and any other channel quality metrics, for the second power ratio (e.g., $\rho_2$ where $\rho_2$ may be equal to 0.3), the device 505-a may determine a second set of channel quality metrics that may include $CQI_2$, $RI_2$, $PMI_2$, $RSRP_2$, $SNR_2$, or a combination of these and any other channel quality metrics, up to the power ratio 5 (e.g., $\rho_5$).

The device 505-a may then transmit the channel quality metric 535 to the device 505-b. For example, the device 505-a may transmit the channel quality metric 535 within a CSI report. In order to report the channel quality metric 535 (e.g., CSI, CQI, RI, and any other channel quality metrics) and energy metrics (e.g., PMI, L1-RSRP, and any other energy metrics), the device 505-a may utilize predetermined quantization tables (e.g., that may be agreed upon between the device 505-b and the device 505-a) that may indicate which functions to use for a given channel quality metric or energy metric.

In one case, the device 505-a may indicate channel quality metrics 535 associated with each power ratio (e.g., indicated by the power ratios indication 515). For example, the device 505-a may transmit, for each of the indicated power ratios, a resource indicator (e.g., a channel resource indicator (CRI)) indicating resources having a highest channel quality (e.g., for decoding data via the signal decoding circuit 525) and a resource indicator (e.g., a CRI) indicating resources of the reference signal 530 having a highest energy harvesting (e.g., via the energy harvesting circuit 520). In another example, the device 505-a may transmit a more than one (e.g., 'L') resource indicators (e.g., CRIs) indicating the more than one resources associated with the reference signal 530 having a highest channel quality (e.g., for decoding data via the signal decoding circuit 525) and more than one resource indicator (e.g., a CRI) indicating resources of the reference signal 530 having a highest energy harvesting (e.g., via the energy harvesting circuit 520). In another example, the device 505-a may transmit one or more resource indicators (e.g., CRIs) indicating the more than one resources associated with the reference signal 530 having a highest combined channel quality (e.g., for decoding data via the signal decoding circuit 525) and a highest energy harvesting (e.g., via the energy harvesting circuit 520).

In another case, the device 505-a may indicate channel quality metrics 535 associated with a subset of the power ratios indicated by the power ratios indication 515. Here, the device 505-a may additionally indicate, for each CSI report including the channel quality metrics, the power ratio associated with the CSI report. For example, the device 505-a may transmit channel quality metrics 535 in a CSI report associated with the power ratio yielding a highest combined signal quality and energy harvesting. In another example, the device 505-a may transmit channel quality metrics 535 in more than one CSI report each associated with the more than one power ratio yielding the highest combined signal quality and energy harvesting.

The device 505-b may use the channel quality metric 535 (e.g., received within a CSI report) to configure future data transmissions to the device 505-a. That is, many aspects of a data transmission configuration may depend upon channel quality metrics (e.g., data rate, transmit block size (TBS), the scheduled modulation and coding scheme (MCS), the beam used for future transmissions, as well as other aspects of data transmission configurations). In some cases, the device 505-b may account for the impact of different power ratios on data transmissions to the device 505-a.

Figure 6:
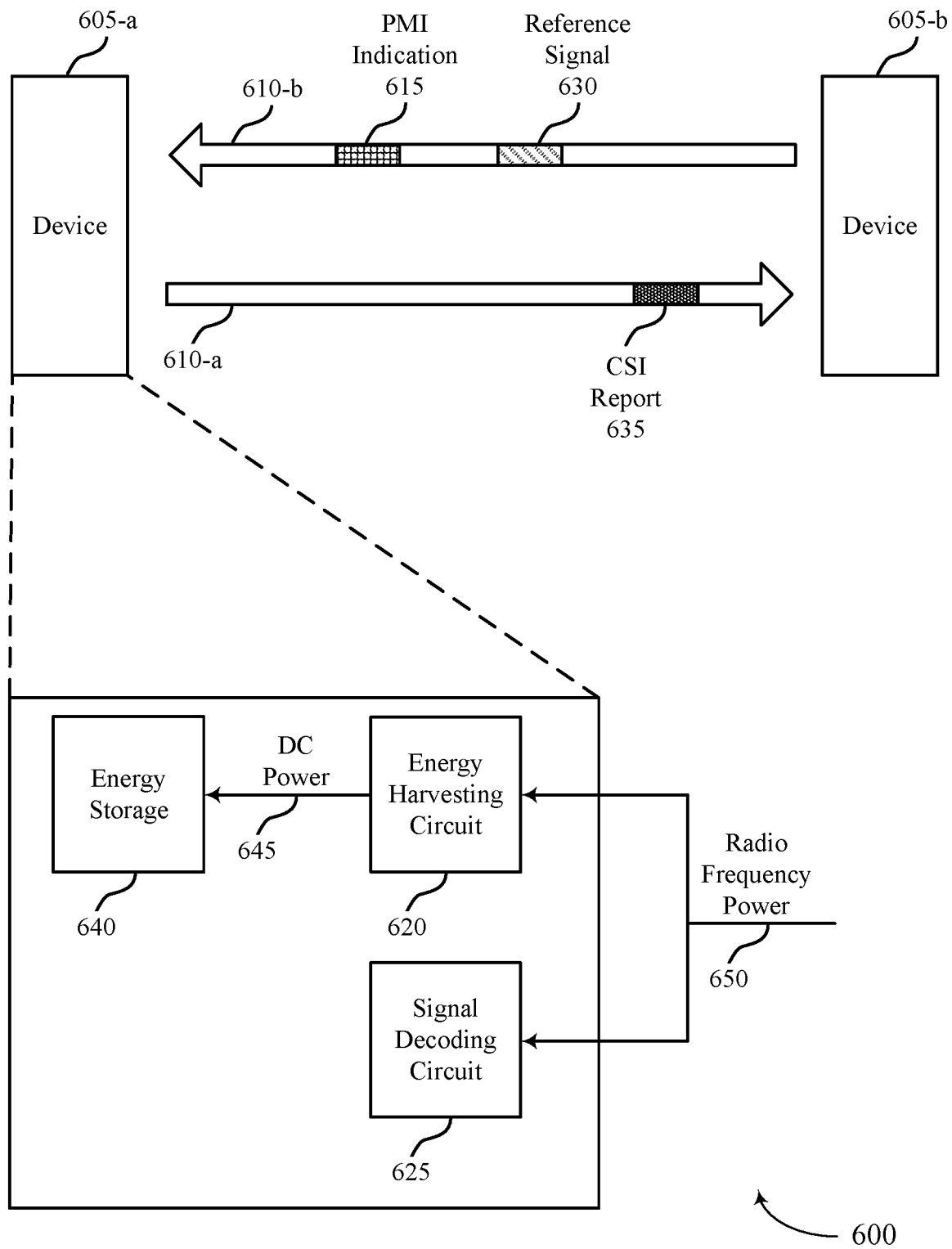

FIG. 6 illustrates an example of a wireless communications system 600 that supports channel reporting for energy harvesting at a device in accordance with one or more aspects of the present disclosure. In some examples, the wireless communications system 600 may implement aspects of the wireless communications system 100 or may be implemented by aspects of the wireless communications system 100. For example, the wireless communications system 600 may include a device 605-a and a device 605-b. The devices 605 may be examples of a UE 115 or a base station 105, or any other device such as a wearable device, a smart appliance, a medical device, or any combination thereof.

In the wireless communications system 600, the device 605-a may have the capability to harvest radio frequency energy. In some cases, the device 605-a may include an energy harvesting circuit 620 which may be an example of the energy harvesting circuit 104 as described with reference to FIG. 1, a signal decoding circuit 625 which may be an example of the signal decoding circuit 106 as described with reference to FIG. 1, and an energy storage 640 which may be an example of the energy storage 107 as described with reference to FIG. 1. The device 605-a may implement an energy harvesting scheme associated with time switching. As such, the device 605-a may switch between directing received radio frequency energy to the energy harvesting circuit 620 for a period of time and the signal decoding circuit 625 for another period of time. In some cases, the energy harvesting circuit 620 may be configured to convert the received radio frequency power 650 to DC power 645 and communicate the DC power 645 to the energy storage 640, which may be configured to store the DC power 645 at the device 605-a. The device 605-a may be communicating with the device 605-b via communication links 610, which may be examples of a communication link 125 or a communication link 135, such as a Uu link, a sidelink, an uplink, a downlink, or any other communication link.

In some cases, the device 605-a may apply a PMI or other precoder to received signals (e.g., a reference signal 630) prior to directing the received signal to the energy harvesting circuit 620 or signal decoding circuit 625. In some cases, different PMIs may affect the signal differently. For example, the device 605-a may apply one PMI to increase energy harvested by the energy harvesting circuit 620 and may apply a different PMI to increase a reliability of signal decoding by the signal decoding circuit 625. In the example of wireless communications system 600, the device 605-a may perform channel estimation and subsequent transmissions of CSI reports 635 based on either a PMI associated with energy harvesting (e.g., to increase energy harvested), a PMI associated with signal decoding (e.g., to increase a reliability of signal decoding), or both.

The device 605-b may transmit a PMI indication 615 to the device 605-a. The PMI indication may indicate for the device 605-a to generate the CSI report 635 using a PMI associated with energy harvesting, a PMI associated with signal decoding, or both. For example, the device 605-b may transmit the PMI indication 615 via control signaling (e.g., Uu RRC, Uu MAC-CE, DCI, sidelink RRC, sidelink MAC-CE, SCI, or any other control signaling) over communication link 610-a (e.g., Uu link, sidelink, or any other communication link). In another example, the PMI indication 615 may be included in a CSI configuration (e.g., transmitted to the device 605-a). Additionally or alternatively, the PMI indication 615 may indicate for a type of PMI to use for CSI reporting to change from one time interval to another.

After transmitting the PMI indication 615, the device 605-b may transmit a reference signal 630 to the device 605-a. For example, the device 605-b may transmit a reference signal 630 (e.g., a CSI-RS), a sounding reference signal (SRS), or any other reference signal) over the communication link 610-a. The device 605-a may then determine a PMI in accordance with the PMI indication 615. For example, in cases that the PMI indication 615 indicates for the device 605-a to generate the CSI report 635 based on applying a PMI associated with energy harvesting to the reference signal 630, the device 605-a may determine a PMI that increases an amount of energy harvested (e.g., by the energy harvesting circuit 620). In another example, in cases that the PMI indication 615 indicates for the device 605-a to generate the CSI report 635 based on applying a PMI associated with signal decoding to the reference signal 630, the device 605-a may determine a PMI that increases a signal decoding reliability (e.g., by the signal decoding circuit 625).

The device 605-a may use a time switcher while receiving the reference signal 630 to harvest radio frequency power 650 associated with the reference signal 630. For example, the device 605-a may use all of its antennas to detect the radio frequency power 650 associated with the reference signal 630 and divert the detected radio frequency power 650 to the energy harvesting circuit 620 for a period of time. When the time period has expired, the time switcher may utilize all of the antennas of the device 605-a to receive the reference signal 630 and divert the reference signal 630 to the signal decoding circuit 625 for a period of time.

When the device 605-a diverts the reference signal 630 to the signal decoding circuit 625, the reference signal 630 may be represented by Equation 6:

$$W = Ax + By + z \qquad (6)$$

In the example of Equation 6, A may represent a precoder with data x, B may represent interference with an interference signal y, and z may be the additive white gaussian noise (AWGN). The device 605-a may attempt to determine the precoder (e.g., PMI) A by applying a filter, such as a whitener or any kind of filter, in order to remove the interference and the noise from the signal (e.g., By+z). Removing the interference and noise from the signal may allow the device 605-*a* to determine the precoder A that may best align with the data. Therefore, the device 605-*a* may select the PMI by applying a whitener in the digital domain at the signal decoding circuit 625, which may result in the best PMI for signal decoding (e.g., data) based on a signal quality (e.g., channel quality metric). However, the best PMI for data may not be the best PMI (e.g., precoder, beamformer) for energy harvesting. Energy harvesting at the energy harvesting circuit 620 may occur in the analog domain, and the device 605-*a* may not apply a filter (e.g., whitener) since the device 605-*a* may leverage the interference to harvest energy. Therefore, in order to determine the best PMI for energy harvesting, the device 605-*a* may select PMI based on the joint behavior of the entire signal (e.g., represented by W from Equation 6). That is, the best PMI for energy harvesting may be based on the amount of accumulated energy harvested and the highest amount of accumulated energy may occur when the PMI aligns with both the data and the interference since, if the PMI aligns with the interference, the device 605-*a* may harvest more energy.

In the case where the PMI indication 615 indicates to the device 605-*a* that a PMI based on energy harvesting should be used to determine the metrics included in the CSI report 635, the device 605-*a* may determine the PMI energy harvesting using an energy metric (e.g., determine the resources or beams of the reference signal 630 that include the most accumulated energy). In the case where the PMI indication 615 indicates to the device 605-*a* that PMI based on a reliability of signal decoding should be used to determine the metrics included in the CSI report 635, the device 605-*a* may determine the PMI for signal decoding based on a channel quality metric (e.g., CQI, SINR, spectral efficiency) as the source of the computation. In the case where the PMI indication 615 indicates to the device 605-*a* that both the PMI based on signal decoding and the PMI based on energy harvesting should be used to determine the metrics included in the CSI report 635, the device 605-*a* may determine both PMIs.

Once the device 605-*a* determines the indicated PMI (or PMIs), the device 605-*a* may use the determined PMI to calculate additional metrics to be included in the CSI report 635. For example, the device may use the determined PMI to determine an energy metric (e.g., an accumulated amount of obtained or expected energy using the PMI for energy), and channel quality metrics (e.g. data metrics based on signal quality) such as, CQI, RI, SNR, RSRP or any other channel quality metrics. After receiving the reference signal 630, the device 605-*a* may prepare the CSI report 635 based on an energy PMI by including the PMI for energy, the determined energy metric and the determined channel quality metrics. The device may then transmit the CSI report 635 to the device 605-*b*.

In another example, the device 505-*a* may generate the CSI report 635 indicating resources (e.g., via CRIs) of the reference signal 630 associated with a best channel quality metric (e.g., CRI for data) or highest energy metric (e.g., CRI for energy). That is, based on the type of CSI report indicated to the device 605-*a*, the device 605-*a* may determine a PMI, a CRI, or both, based on the indicated type (e.g., signal decoding or energy harvesting). Additionally or alternatively, the device 605-*a* may determine the PMI (or other precoder), resource indicator, or any other parameter, separately for data (e.g., based on a signal quality) and separately for energy (e.g., based on an accumulated amount of energy).

In some cases, the device 605-*b* may associate the indication of the type of PMI with a resource or set of resources configured for the reference signal 630. For example, the reference signal may be a CSI-RS signal that may have multiple resources or resource sets assigned to it. The device 605-*b* may indicate to the device 605-*a* that a CSI report 635 for a first resource of the k resources may be determined based on a PMI for energy harvesting, a CSI report 635 for a second resource may be determined based on a PMI for signal decoding, a CSI report 635 for a third resource may be determined based on both a PMI for energy and a PMI for data, and so on. As a result, the CSI report 635 for the first resource may include the PMI for energy harvesting corresponding to the first resource, the accumulated energy for the first resource based on the PMI for energy harvesting, and the channel quality metrics (e.g., CQI, RI, SINR, or any other channel quality metrics) determined based on the PMI for energy harvesting. The CSI report 635 for the second resource may include the PMI for signal decoding, the accumulated energy for the second resource based on the PMI for signal decoding, and the channel quality metrics determined based on the PMI for signal decoding, and so on.

Figure 7:
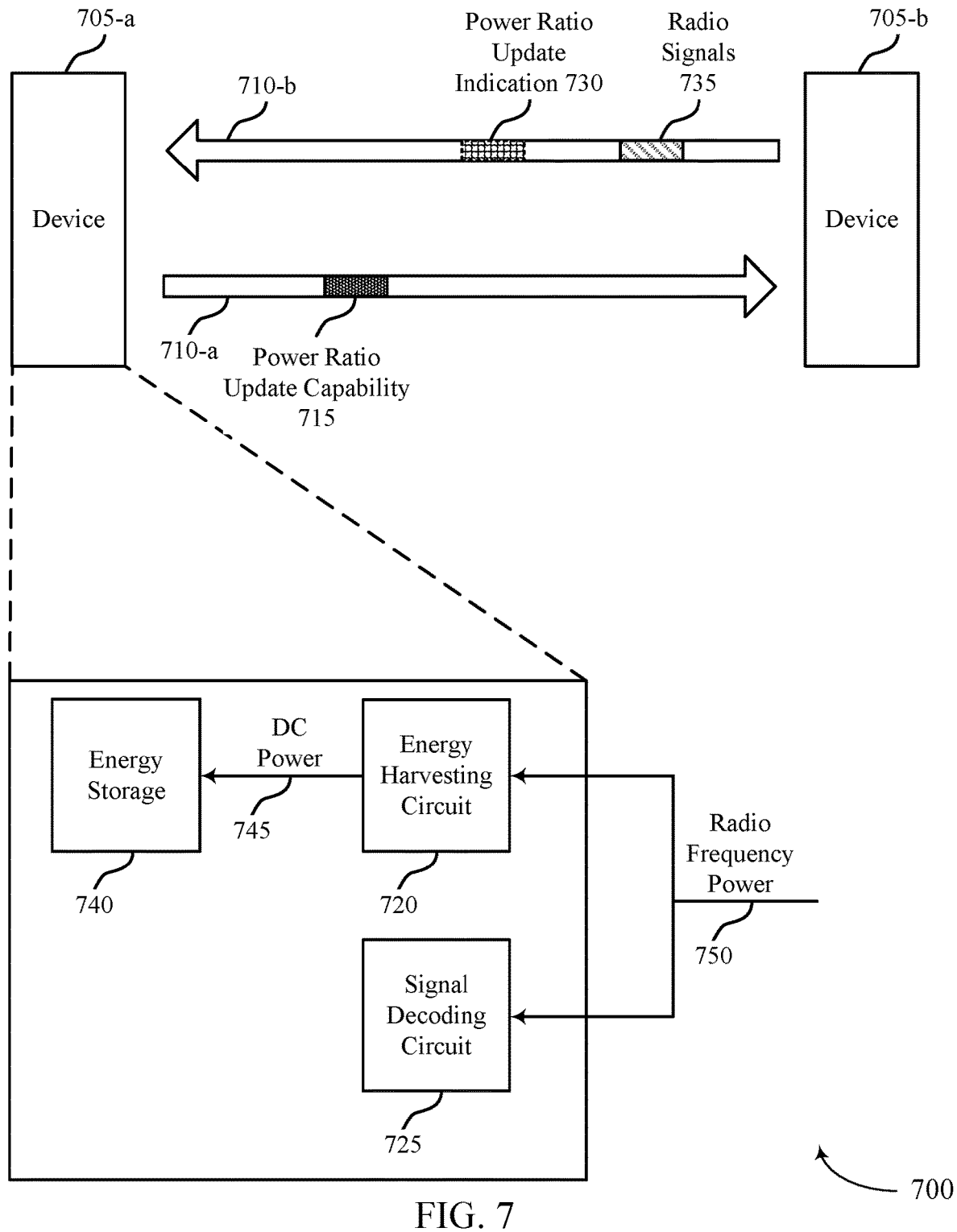

FIG. 7 illustrates an example of a wireless communications system 700 that supports channel reporting for energy harvesting at a device in accordance with one or more aspects of the present disclosure. In some examples, the wireless communications system 700 may implement aspects of the wireless communications system 100 or may be implemented by aspects of the wireless communications system 100. For example, the wireless communications system 700 may include devices, which may be examples of UEs 115, base stations 105 as described herein with reference to FIG. 1, or any other device such as a wearable device, a smart appliance, a medical device, or any combination thereof.

In some examples, one or both of the devices 705 may have the capability to perform energy harvesting and therefore implement aspects of the circuitry 200. For example, one or both of the devices 705 may include an energy harvesting circuit 720, a signal decoding circuit 725, and an energy storage 740, which may be examples of energy harvesting circuits, signal decoding circuits, and energy storage devices, as described with reference to FIGS. 1 through 4. In the wireless communications system 700, the device 705-*a* may implement an energy harvesting scheme associated with a power splitting architecture. As such, the device 705-*a* may utilize a power splitter (e.g., power splitter 430) to split detected radio frequency power 750 associated with a received signal, where the power splitter directs a portion of the detected radio frequency power 750 to the energy harvesting circuit 720 based on a power ratio (e.g., $\rho$ where $0 \le \rho \le 1$ as defined by Equation 4). In some cases, the energy harvesting circuit 720 may be configured to convert the received radio frequency power 750 to DC power 745 and communicate the DC power 745 to the energy storage 740, which may be configured to store the DC power 745 at the device 705-*a*.

The device 705-*a* and 705-*b* may be in communication via communication links 710, which may be examples of communication links 125, 135, or any other communication link 710 (e.g., a Uu link, a sidelink, an uplink, a downlink). In some cases, the device 705-*a* may receive radio signals 735 from another device 705-*b*. For example, the device 705-*b* may transmit an OFDM symbol including a cyclic prefix, resources associated with a physical downlink shared channel (PDSCH) (e.g., which may include frequency division multiplexed PDSCH data and a PDSCH DMRS), resources associated with a CSI-RS, resources associated with a synchronization signal block (SSB), resources associated with a TRS, or a combination thereof.

In the example of wireless communications system 700, the device 705-*a* may have the capability to update the power ratio associated with the energy harvesting circuit 720. That is, the device 705-*a* may direct radio frequency power 750 associated with the received radio signals 735 to the energy harvesting circuit 720 according to a first power ratio. Additionally, the device 705-*a* may have the capability to update the power ratio and directing radio frequency power 750 associated with the received radio signals 735 to the energy harvesting circuit 720 according to the updated power ratio. In some examples, the power ratio may be a function of the application being used at the device 705-*a*. For example, the device 705-*a* may use high reliable applications where the power ratios may be relatively low (e.g., lower than power ratios used for lower priority applications such as enhanced mobile broadband (eMBB)), since the data reliability requirements may be more strict for high reliable applications and the energy harvesting may result in a decrease in signal decoding reliability.

The device 705-*a* may transmit, to the device 705-*b*, the power ratio update capability 715 (e.g., indicating, to the device 705-*b*, that the device 705-*a* has the capability to update the power ratio associated with the energy harvesting circuit 720). The power ratio update capability 715 may include an indication of the multiple power ratios that the device 705-*a* may have the capability to use (e.g., a range of power ratios, an indication of any power ratio value, an indication of a set of discrete power ratio values). Additionally, the power ratio update capability 715 may include the amount of time for the device 705-*a* to change or update the power ratio.

In some cases, one or more of the radio signals 735 may be of higher importance (e.g., relative to other radio signals 735). That is, the device 705-*a* may not decode one or more of the radio signals 735 that are relatively lower importance. Additionally or alternatively, the one or more radio signals 735 that are relatively lower importance may include interference. In some cases, the device 705-*a* may harvest more energy from these lower priority radio signals 735 (e.g., when compared to higher priority radio signals 735). That is, the device 705-*a* may increase the power ratio associated with the energy harvesting circuit 720 when receiving lower priority radio signals 735. Thus, more of the radio frequency power 750 associated with the lower priority radio signals 735 is directed to the energy harvesting circuit 720 (e.g., and less of the radio frequency power 750 associated with the lower priority radio signals 735 is directed to the signal decoding circuit 725). In some cases, the device 705-*b* may additionally increase a transmission power associated with one or more of the lower priority radio signals 735 (e.g., to increase an amount of energy harvested by the device 705-*a* when receiving the lower priority radio signals 735).

Based on receiving the power ratio update capability 715 from the device 705-*a*, the device 705-*b* may determine to transmit one or more radio signals 735 to the device 705-*a* having a power level that is based on the power ratio update capability 715. For example, the device 705-*b* may increase a transmission power associated with certain (e.g., lower-priority) radio signals 735. In some cases, the device 705-*b* may optionally transmit a power ratio update indication 730 to the device 705-*a*. For example, the device 705-*b* may indicate a power ratio for the device 705-*a* to use when receiving one or more of the radio signals 735. That is, the device 705-*b* may have the capability to turn the energy harvesting on or off at the device 705-*a*, setting the power ratio at the device 705-*a* to a certain value, or a combination thereof. In either case, the device 705-*b* may transmit the power ratio update indication 730 to the device 705-*a* via DCI, SCI, or MAC-CE signaling, or on a semi-static basis through RRC signaling.

In one instance, the device 705-*a* may harvest more energy from radio signals 735 associated with a cyclic prefix (e.g., when compared radio signals 735 not associated with the cyclic prefix). That is, radio signals 735 associated with the cyclic prefix may be lower priority radio signals 735 because the cyclic prefix may be used to manage inter-symbol interference or eliminate interference between different OFDM symbols. Thus, in some cases the device 705-*a* may not decode the cyclic prefix (e.g., because it may appear to be noise to the device 705-*a*, in cases that the device 705-*a* has already detected a cyclic prefix to manage the inter-symbol interference). Therefore, the device 705-*a* may increase the power ratio associated with the energy harvesting circuit 720 to harvest more energy from radio signals 735 associated with the cyclic prefix.

For example, the device 705-*a* may receive a first quantity 'Y' symbols of a radio signal 735 associated with the cyclic prefix using a first power ratio (e.g., where 'Y' may change or be adjustable over time) and then setting the power ratio to 0 after 'Y' symbols. Here, the device 705-*a* may harvest a portion of the cyclic prefix (e.g., from 0 to 'Y−1' symbols) using a certain power ratio. Then the device 705-*a* may decrease the power ratio (e.g., to 0), effectively stopping energy harvesting for the remaining symbols of the cyclic prefix of an OFDM (e.g., beginning with the 'Y' symbol of the cyclic prefix). As a result, the device 705-*a* may harvest less energy from the cyclic prefix after the symbol 'Y.' Here, the device 705-*a* may rely on the remaining portion of the cyclic prefix (e.g., the portion of the cyclic prefix received after the symbol 'Y') for timing purposes, interference management, or a combination thereof. The value of 'Y' may be configured by the device 705-*b*, or the device 705-*a* may suggest a 'Y' value to the device 705-*b*. In some cases, in order to increase the amount of energy harvested from the cyclic prefix, the device 705-*a* may transmit, to the device 705-*b*, a request for a lower subcarrier spacing (SCS) in order to receive a longer cyclic prefix (e.g., a cyclic prefix that spans more resources in the time domain), or the device 705-*a* may transmit (e.g., to the device 705-*b*) a request for a longer cyclic prefix. In both cases, the device 705-*a* may harvest more energy by receiving the cyclic prefix (e.g., when compared to a cyclic prefix with a higher SCS or a shorter duration) as more the device 705-*a* may utilize time to switch between different power ratios while receiving the radio signals 735 associated with the cyclic prefix.

In another instance, the device 705-*a* may harvest more energy from radio signals 735 associated with SSB beams (e.g., when compared radio signals 735 not associated with the SSB beams). That is, the device 705-*a* (or in some cases a group of devices 705-*a*), may have already performed a synchronization procedure with the device 705-*b* (e.g., based on receiving one or more SSB beams from the device 705-*b* previously) and made an initial selection of beams for communicating with the device 705-*b*. Therefore, the device 705-*b* may determine which SSB beams are associated with the device 705-*a* (or group of devices 705-*a* that have already performed the synchronization procedure). Here, the device 705-*b* may increase the transmission power of the SSB beams associated with the device 705-*a* (or group of devices 705-*a*). As a result, the devices 705-*a* may direct more radio frequency energy to the energy harvesting circuit 720 when receiving radio signals 735 associated with the SSB beams (e.g., based on the SSB beam transmissions being transmitted with a higher radio frequency power 750 by the device 705-*b*).

Additionally or alternatively, the device 705-*b* may increase a transmission power of a quantity (e.g., 'Z') of beams of an SSB burst at a certain time. For example, the SSB bursts may occur periodically. Here, the device 705-*b* may increase the power of an SSB burst periodically (e.g., the device 705-*b* may increase the transmission power of every 'K' SSB burst). The device 705-*b* may optionally indicate (e.g., within the power ratio update indication 730), to the device 705-*a*, the periodicity of the 'K' SSB bursts and an amount by which the device 705-*b* may increase the transmission power. Based on receiving the indication, the device 705-*a* may adjust the power ratio according to the increased transmission power. For example, if the device 705-*b* increases the transmission power by two, the device 705-*a* may decrease the power ratio by half in order to compensate.

In another example, since the device 705-*a* may have already performed a synchronization procedure with the device 705-*b*, the device 705-*a* may not decode the primary synchronization signal (PSS) symbol or the secondary synchronization signal (SSS) symbol within an SSB. As a result, the device 705-*b* may increase the transmission power for the PSS and SSS in order for the device 705-*a* to adjust the power ratios used to harvest energy for these channels according to the transmission power increase. Additionally, the device 705-*a* may increase the power ratio when receiving radio signals 735 associated with the SSB (e.g., to receive PSS symbols, to receive SSS symbols) to direct more of the radio frequency energy associated with the radio signals 735 to the energy harvesting circuit 720 (e.g., and less of the radio frequency energy to the signal decoding circuit 725).

In other cases, the device 705-*a* may harvest more energy from radio signals 735 associated with TRS bursts (e.g., when compared radio signals 735 not associated with the TRS bursts). For example, the device 705-*b* may increase the transmission power associated with TRS bursts (or, in some cases, associated with sets of TRS bursts). Additionally or alternatively, the device 705-*a* may increase the power ratio associated with the energy harvesting circuit 720 when receiving radio signals 735 associated with TRS bursts. In some cases, the device 705-*a* may adjust the power ratio based on the transmission power increase (e.g., optionally indicated to the device 705-*a* within the power ratio update indication 730). That is, the device 705-*a* may update loops (e.g., since the TRS burst may be used in loops).

In some other cases, the device 705-*a* may harvest more energy from radio signals 735 associated with CSI-RSs (e.g., when compared radio signals 735 not associated with the CSI-RSs). For example, the device 705-*a* may receive periodic CSI-RSs in cases that the device 705-*a* may not fully decode the CSI-RS (e.g., in low mobility channels). Therefore, the device 705-*b* may increase the transmission power of the periodic CSI-RS in order to allow the device 705-*a* to leverage the periodic CSI-RS for energy harvesting at certain times and across resources or resource sets associated with the periodic CSI-RS. In order for the device 705-*a* to leverage the increased transmission power, the device 705-*b* may indicate (e.g., within the power ratio update indication 730), to the device 705-*a*, an amount by which the transmission power for radio signals 735 associated with the CSI-RS may be increased. Based on the indicated power increase, the device 705-*a* may adjust the power ratio used to harvest energy (e.g., increase the power ratio when receiving radio signals 735 associated with the periodic CSI-RS). In some examples, the device 705-*b* and the device 705-*a* may determine a pattern of power ratios to be used across a set of 'K' periodic CSI-RS occasions within a set of 'J' occasions, where K and J may be configured via control signaling (e.g., RRC, MAC-CE, DCI, SCI, or any combination of control signaling).

In another case, the device 705-*a* may harvest more energy from radio signals 735 associated with DMRSs (e.g., when compared radio signals 735 not associated with the DMRSs). For example, the device 705-*a* may be configured with multiple DMRS symbols (e.g., four), and the device 705-*a* may rely on a subset (e.g., one, two, three) of the multiple DMRS symbols (e.g., in a stationary or low doppler environment. Therefore, the device 705-*a* may partially or fully harvest energy from radio signals 735 associated with DMRS symbols (e.g., after a symbol X of the multiple DMRS symbols, where X may be configured via control signaling such as RRC, MAC-CE, DCI, SCI, or any other control signaling). That is, the device 705-*a* may increase the power ratio when receiving radio signals 735 associated with certain DMRS symbols.

Figure 8:
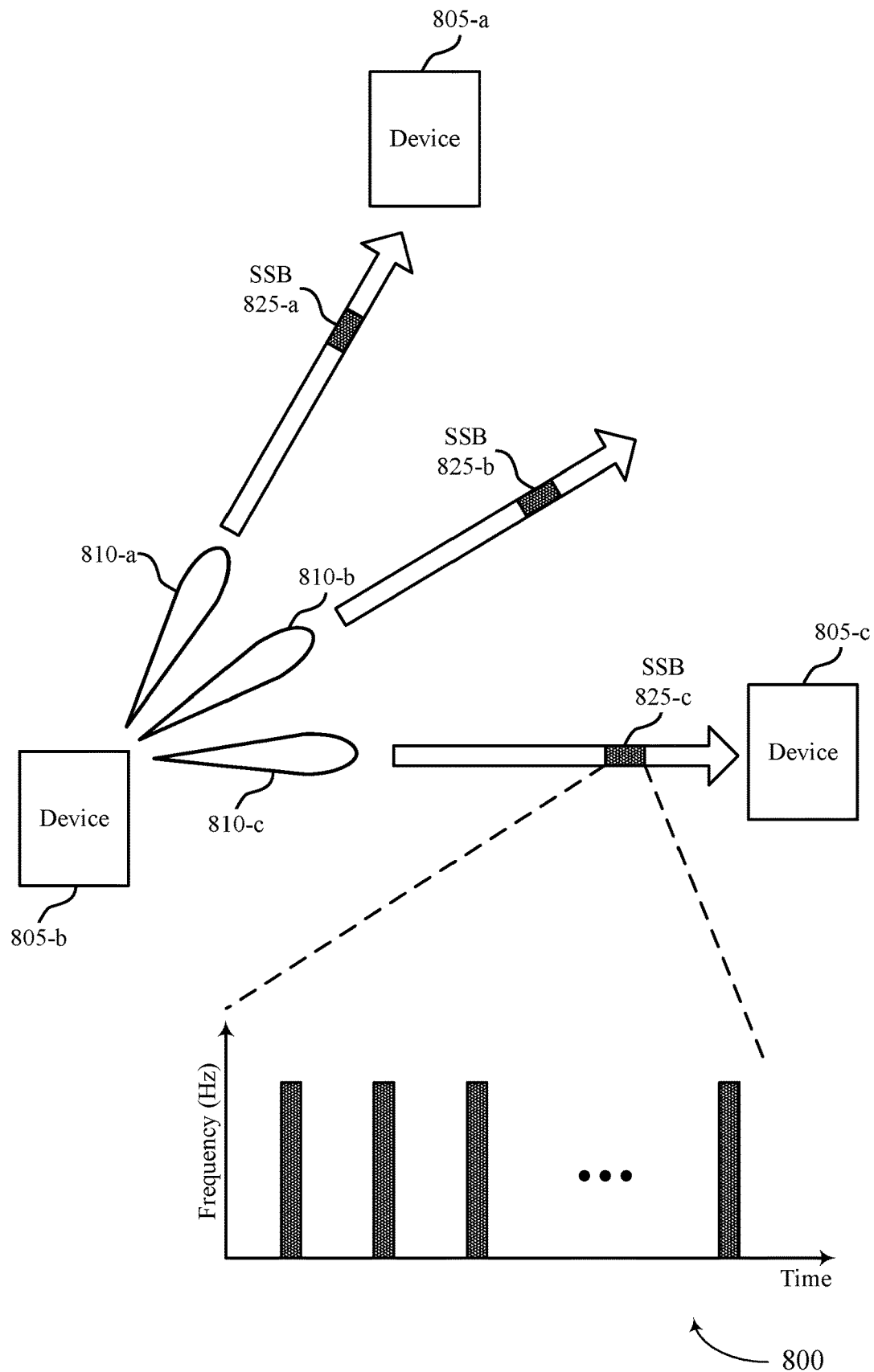

FIG. 8 illustrates an example of a wireless communications system 800 that supports channel reporting for energy harvesting at a device in accordance with one or more aspects of the present disclosure. In some examples, the wireless communications system 800 may implement aspects of the wireless communications system 100 or 700 or may be implemented by aspects of the wireless communications system 100 or 700. For example, the wireless communications system 800 may include devices 805, which may be examples of UEs, base stations, or other devices as described herein. Additionally, the devices 805-*a* and 805-*c* may be examples of the device 705 as described with reference to FIG. 7.

In some examples, one or more of the devices 805 may have the capability to perform energy harvesting. For example, one or more of the devices 805 may include an energy harvesting circuit, a signal decoding circuit, and an energy storage, as described herein. In the wireless communications system 800, the devices 805-*a* and 805-*c* may implement an energy harvesting scheme associated with a power splitting architecture. As such, the device 805-*a* and 805-*c* may utilize a power splitter (e.g., power splitter 430) to split detected radio frequency power associated with a received signal, where the power splitter directs a portion of the detected radio frequency power to the energy harvesting circuit 820 based on a power ratio (e.g., ρ where 0≤ρ≤1 as defined by Equation 4).

In the example of wireless communications system 800, the devices 805-*a* and 805-*c* may have the capability to update the power ratio associated with their energy harvesting circuits. That is, the devices 805-*a* and 805-*c* may direct radio frequency power associated with the SSBs 825 to their energy harvesting circuit according to a first power ratio. Additionally, the devices 805-*a* and 805-*c* may have the capability to update the power ratio and directing radio frequency power associated with the SSBs 825 to their energy harvesting circuits according to the updated power ratio. Additionally, the device 805-*b* may increase a transmission power of one or more of the SSBs 825 based on the capabilities of the devices 805-*a* and 805-*c* to update their power ratios.

The device 805-*b* may transmit SSBs 825 periodically to one or more other devices 805-*a* and 805-*c* via beams 810. For example, the device 805-*a* may receive the SSB 825-*a* via beam 810-*a*. Additionally, the device 805-*c* may receive the SSB 825-*c* via beam 810-*c*. In some cases, the devices 805-*a* and 805-*c* may have already performed a synchronization procedure with the device 805-*b* (e.g., based on receiving one or more SSB beams from the device 805-*b* previously) and made an initial selection of beams for communicating with the device 805-*b*. Therefore, the device 805-*b* may determine which SSB beams are associated with the devices 805-*a* and 805-*c* (e.g., beams 810-*a* and 810-*c*, respectively). Here, the device 805-*b* may increase the transmission power of the beams 810-*a* and 810-*b* (e.g., for SSBs 825-*a* and 825-*c*) associated with the devices 805-*a* and 805-*c*. As a result, the devices 805-*a* and 805-*c* may direct more radio frequency energy to their energy harvesting circuits when receiving SSBs 825 (e.g., based on the SSB beam transmissions being transmitted with a higher radio frequency power by the device 805-*b*).

Additionally or alternatively, the device 805-*b* may increase a transmission power of a quantity (e.g., 'Z') of beams 810 of an SSB burst at a certain time. For example, the SSBs 825 (e.g., bursts) may occur periodically. Here, the device 805-*b* may increase the power of an SSB transmission periodically (e.g., the device 805-*b* may increase the transmission power of every 'K' SSB burst). The device 805-*b* may optionally indicate (e.g., within the power ratio update indication), to the devices 805-*a* and 805-*c*, the periodicity of the 'K' SSBs 825 and an amount by which the device 805-*b* may increase the transmission power. Based on receiving the indication, the devices 805-*a* and 805-*c* may adjust their power ratios according to the increased transmission power. For example, if the device 805-*b* increases the transmission power by two, the device 805-*a* may decrease the power ratio by half in order to compensate.

Figure 9A:
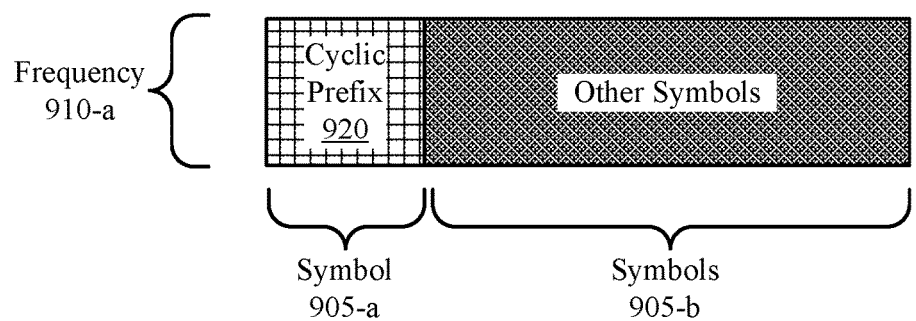
FIGS. 9A and 9B illustrate examples of resource configurations that support channel reporting for energy harvesting at a device in accordance with one or more aspects of the present disclosure.
Figure 9B:
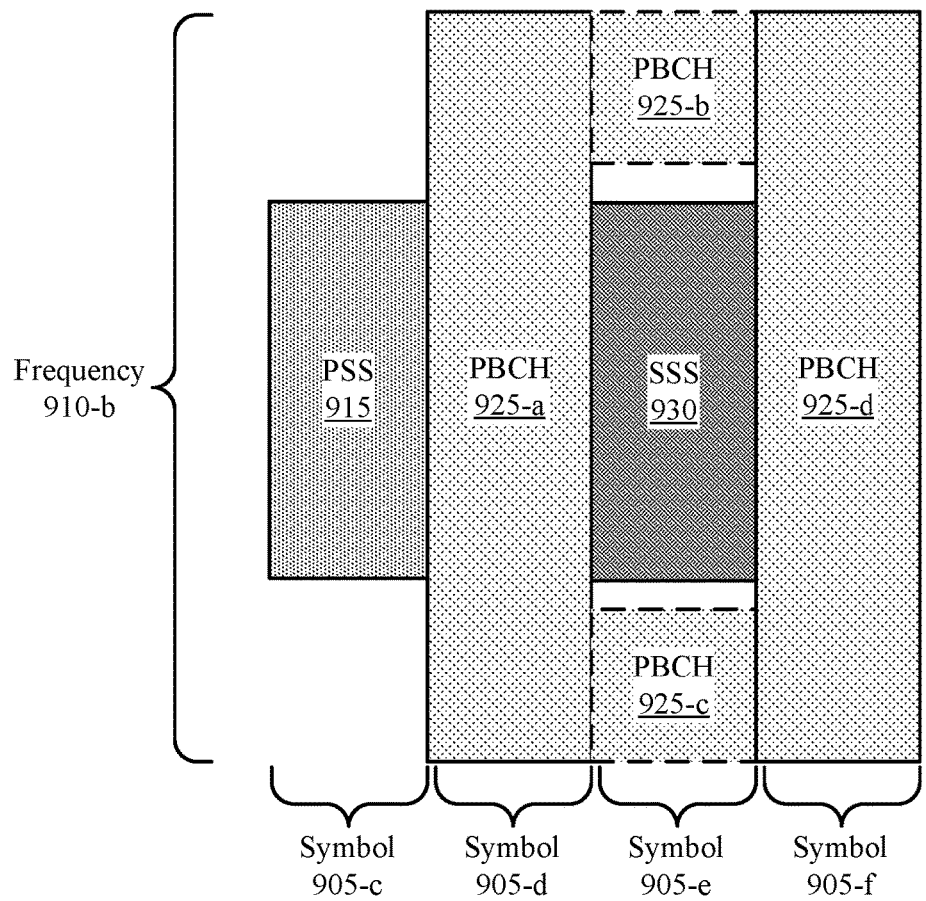

FIGS. 9A and 9B illustrate example resource configurations 900 that supports channel reporting for energy harvesting at a device in accordance with one or more aspects of the present disclosure. For example, the resource configurations 900 may be utilized by devices (e.g., as described herein) that perform energy harvesting (e.g., according to a power splitting architecture) as described with reference to the wireless communications systems illustrated by FIGS. 7 and 8.

For example, a device (e.g., as described with reference to FIGS. 7 and 8) may harvest more energy from certain radio signals (e.g., illustrated within the resource configurations 900) associated with lower priority radio signals. That is, the device may increase the power ratio associated with the energy harvesting circuit when receiving lower priority radio signals. Thus, more of the radio frequency power associated with the lower priority radio signals is directed to the energy harvesting circuit (e.g., and less of the radio frequency power associated with the lower priority radio signals is directed to the signal decoding circuit). In some cases, a transmitting device may additionally increase a transmission power associated with one or more of the lower priority radio signals (e.g., to increase an amount of energy harvested by the receiving device when receiving the lower priority radio signals). Resource configuration 900-*a* may illustrate one or more symbols 905 associated with a cyclic prefix (e.g., which may correspond to a lower priority radio signal). Additionally, resource configuration 900-*b* may illustrate symbols 905 associated with a PSS 915, a physical broadcast channel (PBCH) 925, and an SSS 930. In some instances one or more of the symbols may be associated with a lower priority radio signal.

FIG. 9A illustrates resource configuration 900-*a*, which includes a cyclic prefix 920 and one or more other symbols 905, each spanning a frequency range 910-*a*. In some cases, a device may harvest more energy from the cyclic prefix 920 (e.g., when compared the other symbols 905-*b* not associated with the cyclic prefix 920). That is, the cyclic prefix 920 may be a lower priority because the device may not decode the cyclic prefix 920 (e.g., because it may appear to be noise to the device, because the device has already detected a cyclic prefix 920 to manage the inter-symbol interference). Therefore, the device may increase the power ratio associated with its energy harvesting circuit to harvest more energy the cyclic prefix 920.

FIG. 9B illustrates resource configuration 900-*b*, which includes a PSS 915, a PBCH 925, and an SSS 930, each spanning at least a portion of the frequency range 910-*b* and one or more of the symbols 905-*c*, 905-*d*, 905-*e*, and 905-*f*. In some examples, the resource configuration 900-*b* may illustrate a resource configuration for SSB transmissions as described herein. In some cases, a device may harvest more energy from the PSS 915 or the SSS 930 (e.g., when compared to the PBCH 925). That is, the device may have already performed a synchronization procedure and may therefore not decode the PSS 915 or the SSS 930. As a result, a transmitting device may increase the transmission power for the PSS 915 and SSS 930. Additionally, a receiving device may increase the power ratio when receiving the PSS 915, the SSS 930, or both, to direct more of the radio frequency energy associated with the PSS 915, the SSS 930, or both, to the energy harvesting circuit (e.g., and less of the radio frequency energy to the signal decoding circuit).

Figure 10:
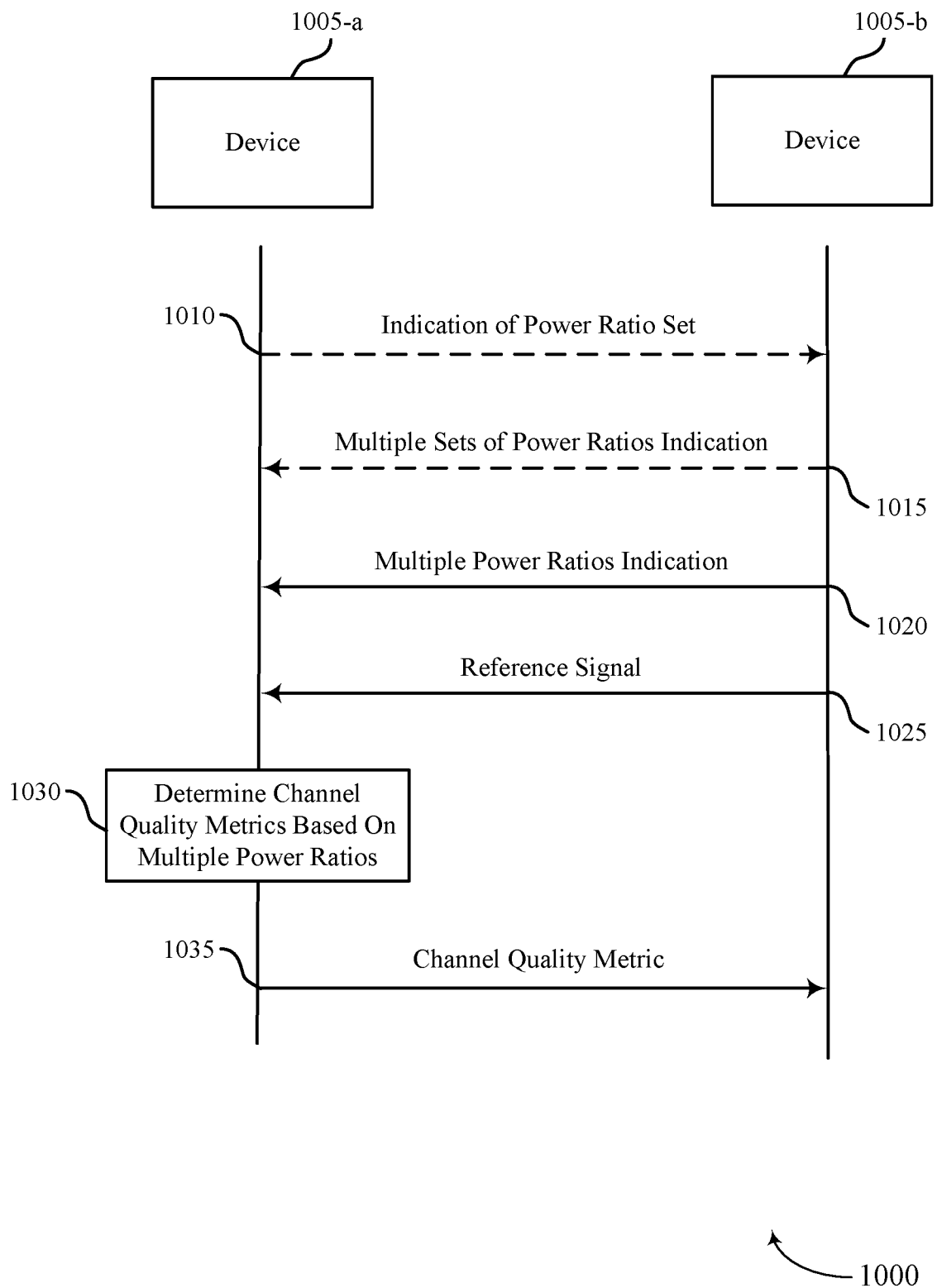
FIGS. 10 through 12 illustrate examples of process flows that support channel reporting for energy harvesting at a device in accordance with one or more aspects of the present disclosure.

FIG. 10 illustrates an example of a process flow 1000 that supports channel reporting for energy harvesting at a device in accordance with one or more aspects of the present disclosure. In some examples, process flow 1000 may implement aspects of the systems 100 and 500 as described with reference to FIGS. 1 and 5. In some cases, process flow 1000 may illustrate a device 1005-*a* configured to perform energy harvesting according to a power splitting architecture that reports channel quality metrics based on multiple power ratios associated with an energy harvesting circuit at the device 1005-*a*. Alternative examples of the following may be implemented, where some processes are performed in a different order than described or are not performed. In some cases, processes may include additional features not mentioned below, or further processes may be added.

At 1010, the device 1005-*a* may optionally transmit, to the device 1005-*b*, an indication of a set of power ratios associated with an energy harvesting circuit at the device 1005-*a*. For example, the device 1005-*a* may indicate the set of possible power ratios associated with the energy harvesting circuit. In some instances, each of the power ratios may indicate a first portion of a radio frequency power associated with signals received by the device 1005-*a* directed to an energy harvesting circuit, a second portion of the radio frequency power associated with the signals received by the device 1005-*a* directed to a signal decoding circuit of the device 1005-*a*, or both.

At 1015, the device 1005-*b* may optionally transmit, to the device 1005-*a*, an indication of multiple sets of power ratios associated with the energy harvesting circuit. For example, the device 1005-*b* may transmit the indication via a MAC-CE, RRC signaling, or a combination thereof indicating multiple possible sets of power ratios.

At 1020, the device 1005-*b* may transmit, to the device 1005-*a*, an indication of multiple power ratios associated with the energy harvesting circuit. In some cases, the device 1005-*b* may transmit the indication of multiple power ratios based on receiving the indication of the set of power ratios from the device 1005-*a* at 1010. For example, the multiple power ratios may be included in the set of power ratios indicated at 1010. In some other cases, the device 1005-*b* may transmit the indication of the multiple power ratios based on transmitting the indication of multiple sets of power ratios to the device 1005-*a* at 1015. For example, the device 1005-*b* may transmit a MAC-CE or DCI (or in the case of sidelink communications, SCI or PSSCH signaling) indicating one of the sets of power ratios to the device 1005-*a*. In some other cases, the device 1005-*b* may transmit an indication of resources associated with a reference signal (e.g., a CSI-RS), where the multiple power ratios are associated with the resources associated with the reference signal.

At 1025, the device 1005-*b* may transmit a reference signal (e.g., a CSI-RS) to the device 1005-*a* based on transmitting the indication of multiple power ratios at 1020.

At 1030, the device 1005-*a* may perform channel estimation procedures (e.g., determining channel metrics based on the received reference signal) using each of the power ratios indicated by the indication received at 1020.

At 1035, the device 1005-*a* may transmit an indication of a respective channel quality metric associated with the reference signal for at least one of the multiple power ratios. For example, the device 1005-*a* may transmit, for each of the multiple power ratios, a first resource indicator (e.g., CRI) associated with first resources of the reference signal having a first channel quality metric that is higher than channel quality metrics associated with remaining resources of the reference signal, a second resource indicator associated with second resources of the reference signal associated with an energy accumulation that is greater than energy accumulation associated with remaining resources of the reference signal, or a combination thereof. In another example, the device 1005-*a* may transmit the channel metric based on the channel quality metric for the at least one of the multiple power ratios being higher than channel quality metrics for the remaining of the multiple power ratios.

Figure 11:
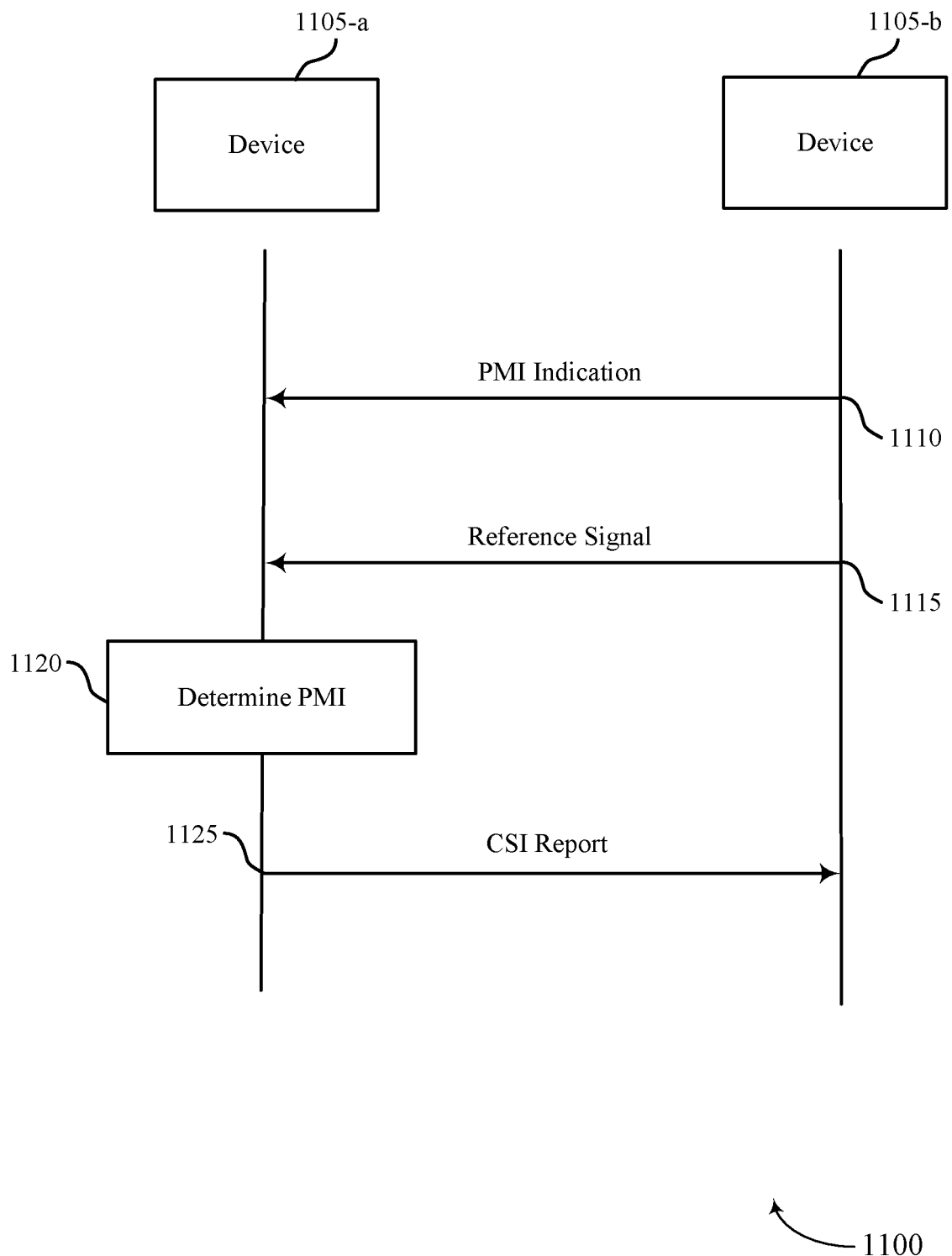

FIG. 11 illustrates an example of a process flow 1100 that supports channel reporting for energy harvesting at a device in accordance with one or more aspects of the present disclosure. In some examples, process flow 1100 may implement aspects of the systems 100 and 600 as described with reference to FIGS. 1 and 6. In some cases, process flow 1100 may illustrate a device 1105-*a* configured to perform energy harvesting according to a time switching architecture that transmits a CSI report based on applying one or more of a PMI based on energy harvesting and a PMI based on signal decoding to a reference signal received from the device 1105-*b*. Alternative examples of the following may be implemented, where some processes are performed in a different order than described or are not performed. In some cases, processes may include additional features not mentioned below, or further processes may be added.

At 1110, the device 1105-*b* may transmit, to the device 1105-*a*, an indication associated with a PMI for a CSI report that is based on one or more of an energy accumulation associated with the PMI (e.g., an energy harvesting procedure) and a signal quality associated with the PMI (e.g., a signal decoding procedure). In some cases, the device 1105-*b* may transmit the indication via a MAC-CE or RRC signaling. Additionally or alternatively, the device 1105-*a* may indicate whether the CSI report that is based on one or more of an energy accumulation associated with the PMI (e.g., an energy harvesting procedure) and a signal quality associated with the PMI (e.g., a signal decoding procedure) based on resources corresponding to the reference signal (e.g., transmitted at 1115). Here, the device 1105-*b* may transmit the indication of the PMI by indicating resources associated with the reference signal to the device 1105-*a*.

At 1115, the device 1105-*b* may transmit a reference signal (e.g., a CSI-RS) for the CSI report to the device 1105-*a* (e.g., based on transmitting the indication at 1110).

At 1120, the device 1105-*a* may determine, in accordance with the indication, the PMI based on one or more of the energy accumulation associated with applying the PMI to the reference signal and the signal quality associated with applying the PMI to the reference signal. For example, if the indication indicates that the PMI for the CSI report is based on energy accumulation, the device 1005-*a* may determine the PMI by determining the PMI that yields a highest energy accumulation when applying the determined PMI to the reference signal received at 1115. In another example, if the indication indicates that the PMI for the CSI report is based on signal quality, the device 1005-*a* may determine the PMI by determining the PMI that yields a the highest signal quality metrics when applying the determined PMI to the reference signal received at 1115.

At 1125, the device 1105-*a* may transmit, to the device 1105-*b*, the CSI report indicating the PMI based on the determining (e.g., at 1120).

Figure 12:
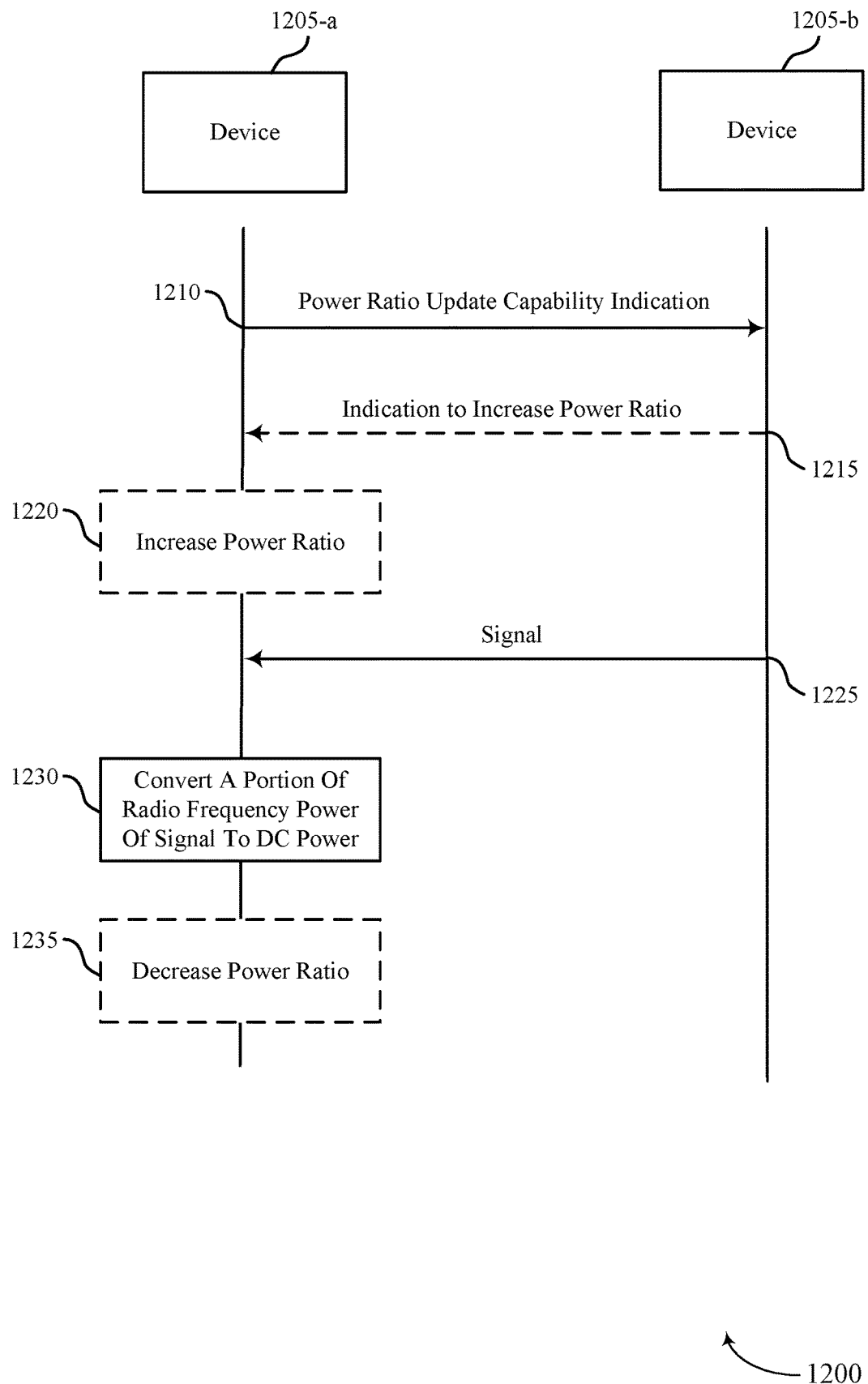

FIG. 12 illustrates an example of a process flow 1200 that supports channel reporting for energy harvesting at a device in accordance with one or more aspects of the present disclosure. In some examples, process flow 1200 may implement aspects of the systems 100 and 700 as described with reference to FIGS. 1 and 7. In some cases, process flow 1200 may illustrate a device 1205-*a* configured to perform energy harvesting according to a power splitting architecture that adjusts a power ratio associated with an energy harvesting circuit while communicating with a device 1205-*b*. Alternative examples of the following may be implemented, where some processes are performed in a different order than described or are not performed. In some cases, processes may include additional features not mentioned below, or further processes may be added.

At 1210, the device 1205-*a* may transmit, to the device 1205-*b*, a capability of the device 1205-*a* to update a power ratio associated with an energy harvesting circuit at the device 1205-*a*. For example, the device 1205-*a* may indicate a time associated with updating the power ratio associated with the energy harvesting, a second indication of a set of possible power ratios associated with the energy harvesting, or a combination thereof.

At 1215, the device 1205-*b* may optionally transmit, to the device 1205-*b* based on receiving the capability at 1210, an indication for the device 1205-*a* to increase the power ratio associated with the energy harvesting to an updated power ratio (e.g., via RRC signaling, a MAC-CE, control information, or a combination thereof).

As 1220, the device 1205-*a* may optionally increase the power ratio associated with the energy harvesting to the updated power ratio (e.g., based on transmitting the capability at 1210). For example, the device 1205-*a* may increase the power ratio associated with the energy harvesting circuit to receive a resources associated with a cyclic prefix, a synchronization signal, a TRS, a CSI-RS, a DMRS, or a combination thereof.

At 1225, the device 1205-*b* may transmit a signal having a radio frequency power that is based on the capability of the device 1205-*a* to update the power ratio associated with the energy harvesting. For example, the device 1205-*b* may increase a radio frequency power associated with a portion of the radio frequency power based on the capability of the device 1205-*a* to update the power ratio. In some cases, the device 1205-*b* may increase a radio frequency power associated with portions of the signal associated with a synchronization signal, a TRS, a CSI-RS, a DMRS, or a combination thereof.

At 1230, the device 1205-*a* may convert, by the energy harvesting circuit at the device 1205-*a*, a portion of the radio frequency power according to the updated power ratio of the energy harvesting circuit to DC power.

At 1235, the device 1205-*a* may optionally decrease the power ratio associated with the energy harvesting circuit from the updated power ratio (e.g., based on receiving at least a portion of the signal at 1225). For example, the device 1205-*a* may decrease the power ratio after receiving a portion of the signal associated with the cyclic prefix, the synchronization signal, the TRS, the CSI-RS, the DMRS, or a combination thereof.

Figure 13:
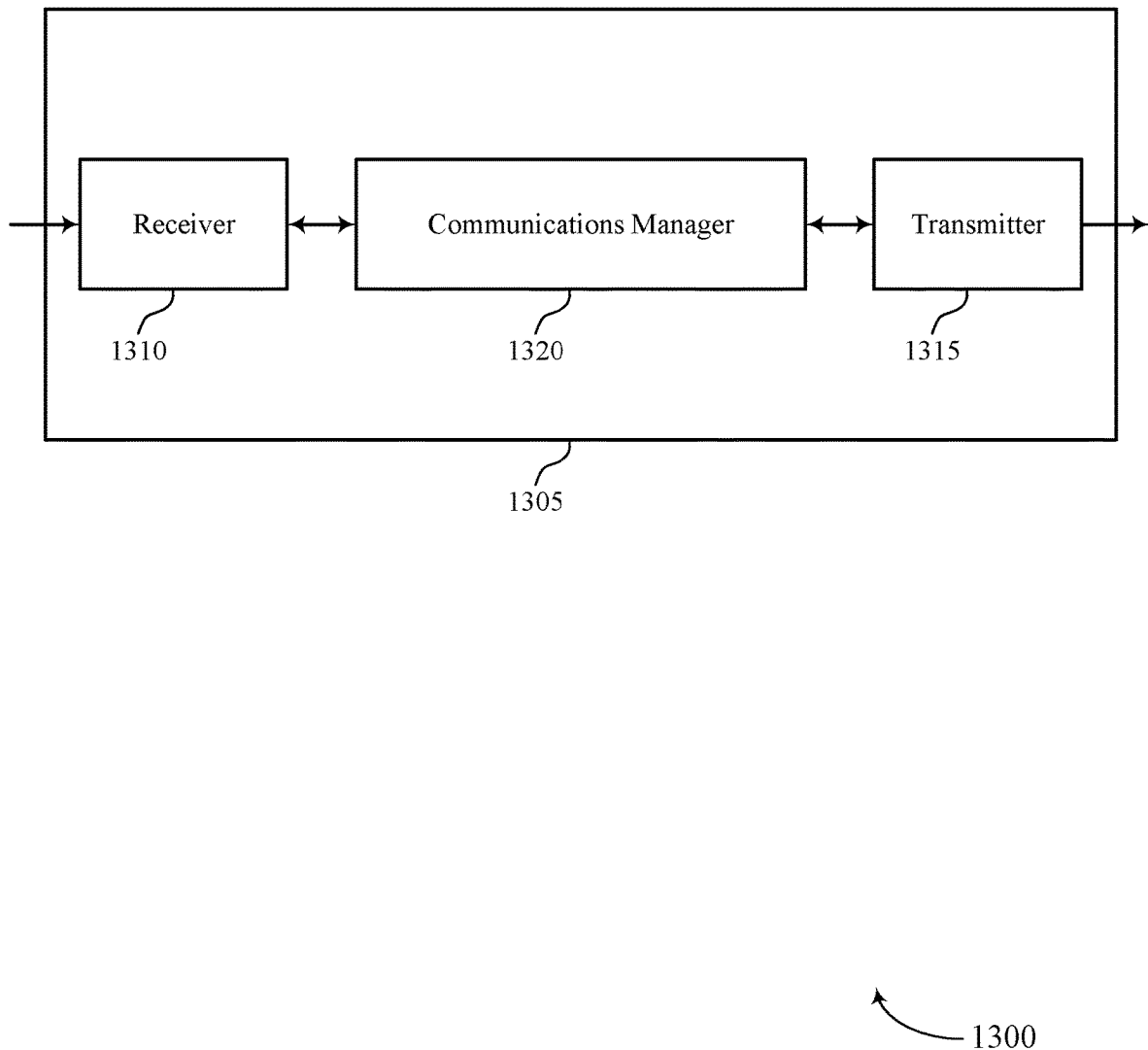
FIGS. 13 and 14 show block diagrams of devices that support channel reporting for energy harvesting at a device in accordance with one or more aspects of the present disclosure.

FIG. 13 shows a block diagram 1300 of a device 1305 that supports channel reporting for energy harvesting at a device in accordance with one or more aspects of the present disclosure. The device 1305 may be an example of aspects of a device as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to channel reporting for energy harvesting at a device). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to channel reporting for energy harvesting at a device). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of channel reporting for energy harvesting at a device as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a digital signal processor (DSP), an ASIC, a field programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a first device in accordance with examples as disclosed herein. For example, the communications manager 1320 may be configured as or otherwise support a means for receiving, from a second device, a first indication of multiple power ratios associated with energy harvesting at the first device. The communications manager 1320 may be configured as or otherwise support a means for receiving a reference signal from the second device based on receiving the first indication of the multiple power ratios. The communications manager 1320 may be configured as or otherwise support a means for transmitting, to the second device, a second indication of a channel quality metric associated with the reference signal for at least one of the multiple power ratios.

Additionally or alternatively, the communications manager 1320 may support wireless communication at a first device in accordance with examples as disclosed herein. For example, the communications manager 1320 may be configured as or otherwise support a means for receiving, from a second device, an indication associated with a PMI for a CSI report that is based on one or more of an energy accumulation associated with the PMI or a signal quality associated with the PMI. The communications manager 1320 may be configured as or otherwise support a means for receiving, from the second device, a reference signal for the CSI report. The communications manager 1320 may be configured as or otherwise support a means for determining, in accordance with the indication, the PMI based on one or more of the energy accumulation associated with applying the PMI to the reference signal and the signal quality associated with applying the PMI to the reference signal. The communications manager 1320 may be configured as or otherwise support a means for transmitting, to the second device, the CSI report indicating the PMI based on the determining.

Additionally or alternatively, the communications manager 1320 may support wireless communication at a first device in accordance with examples as disclosed herein. For example, the communications manager 1320 may be configured as or otherwise support a means for transmitting, to a second device, a capability of the first device to update a power ratio associated with energy harvesting at the first device. The communications manager 1320 may be configured as or otherwise support a means for receiving, from the second device, a signal having a radio frequency power that is based on the capability of the first device to update the power ratio associated with the energy harvesting. The communications manager 1320 may be configured as or otherwise support a means for converting a portion of the radio frequency power according to an updated power ratio of the energy harvesting to DC power.

Additionally or alternatively, the communications manager 1320 may support wireless communication at a first device in accordance with examples as disclosed herein. For example, the communications manager 1320 may be configured as or otherwise support a means for receiving, from a second device, a capability of the second device to update a power ratio associated with energy harvesting at the second device by converting radio frequency power to DC power. The communications manager 1320 may be configured as or otherwise support a means for transmitting, to the second device, a signal having a radio frequency power that is based on the capability of the second device to update the power ratio associated with the energy harvesting.

By including or configuring the communications manager 1320 in accordance with examples as described herein, the device 1305 (e.g., a processor controlling or otherwise coupled to the receiver 1310, the transmitter 1315, the communications manager 1320, or a combination thereof) may support techniques for more efficient use of radio frequency energy at devices configured to perform energy harvesting.

Figure 14:
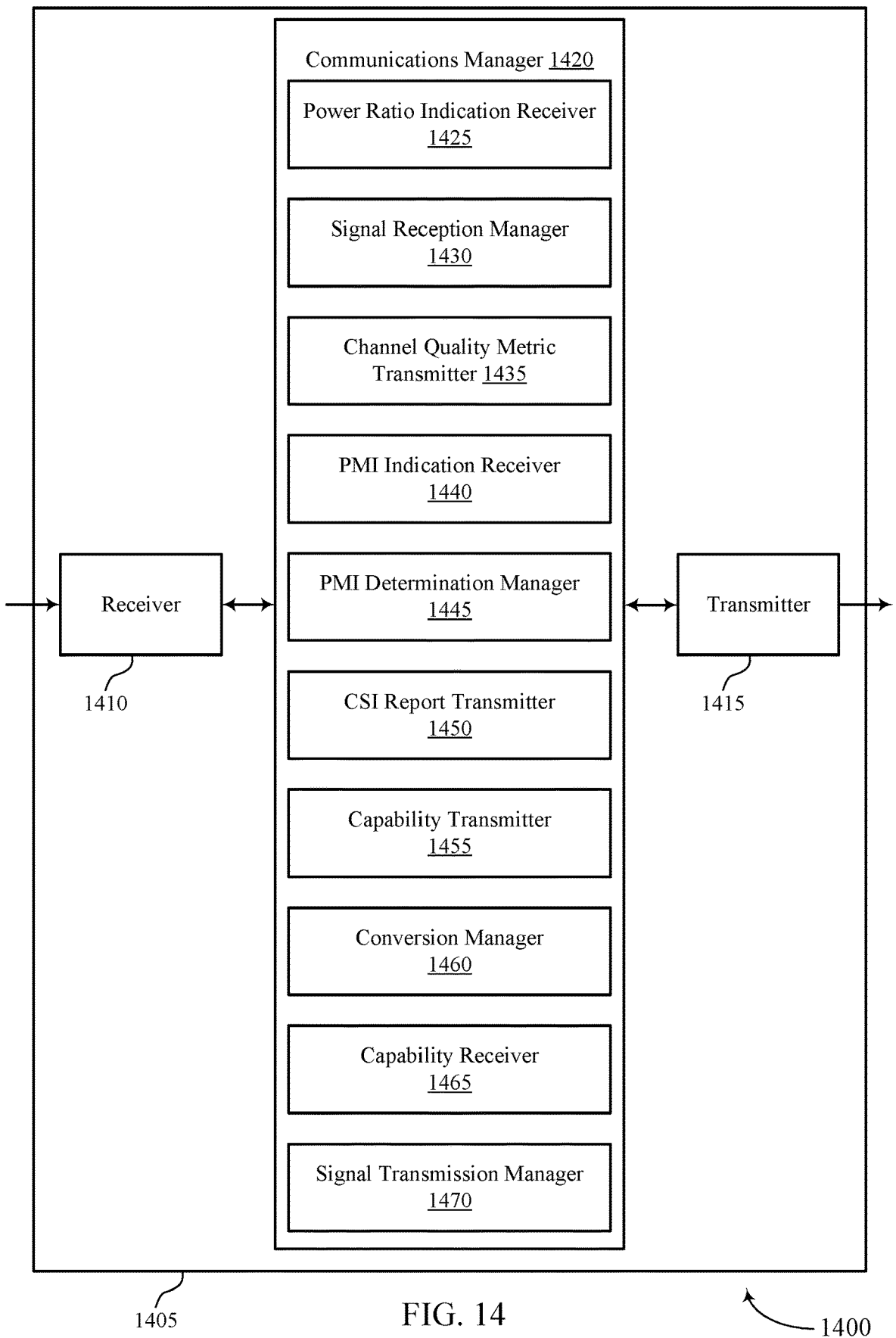

FIG. 14 shows a block diagram 1400 of a device 1405 that supports channel reporting for energy harvesting at a device in accordance with one or more aspects of the present disclosure. The device 1405 may be an example of aspects of a device 1305 or a device as described herein. The device 1405 may include a receiver 1410, a transmitter 1415, and a communications manager 1420. The device 1405 may also include a processor. Each of these components may be in communication with one another (e.g., via one or more buses).

The receiver 1410 may provide a means for receiving information such as packets, user data, control information, or any combination thereof associated with various information channels (e.g., control channels, data channels, information channels related to channel reporting for energy harvesting at a device). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to channel reporting for energy harvesting at a device). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of channel reporting for energy harvesting at a device as described herein. For example, the communications manager 1420 may include a power ratio indication receiver 1425, a signal reception manager 1430, a channel quality metric transmitter 1435, a PMI indication receiver 1440, a PMI determination manager 1445, a CSI report transmitter 1450, a capability transmitter 1455, a conversion manager 1460, a capability receiver 1465, a signal transmission manager 1470, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a first device in accordance with examples as disclosed herein. The power ratio indication receiver 1425 may be configured as or otherwise support a means for receiving, from a second device, a first indication of multiple power ratios associated with energy harvesting at the first device. The signal reception manager 1430 may be configured as or otherwise support a means for receiving a reference signal from the second device based on receiving the first indication of the multiple power ratios. The channel quality metric transmitter 1435 may be configured as or otherwise support a means for transmitting, to the second device, a second indication of a channel quality metric associated with the reference signal for at least one of the multiple power ratios.

Additionally or alternatively, the communications manager 1420 may support wireless communication at a first device in accordance with examples as disclosed herein. The PMI indication receiver 1440 may be configured as or otherwise support a means for receiving, from a second device, an indication associated with a PMI for a CSI report that is based on one or more of an energy accumulation associated with the PMI or a signal quality associated with the PMI. The signal reception manager 1430 may be configured as or otherwise support a means for receiving, from the second device, a reference signal for the CSI report. The PMI determination manager 1445 may be configured as or otherwise support a means for determining, in accordance with the indication, the PMI based on one or more of the energy accumulation associated with applying the PMI to the reference signal and the signal quality associated with applying the PMI to the reference signal. The CSI report transmitter 1450 may be configured as or otherwise support a means for transmitting, to the second device, the CSI report indicating the PMI based on the determining.

Additionally or alternatively, the communications manager 1420 may support wireless communication at a first device in accordance with examples as disclosed herein. The capability transmitter 1455 may be configured as or otherwise support a means for transmitting, to a second device, a capability of the first device to update a power ratio associated with energy harvesting at the first device. The signal reception manager 1430 may be configured as or otherwise support a means for receiving, from the second device, a signal having a radio frequency power that is based on the capability of the first device to update the power ratio associated with the energy harvesting. The conversion manager 1460 may be configured as or otherwise support a means for converting a portion of the radio frequency power according to an updated power ratio of the energy harvesting to DC power.

Additionally or alternatively, the communications manager 1420 may support wireless communication at a first device in accordance with examples as disclosed herein. The capability receiver 1465 may be configured as or otherwise support a means for receiving, from a second device, a capability of the second device to update a power ratio associated with energy harvesting at the second device by converting radio frequency power to DC power. The signal transmission manager 1470 may be configured as or otherwise support a means for transmitting, to the second device, a signal having a radio frequency power that is based on the capability of the second device to update the power ratio associated with the energy harvesting.

Figure 15:
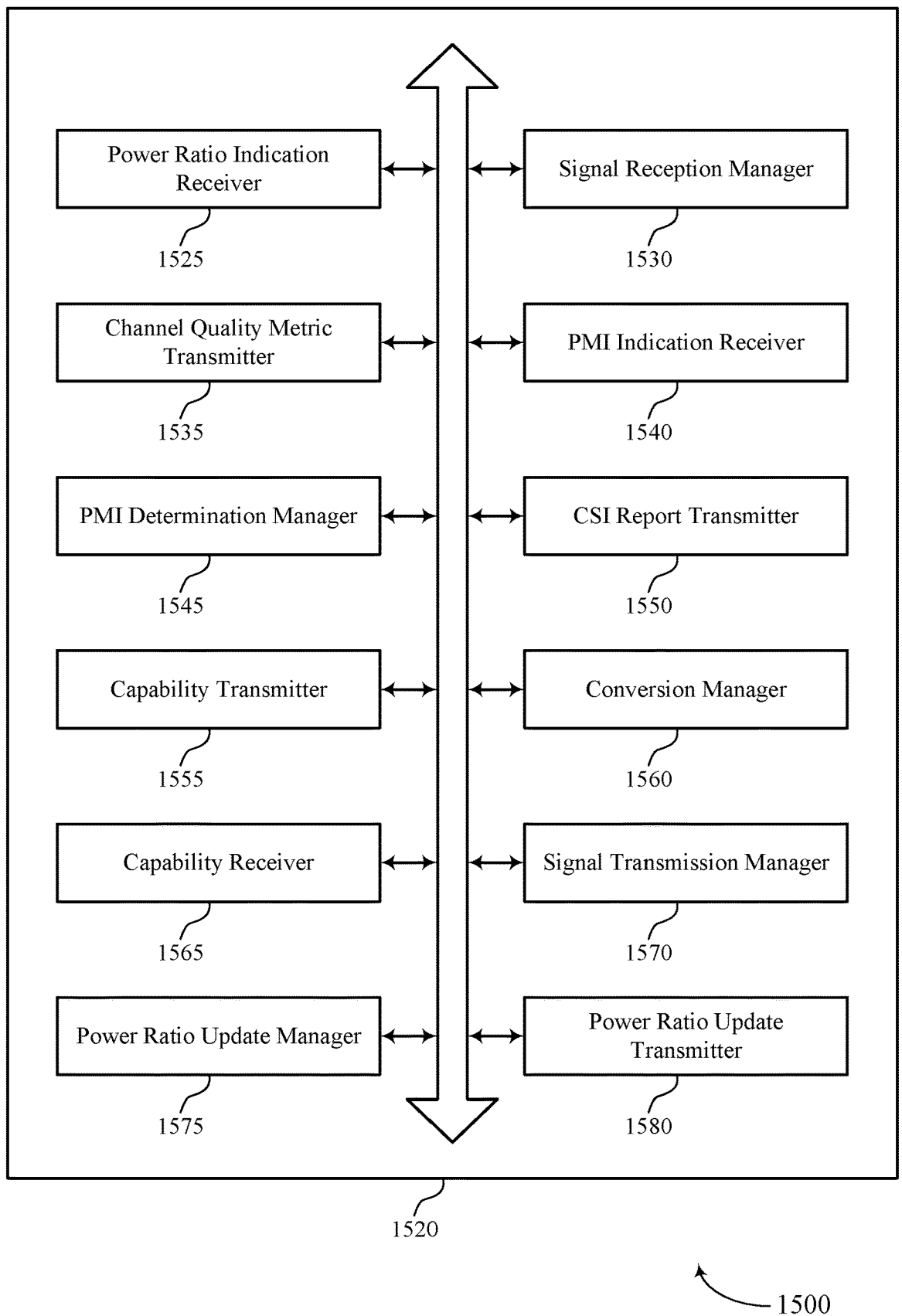
FIG. 15 shows a block diagram of a communications manager that supports channel reporting for energy harvesting at a device in accordance with one or more aspects of the present disclosure.

FIG. 15 shows a block diagram 1500 of a communications manager 1520 that supports channel reporting for energy harvesting at a device in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of channel reporting for energy harvesting at a device as described herein. For example, the communications manager 1520 may include a power ratio indication receiver 1525, a signal reception manager 1530, a channel quality metric transmitter 1535, a PMI indication receiver 1540, a PMI determination manager 1545, a CSI report transmitter 1550, a capability transmitter 1555, a conversion manager 1560, a capability receiver 1565, a signal transmission manager 1570, a power ratio update manager 1575, a power ratio update transmitter 1580, or any combination thereof. Each of these components may communicate, directly or indirectly, with one another (e.g., via one or more buses).

The communications manager 1520 may support wireless communication at a first device in accordance with examples as disclosed herein. The power ratio indication receiver 1525 may be configured as or otherwise support a means for receiving, from a second device, a first indication of multiple power ratios associated with energy harvesting at the first device. The signal reception manager 1530 may be configured as or otherwise support a means for receiving a reference signal from the second device based on receiving the first indication of the multiple power ratios. The channel quality metric transmitter 1535 may be configured as or otherwise support a means for transmitting, to the second device, a second indication of a channel quality metric associated with the reference signal for at least one of the multiple power ratios.

In some examples, the power ratio indication receiver 1525 may be configured as or otherwise support a means for transmitting, to the second device, a third indication of a set of power ratios associated with the energy harvesting, the receiving the first indication of the multiple power ratios based on transmitting the third indication.

In some examples, the power ratio indication receiver 1525 may be configured as or otherwise support a means for receiving, from the second device, a third indication of multiple sets of power ratios associated with the energy harvesting, the receiving the first indication of the multiple power ratios including. In some examples the power ratio indication receiver 1525 may be configured as or otherwise support a means for receiving the first indication of one set of the multiple sets of power ratios, the one set including the multiple power ratios.

In some examples, the power ratio indication receiver 1525 may be configured as or otherwise support a means for receiving the third indication via a MAC-CE, RRC signaling, or a combination thereof.

In some examples, the power ratio indication receiver 1525 may be configured as or otherwise support a means for receiving the first indication via a RRC signaling, a MAC-CE, control information, or a combination thereof.

In some examples, the power ratio indication receiver 1525 may be configured as or otherwise support a means for receiving the first indication of resources corresponding to the reference signal, the multiple power ratios associated with the resources corresponding to the reference signal.

In some examples, the channel quality metric transmitter 1535 may be configured as or otherwise support a means for transmitting, for each of the multiple power ratios, a first resource indicator associated with first resources of the reference signal having a first channel quality metric that is higher than channel quality metrics associated with remaining resources of the reference signal, a second resource indicator associated with second resources of the reference signal associated with an energy accumulation that is greater than energy accumulation associated with remaining resources of the reference signal, or a combination thereof, where the first channel quality metric or the second channel quality metric is the channel quality metric.

In some examples, the channel quality metric transmitter 1535 may be configured as or otherwise support a means for transmitting the second indication based on the channel quality metric for the at least one of the multiple power ratios being higher than channel quality metrics for the remaining of the multiple power ratios.

In some examples, the at least one of the multiple power ratios includes a first power ratio. In some examples, the first power ratio is associated with the channel quality metric that is higher than channel quality metrics associated with remaining power ratios of the multiple power ratios associated with one or more remaining of the multiple power ratios, an energy harvesting that is greater than the remaining power ratios, or a combination thereof.

In some examples, each of the multiple power ratios indicates a first portion of a radio frequency power associated with received signals directed to an energy harvesting circuit, a second portion of the radio frequency power associated with the received signals directed to a signal decoding circuit of the first device, or both.

Additionally or alternatively, the communications manager 1520 may support wireless communication at a first device in accordance with examples as disclosed herein. The PMI indication receiver 1540 may be configured as or otherwise support a means for receiving, from a second device, an indication associated with a PMI for a CSI report that is based on one or more of an energy accumulation associated with the PMI or a signal quality associated with the PMI. In some examples, the signal reception manager 1530 may be configured as or otherwise support a means for receiving, from the second device, a reference signal for the CSI report. The PMI determination manager 1545 may be configured as or otherwise support a means for determining, in accordance with the indication, the PMI based on one or more of the energy accumulation associated with applying the PMI to the reference signal and the signal quality associated with applying the PMI to the reference signal. The CSI report transmitter 1550 may be configured as or otherwise support a means for transmitting, to the second device, the CSI report indicating the PMI based on the determining.

In some examples, the PMI indication receiver 1540 may be configured as or otherwise support a means for receiving a MAC-CE or RRC signaling indicating that the PMI for the CSI report is based on the energy accumulation associated with the PMI, the signal quality associated with the PMI, or both.

In some examples, the PMI indication receiver 1540 may be configured as or otherwise support a means for receiving the indication of resources corresponding to the reference signal, the PMI for the CSI report being based on the energy accumulation associated with the PMI, the signal quality associated with the PMI, or both based on the resources corresponding to the reference signal.

In some examples, the indication associated with the PMI indicates that the PMI for the CSI report is based on the energy accumulation associated with the PMI. In some examples, determining the PMI includes determining the PMI based on the energy accumulation associated with applying the PMI to the reference signal.

In some examples, the indication associated with the PMI indicates that the PMI for the CSI report is based on the signal quality associated with the PMI. In some examples, determining the PMI includes determining the PMI based on the signal quality associated with applying the PMI to the reference signal.

In some examples, the PMI determination manager 1545 may be configured as or otherwise support a means for determining a first PMI based on the energy accumulation associated with applying the first PMI to the reference signal. In some examples, the PMI determination manager 1545 may be configured as or otherwise support a means for determining a second PMI based on the signal quality associated with applying the PMI to the reference signal, the CSI report indicating the first PMI, the second PMI, or both.

Additionally or alternatively, the communications manager 1520 may support wireless communication at a first device in accordance with examples as disclosed herein. The capability transmitter 1555 may be configured as or otherwise support a means for transmitting, to a second device, a capability of the first device to update a power ratio associated with energy harvesting at the first device. In some examples, the signal reception manager 1530 may be configured as or otherwise support a means for receiving, from the second device, a signal having a radio frequency power that is based on the capability of the first device to update the power ratio associated with the energy harvesting. The conversion manager 1560 may be configured as or otherwise support a means for converting a portion of the radio frequency power according to an updated power ratio of the energy harvesting to DC power.

In some examples, the power ratio update manager 1575 may be configured as or otherwise support a means for receiving, from the second device based on the transmitting, an indication to increase the power ratio associated with the energy harvesting to the updated power ratio, the receiving the signal based on receiving the indication.

In some examples, the power ratio update manager 1575 may be configured as or otherwise support a means for increasing, based on the transmitting, the power ratio associated with the energy harvesting to the updated power ratio, the receiving the signal having the radio frequency power based on the increasing. In some examples, the power ratio update manager 1575 may be configured as or otherwise support a means for decreasing the updated power ratio of the energy harvesting to a decreased power ratio based at least in part receiving at least a portion of the signal.

In some examples, the signal reception manager 1530 may be configured as or otherwise support a means for receiving a first portion of the signal via first resources associated with a cyclic prefix while the energy harvesting is associated with the updated power ratio. In some examples, the signal reception manager 1530 may be configured as or otherwise support a means for receiving a second portion of the signal via second resources associated with data while the energy harvesting is associated with the decreased power ratio.

In some examples, the signal reception manager 1530 may be configured as or otherwise support a means for receiving a first portion of the signal corresponding to a synchronization signal while the energy harvesting is associated with the updated power ratio. In some examples, the signal reception manager 1530 may be configured as or otherwise support a means for receiving a second portion of the signal corresponding to a control channel while the energy harvesting is associated with the decreased power ratio.

In some examples, the capability of the first device to update the power ratio includes a first indication of a time associated with updating the power ratio associated with the energy harvesting, a second indication of a set of possible power ratios associated with the energy harvesting, or a combination thereof.

In some examples, the signal includes a synchronization signal, a TRS, a CSI-RS, a DMRS, or a combination thereof.

In some examples, the updated power ratio indicates the portion of the radio frequency power directed to an energy harvesting circuit, a second portion of the radio frequency power directed to a signal decoding circuit of the first device, or both.

Additionally or alternatively, the communications manager 1520 may support wireless communication at a first device in accordance with examples as disclosed herein. The capability receiver 1565 may be configured as or otherwise support a means for receiving, from a second device, a capability of the second device to update a power ratio associated with energy harvesting at the second device by converting radio frequency power to DC power. The signal transmission manager 1570 may be configured as or otherwise support a means for transmitting, to the second device, a signal having a radio frequency power that is based on the capability of the second device to update the power ratio associated with the energy harvesting.

In some examples, the power ratio update transmitter 1580 may be configured as or otherwise support a means for transmitting, to the second device based on the receiving, an indication to increase the power ratio associated with the energy harvesting to an updated power ratio, the transmitting the signal based on transmitting the indication.

In some examples, transmitting the indication includes transmitting the indication via RRC signaling, a MAC-CE, control information, or a combination thereof.

In some examples, the capability of the second device to update the power ratio includes a first indication of a time associated with updating the power ratio associated with the energy harvesting, a second indication of a set of possible power ratios associated with the energy harvesting, or a combination thereof.

In some examples, the signal transmission manager 1570 may be configured as or otherwise support a means for transmitting the signal via a set of synchronization beams, where a first transmission power of one or more synchronization beams from the set that are associated with transmissions to the second device is greater than a second transmission power of one or more remaining synchronization beams from the set.

In some examples, the signal includes a synchronization signal, a TRS, a CSI-RS, a DMRS, or a combination thereof.

Figure 16:
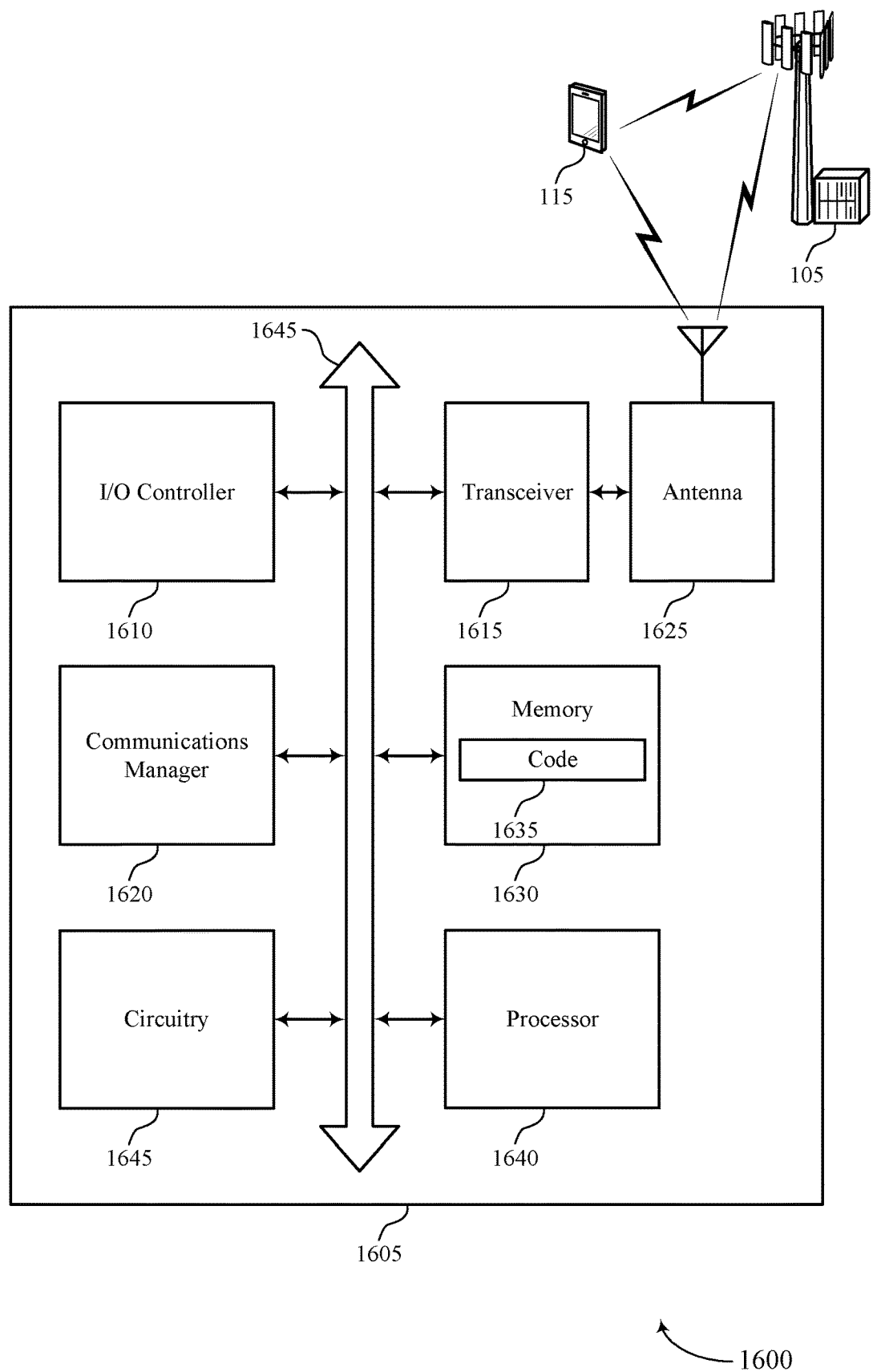
FIG. 16 shows a diagram of a system including a device that supports channel reporting for energy harvesting at a device in accordance with one or more aspects of the present disclosure.

FIG. 16 shows a diagram of a system 1600 including a device 1605 that supports channel reporting for energy harvesting at a device in accordance with one or more aspects of the present disclosure. The device 1605 may be an example of or include the components of a device 1305, a device 1405, or a device as described herein. The device 1605 may include components for bi-directional voice and data communications including components for transmitting and receiving communications, such as a communications manager 1620, an I/O controller 1610, a transceiver 1615, an antenna 1625, a memory 1630, code 1635, and a processor 1640. These components may be in electronic communication or otherwise coupled (e.g., operatively, communicatively, functionally, electronically, electrically) via one or more buses (e.g., a bus 1645).

The I/O controller 1610 may manage input and output signals for the device 1605. The I/O controller 1610 may also manage peripherals not integrated into the device 1605. In some cases, the I/O controller 1610 may represent a physical connection or port to an external peripheral. In some cases, the I/O controller 1610 may utilize an operating system such as iOS®, ANDROID®, MS-DOS®, MS-WINDOWS®, OS/2®, UNIX®, LINUX®, or another known operating system. Additionally or alternatively, the I/O controller 1610 may represent or interact with a modem, a keyboard, a mouse, a touchscreen, or a similar device. In some cases, the I/O controller 1610 may be implemented as part of a processor, such as the processor 1640. In some cases, a user may interact with the device 1605 via the I/O controller 1610 or via hardware components controlled by the I/O controller 1610.

In some cases, the device 1605 may include a single antenna 1625. However, in some other cases, the device 1605 may have more than one antenna 1625, which may have the capability to concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

In some configurations, device 1605 may have circuitry 1645 which may be associated with energy harvesting at device 1605. For example, circuitry 1645 may be (or may include) an energy harvesting circuit such as energy harvesting circuit as described herein. In another example, circuitry 1645 may be (or may include) a signal decoding circuit as described herein. Additionally, circuitry 1645 may include or may support function (or a means of function) the circuitry as described with reference to FIG. 2.

The memory 1630 may include random access memory (RAM) and read-only memory (ROM). The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a basic input/output system (BIOS) which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting channel reporting for energy harvesting at a device). For example, the device 1605 or a component of the device 1605 may include a processor 1640 and memory 1630 coupled to the processor 1640, the processor 1640 and memory 1630 configured to perform various functions described herein.

The communications manager 1620 may support wireless communication at a first device in accordance with examples as disclosed herein. For example, the communications manager 1620 may be configured as or otherwise support a means for receiving, from a second device, a first indication of multiple power ratios associated with energy harvesting at the first device. The communications manager 1620 may be configured as or otherwise support a means for receiving a reference signal from the second device based on receiving the first indication of the multiple power ratios. The communications manager 1620 may be configured as or otherwise support a means for transmitting, to the second device, a second indication of a channel quality metric associated with the reference signal for at least one of the multiple power ratios.

Additionally or alternatively, the communications manager 1620 may support wireless communication at a first device in accordance with examples as disclosed herein. For example, the communications manager 1620 may be configured as or otherwise support a means for receiving, from a second device, an indication associated with a PMI for a CSI report that is based on one or more of an energy accumulation associated with the PMI or a signal quality associated with the PMI. The communications manager 1620 may be configured as or otherwise support a means for receiving, from the second device, a reference signal for the CSI report. The communications manager 1620 may be configured as or otherwise support a means for determining, in accordance with the indication, the PMI based on one or more of the energy accumulation associated with applying the PMI to the reference signal and the signal quality associated with applying the PMI to the reference signal. The communications manager 1620 may be configured as or otherwise support a means for transmitting, to the second device, the CSI report indicating the PMI based on the determining.

Additionally or alternatively, the communications manager 1620 may support wireless communication at a first device in accordance with examples as disclosed herein. For example, the communications manager 1620 may be configured as or otherwise support a means for transmitting, to a second device, a capability of the first device to update a power ratio associated with energy harvesting at the first device. The communications manager 1620 may be configured as or otherwise support a means for receiving, from the second device, a signal having a radio frequency power that is based on the capability of the first device to update the power ratio associated with the energy harvesting. The communications manager 1620 may be configured as or otherwise support a means for converting a portion of the radio frequency power according to an updated power ratio of the energy harvesting to DC power.

Additionally or alternatively, the communications manager 1620 may support wireless communication at a first device in accordance with examples as disclosed herein. For example, the communications manager 1620 may be configured as or otherwise support a means for receiving, from a second device, a capability of the second device to update a power ratio associated with energy harvesting at the second device by converting radio frequency power to DC power. The communications manager 1620 may be configured as or otherwise support a means for transmitting, to the second device, a signal having a radio frequency power that is based on the capability of the second device to update the power ratio associated with the energy harvesting.

By including or configuring the communications manager 1620 in accordance with examples as described herein, the device 1605 may support techniques for more efficient use of radio frequency energy at devices configured to perform energy harvesting.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of channel reporting for energy harvesting at a device as described herein, or the processor 1640 and the memory 1630 may be otherwise configured to perform or support such operations.

Figure 17:
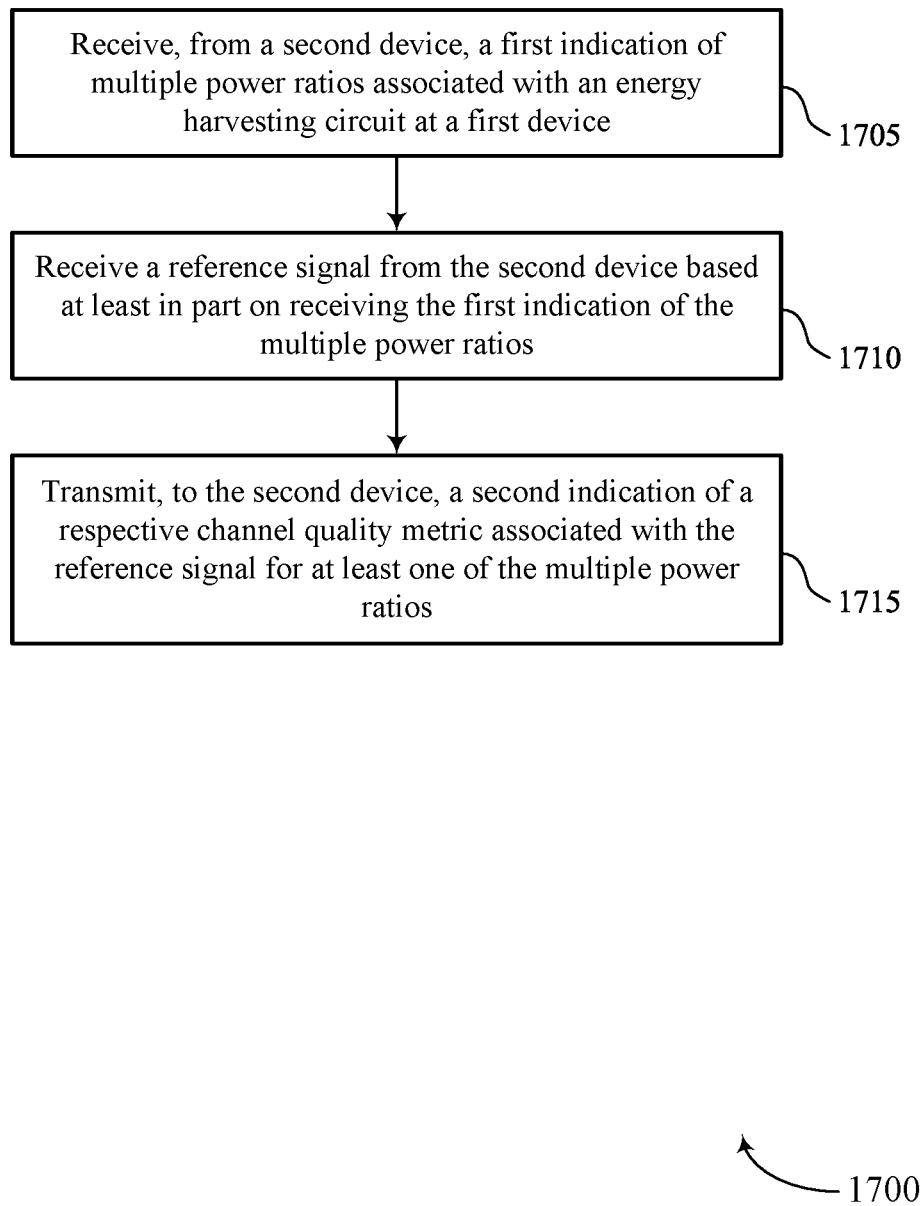
FIGS. 17 through 25 show flowcharts illustrating methods that support channel reporting for energy harvesting at a device in accordance with one or more aspects of the present disclosure.

FIG. 17 shows a flowchart illustrating a method 1700 that supports channel reporting for energy harvesting at a device in accordance with one or more aspects of the present disclosure. The operations of the method 1700 may be implemented by a device or its components as described herein. For example, the operations of the method 1700 may be performed by a device as described with reference to FIGS. 1 through 16. In some examples, a device may execute a set of instructions to control the functional elements of the device to perform the described functions. Additionally or alternatively, the device may perform aspects of the described functions using special-purpose hardware.

At 1705, the method may include receiving, from a second device, a first indication of multiple power ratios associated with energy harvesting at the first device. The operations of 1705 may be performed in accordance with examples as disclosed herein. In some examples, aspects of the operations of 1705 may be performed by a power ratio indication receiver 1525 as described with reference to FIG. 15.

At 1710, the method may include receiving a reference signal from the second device based on receiving the first indication of the multiple power ratios. The operations of 1710 may be performed in accordance with examples as disclosed herein. In some examples, aspects of the operations of 1710 may be performed by a signal reception manager 1530 as described with reference to FIG. 15.

At 1715, the method may include transmitting, to the second device, a second indication of a channel quality metric associated with the reference signal for at least one of the multiple power ratios. The operations of 1715 may be performed in accordance with examples as disclosed herein. In some examples, aspects of the operations of 1715 may be performed by a channel quality metric transmitter 1535 as described with reference to FIG. 15.

Figure 18:
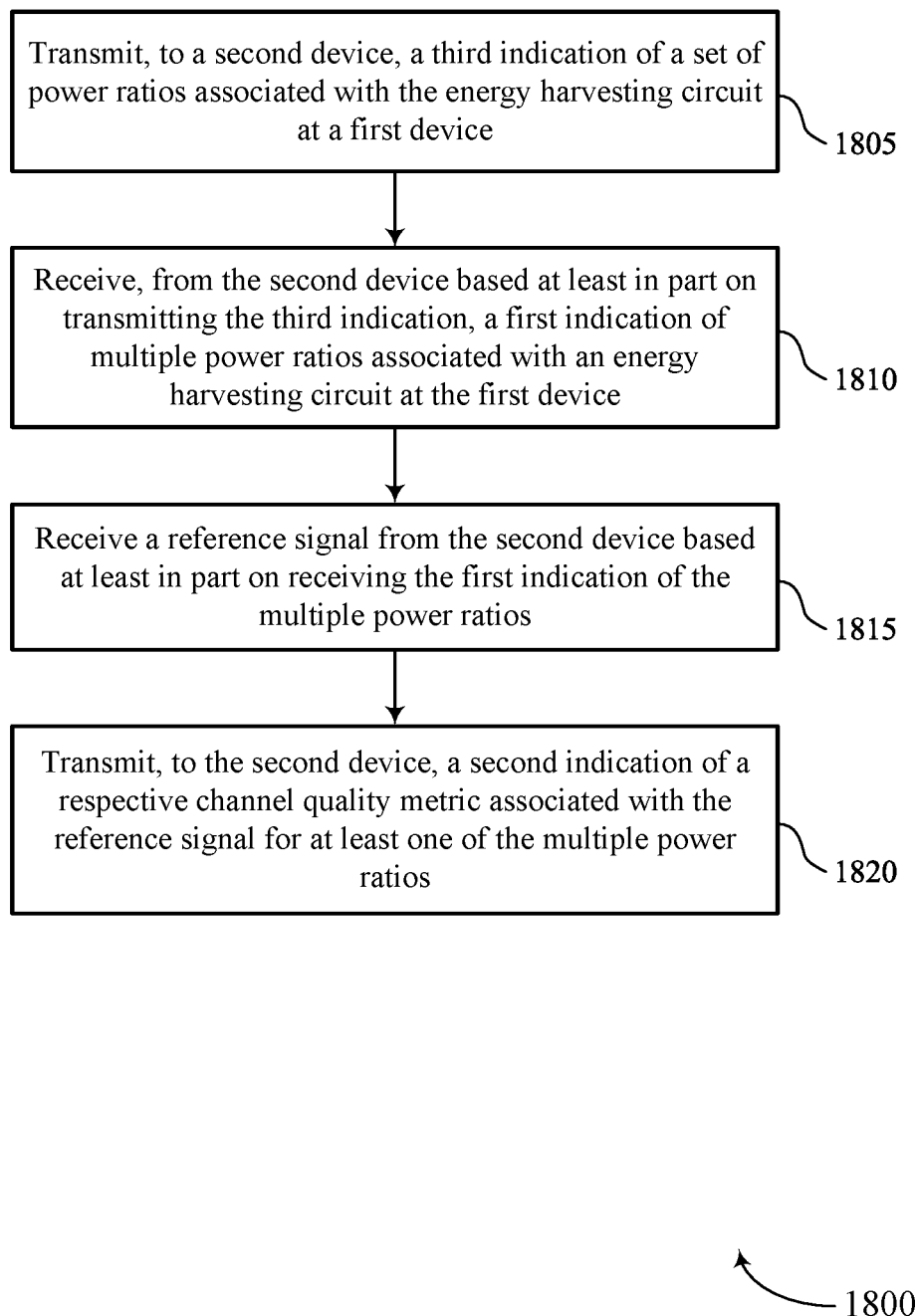

FIG. 18 shows a flowchart illustrating a method 1800 that supports channel reporting for energy harvesting at a device in accordance with one or more aspects of the present disclosure. The operations of the method 1800 may be implemented by a device or its components as described herein. For example, the operations of the method 1800 may be performed by a device as described with reference to FIGS. 1 through 16. In some examples, a device may execute a set of instructions to control the functional elements of the device to perform the described functions. Additionally or alternatively, the device may perform aspects of the described functions using special-purpose hardware.

At 1805, the method may include transmitting, by a first device to a second device, a third indication of a set of power ratios associated with an energy harvesting circuit at the first device. The operations of 1805 may be performed in accordance with examples as disclosed herein. In some examples, aspects of the operations of 1805 may be performed by a power ratio indication receiver 1525 as described with reference to FIG. 15.

At 1810, the method may include receiving, from the second device, a first indication of multiple power ratios associated with the energy harvesting circuit at the first device based on transmitting the third indication. The operations of 1810 may be performed in accordance with examples as disclosed herein. In some examples, aspects of the operations of 1810 may be performed by a power ratio indication receiver 1525 as described with reference to FIG. 15.

At 1815, the method may include receiving a reference signal from the second device based on receiving the first indication of the multiple power ratios. The operations of 1815 may be performed in accordance with examples as disclosed herein. In some examples, aspects of the operations of 1815 may be performed by a signal reception manager 1530 as described with reference to FIG. 15.

At 1820, the method may include transmitting, to the second device, a second indication of a channel quality metric associated with the reference signal for at least one of the multiple power ratios. The operations of 1820 may be performed in accordance with examples as disclosed herein. In some examples, aspects of the operations of 1820 may be performed by a channel quality metric transmitter 1535 as described with reference to FIG. 15.

Figure 19:
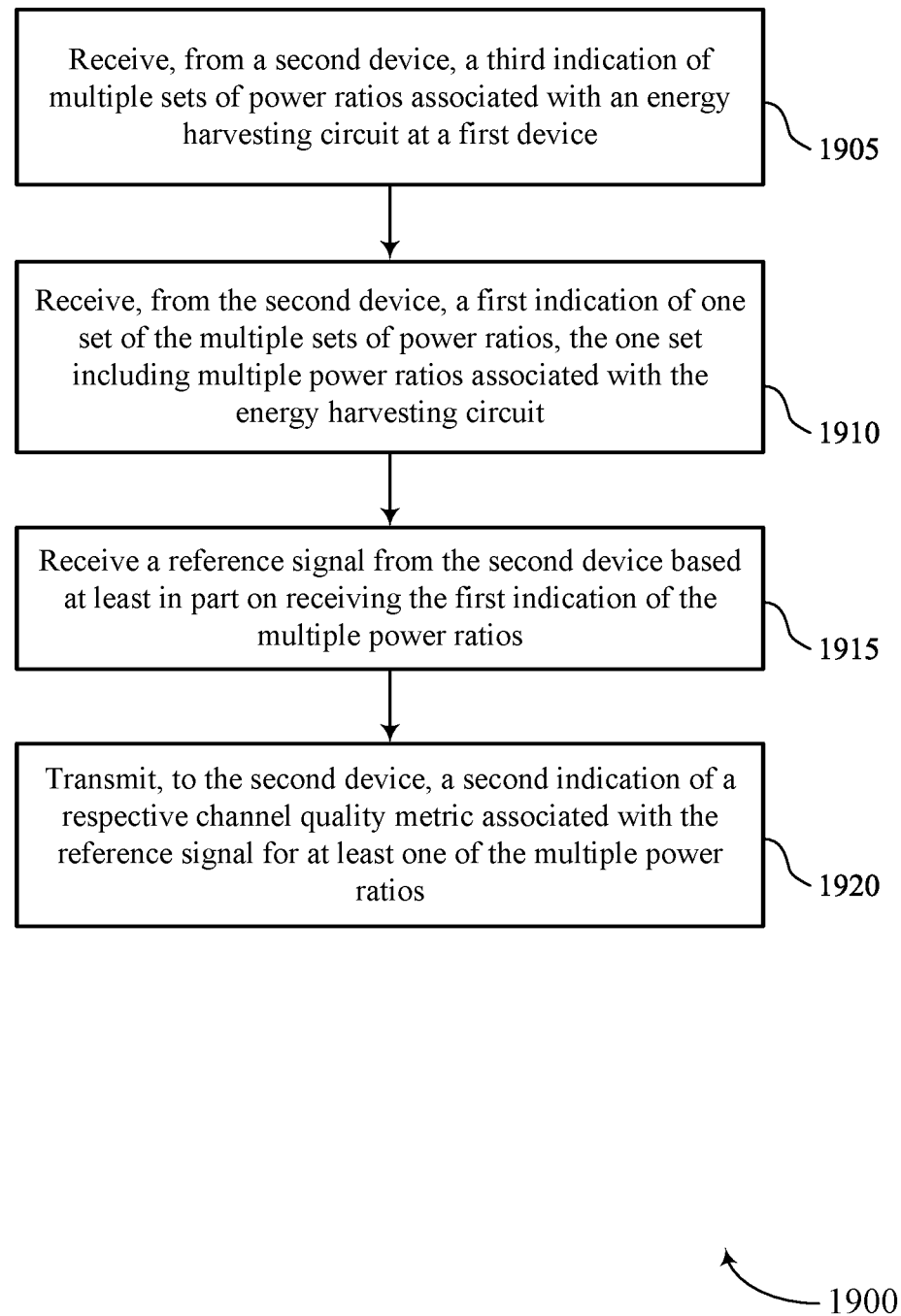

FIG. 19 shows a flowchart illustrating a method 1900 that supports channel reporting for energy harvesting at a device in accordance with one or more aspects of the present disclosure. The operations of the method 1900 may be implemented by a device or its components as described herein. For example, the operations of the method 1900 may be performed by a device as described with reference to FIGS. 1 through 16. In some examples, a device may execute a set of instructions to control the functional elements of the device to perform the described functions. Additionally or alternatively, the device may perform aspects of the described functions using special-purpose hardware.

At 1905, the method may include a first device receiving, from a second device, a third indication of multiple sets of power ratios associated with an energy harvesting circuit at the first device. The operations of 1905 may be performed in accordance with examples as disclosed herein. In some examples, aspects of the operations of 1905 may be performed by a power ratio indication receiver 1525 as described with reference to FIG. 15.

At 1910, the method may include receiving, from the second device, a first indication of one set of the multiple sets of power ratios, the one set including multiple power ratios associated with an energy harvesting circuit at the first device. The operations of 1910 may be performed in accordance with examples as disclosed herein. In some examples, aspects of the operations of 1910 may be performed by a power ratio indication receiver 1525 as described with reference to FIG. 15.

At 1915, the method may include receiving a reference signal from the second device based on receiving the first indication of the multiple power ratios. The operations of 1915 may be performed in accordance with examples as disclosed herein. In some examples, aspects of the operations of 1915 may be performed by a signal reception manager 1530 as described with reference to FIG. 15.

At 1920, the method may include transmitting, to the second device, a second indication of a channel quality metric associated with the reference signal for at least one of the multiple power ratios. The operations of 1920 may be performed in accordance with examples as disclosed herein. In some examples, aspects of the operations of 1920 may be performed by a channel quality metric transmitter 1535 as described with reference to FIG. 15.

Figure 20:
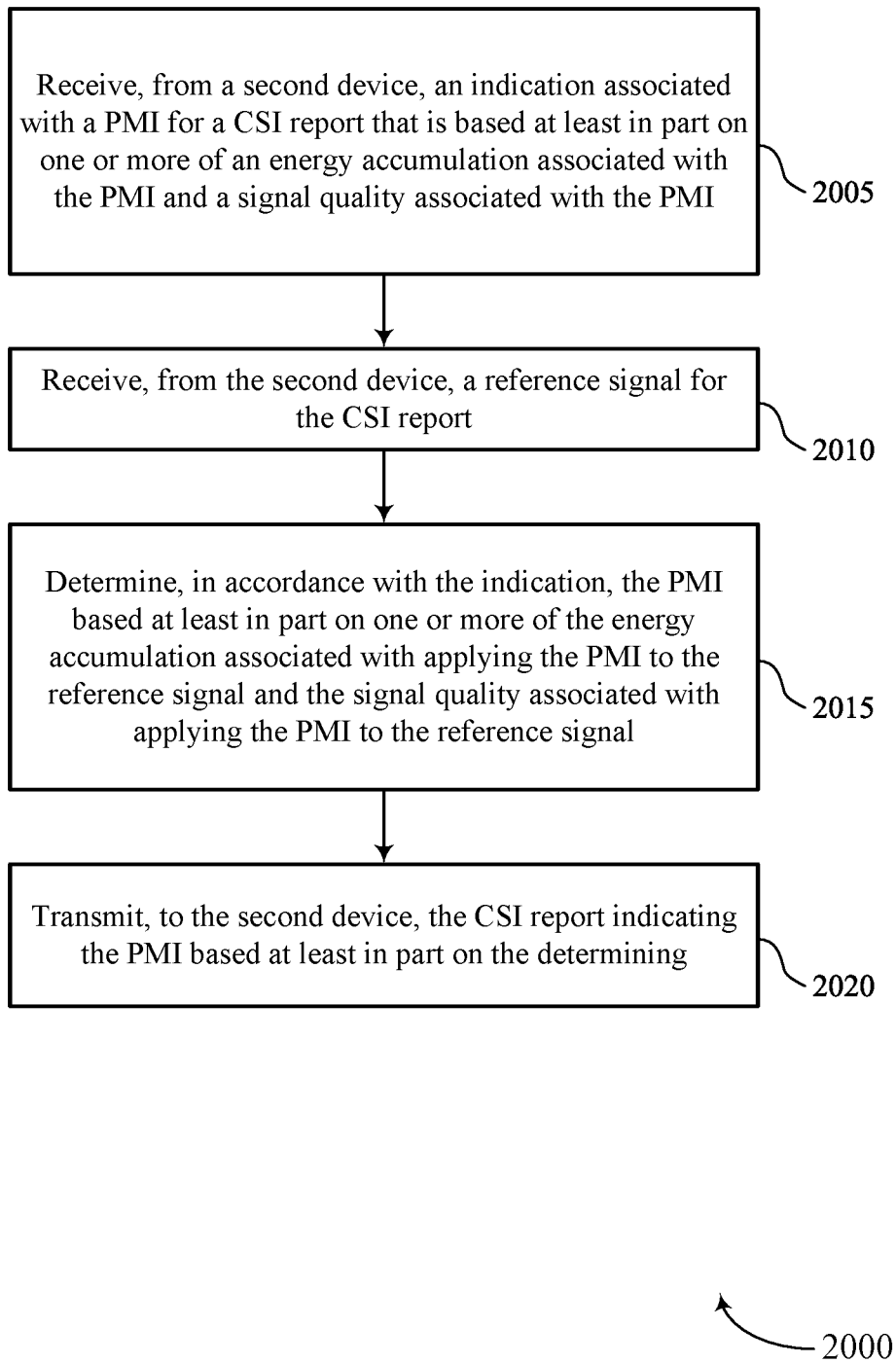

FIG. 20 shows a flowchart illustrating a method 2000 that supports channel reporting for energy harvesting at a device in accordance with one or more aspects of the present disclosure. The operations of the method 2000 may be implemented by a device or its components as described herein. For example, the operations of the method 2000 may be performed by a device as described with reference to FIGS. 1 through 16. In some examples, a device may execute a set of instructions to control the functional elements of the device to perform the described functions. Additionally or alternatively, the device may perform aspects of the described functions using special-purpose hardware.

At 2005, the method may include receiving, from a second device, an indication associated with a PMI for a CSI report that is based on one or more of an energy accumulation associated with the PMI or a signal quality associated with the PMI. The operations of 2005 may be performed in accordance with examples as disclosed herein. In some examples, aspects of the operations of 2005 may be performed by a PMI indication receiver 1540 as described with reference to FIG. 15.

At 2010, the method may include receiving, from the second device, a reference signal for the CSI report. The operations of 2010 may be performed in accordance with examples as disclosed herein. In some examples, aspects of the operations of 2010 may be performed by a signal reception manager 1530 as described with reference to FIG. 15.

At 2015, the method may include determining, in accordance with the indication, the PMI based on one or more of the energy accumulation associated with applying the PMI to the reference signal and the signal quality associated with applying the PMI to the reference signal. The operations of 2015 may be performed in accordance with examples as disclosed herein. In some examples, aspects of the operations of 2015 may be performed by a PMI determination manager 1545 as described with reference to FIG. 15.

At 2020, the method may include transmitting, to the second device, the CSI report indicating the PMI based on the determining. The operations of 2020 may be performed in accordance with examples as disclosed herein. In some examples, aspects of the operations of 2020 may be performed by a CSI report transmitter 1550 as described with reference to FIG. 15.

Figure 21:
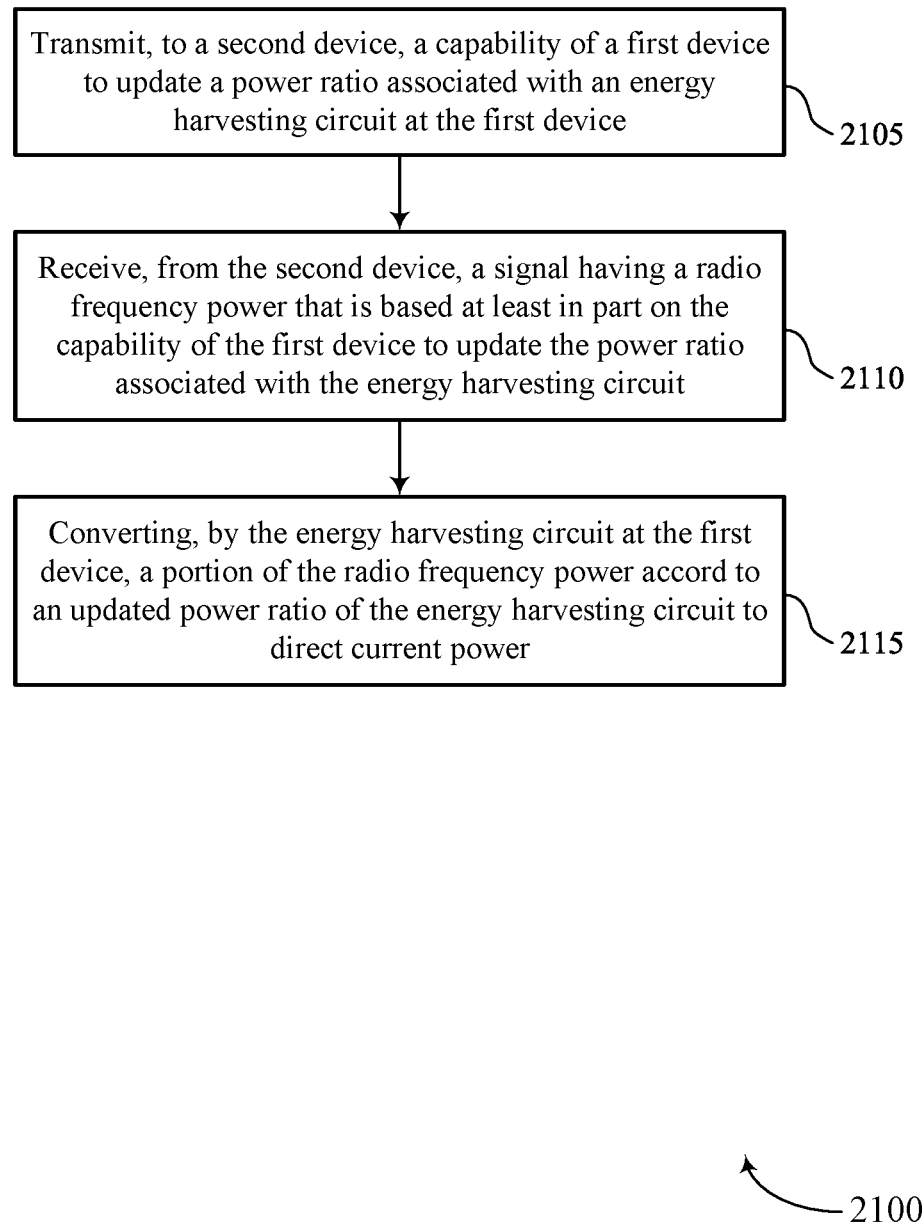

FIG. 21 shows a flowchart illustrating a method 2100 that supports channel reporting for energy harvesting at a device in accordance with one or more aspects of the present disclosure. The operations of the method 2100 may be implemented by a device or its components as described herein. For example, the operations of the method 2100 may be performed by a device as described with reference to FIGS. 1 through 16. In some examples, a device may execute a set of instructions to control the functional elements of the device to perform the described functions. Additionally or alternatively, the device may perform aspects of the described functions using special-purpose hardware.

At 2105, the method may include transmitting, to a second device, a capability of the first device to update a power ratio associated with energy harvesting at the first device. The operations of 2105 may be performed in accordance with examples as disclosed herein. In some examples, aspects of the operations of 2105 may be performed by a capability transmitter 1555 as described with reference to FIG. 15.

At 2110, the method may include receiving, from the second device, a signal having a radio frequency power that is based on the capability of the first device to update the power ratio associated with the energy harvesting. The operations of 2110 may be performed in accordance with examples as disclosed herein. In some examples, aspects of the operations of 2110 may be performed by a signal reception manager 1530 as described with reference to FIG. 15.

At 2115, the method may include converting a portion of the radio frequency power according to an updated power ratio of the energy harvesting to DC power. The operations of 2115 may be performed in accordance with examples as disclosed herein. In some examples, aspects of the operations of 2115 may be performed by a conversion manager 1560 as described with reference to FIG. 15.

Figure 22:
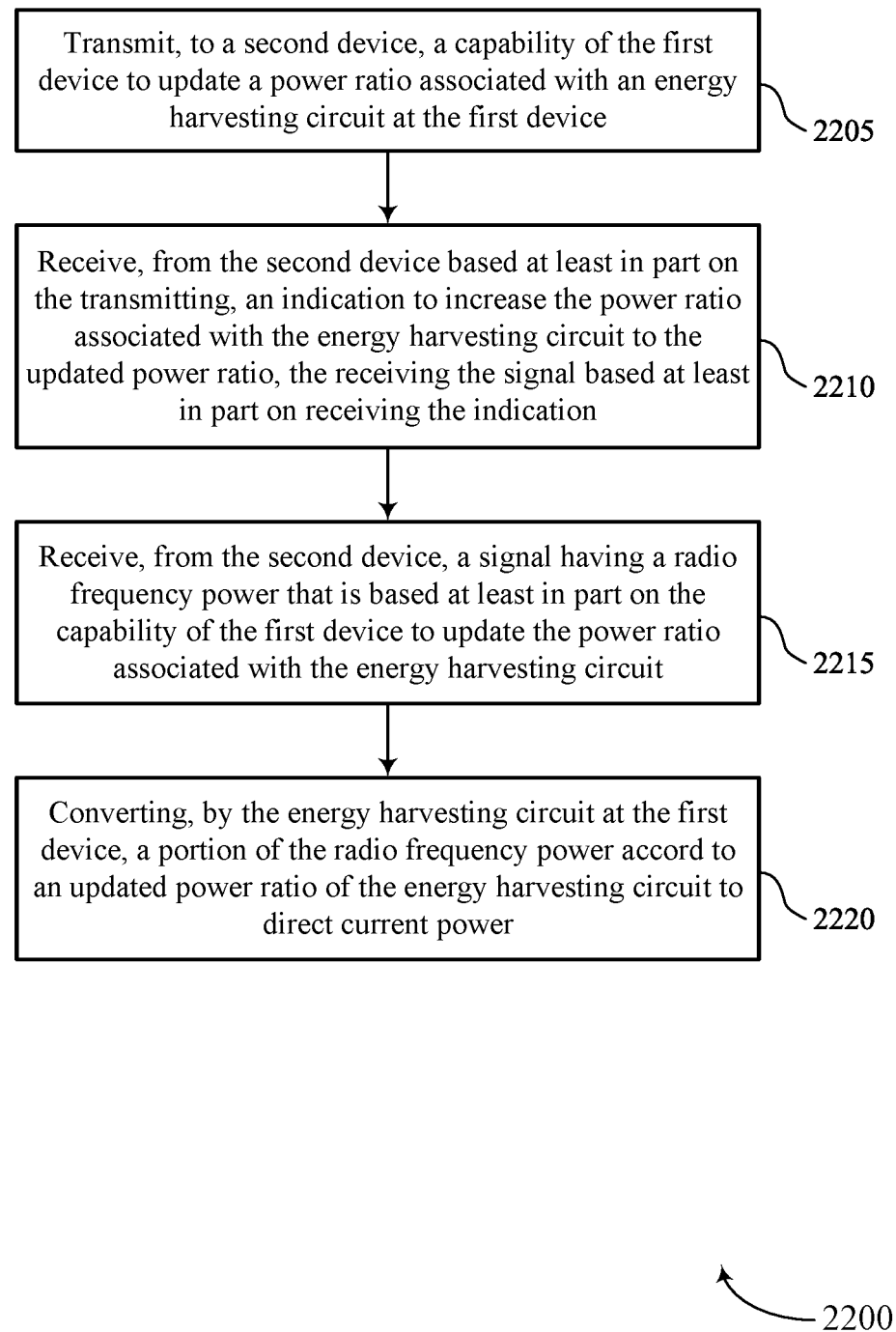

FIG. 22 shows a flowchart illustrating a method 2200 that supports channel reporting for energy harvesting at a device in accordance with one or more aspects of the present disclosure. The operations of the method 2200 may be implemented by a device or its components as described herein. For example, the operations of the method 2200 may be performed by a device as described with reference to FIGS. 1 through 16. In some examples, a device may execute a set of instructions to control the functional elements of the device to perform the described functions.

Additionally or alternatively, the device may perform aspects of the described functions using special-purpose hardware.

At 2205, the method may include transmitting, to a second device, a capability of the first device to update a power ratio associated with energy harvesting at the first device. The operations of 2205 may be performed in accordance with examples as disclosed herein. In some examples, aspects of the operations of 2205 may be performed by a capability transmitter 1555 as described with reference to FIG. 15.

At 2210, the method may include receiving, from the second device based on the transmitting, an indication to increase the power ratio associated with the energy harvesting to the updated power ratio, the receiving the signal based on receiving the indication. The operations of 2210 may be performed in accordance with examples as disclosed herein. In some examples, aspects of the operations of 2210 may be performed by a power ratio update manager 1575 as described with reference to FIG. 15.

At 2215, the method may include receiving, from the second device, a signal having a radio frequency power that is based on the capability of the first device to update the power ratio associated with the energy harvesting. The operations of 2215 may be performed in accordance with examples as disclosed herein. In some examples, aspects of the operations of 2215 may be performed by a signal reception manager 1530 as described with reference to FIG. 15.

At 2220, the method may include converting a portion of the radio frequency power according to an updated power ratio of the energy harvesting to DC power. The operations of 2220 may be performed in accordance with examples as disclosed herein. In some examples, aspects of the operations of 2220 may be performed by a conversion manager 1560 as described with reference to FIG. 15.

Figure 23:
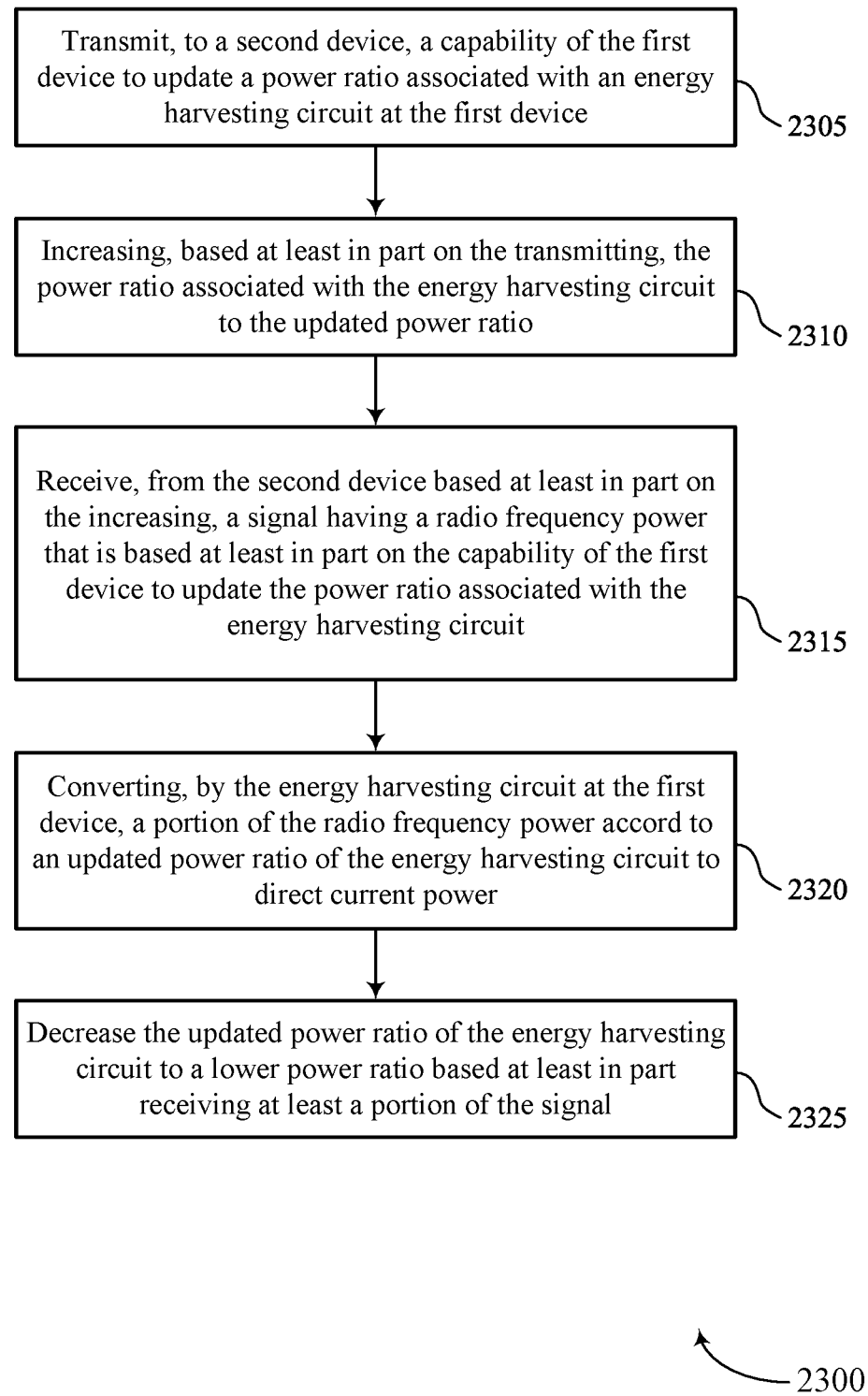

FIG. 23 shows a flowchart illustrating a method 2300 that supports channel reporting for energy harvesting at a device in accordance with one or more aspects of the present disclosure. The operations of the method 2300 may be implemented by a device or its components as described herein. For example, the operations of the method 2300 may be performed by a device as described with reference to FIGS. 1 through 16. In some examples, a device may execute a set of instructions to control the functional elements of the device to perform the described functions. Additionally or alternatively, the device may perform aspects of the described functions using special-purpose hardware.

At 2305, the method may include transmitting, to a second device, a capability of the first device to update a power ratio associated with energy harvesting at the first device. The operations of 2305 may be performed in accordance with examples as disclosed herein. In some examples, aspects of the operations of 2305 may be performed by a capability transmitter 1555 as described with reference to FIG. 15.

At 2310, the method may include increasing, based on the transmitting, the power ratio associated with the energy harvesting to the updated power ratio. The operations of 2310 may be performed in accordance with examples as disclosed herein. In some examples, aspects of the operations of 2310 may be performed by a power ratio update manager 1575 as described with reference to FIG. 15.

At 2315, the method may include receiving, from the second device based on the increasing, a signal having a radio frequency power that is based on the capability of the first device to update the power ratio associated with the energy harvesting. The operations of 2315 may be performed in accordance with examples as disclosed herein. In some examples, aspects of the operations of 2315 may be performed by a signal reception manager 1530 as described with reference to FIG. 15.

At 2320, the method may include converting a portion of the radio frequency power according to an updated power ratio of the energy harvesting to DC power. The operations of 2320 may be performed in accordance with examples as disclosed herein. In some examples, aspects of the operations of 2320 may be performed by a conversion manager 1560 as described with reference to FIG. 15.

At 2325, the method may include decreasing the updated power ratio of the energy harvesting to a decreased power ratio based at least in part receiving at least a portion of the signal. The operations of 2325 may be performed in accordance with examples as disclosed herein. In some examples, aspects of the operations of 2325 may be performed by a power ratio update manager 1575 as described with reference to FIG. 15.

Figure 24:
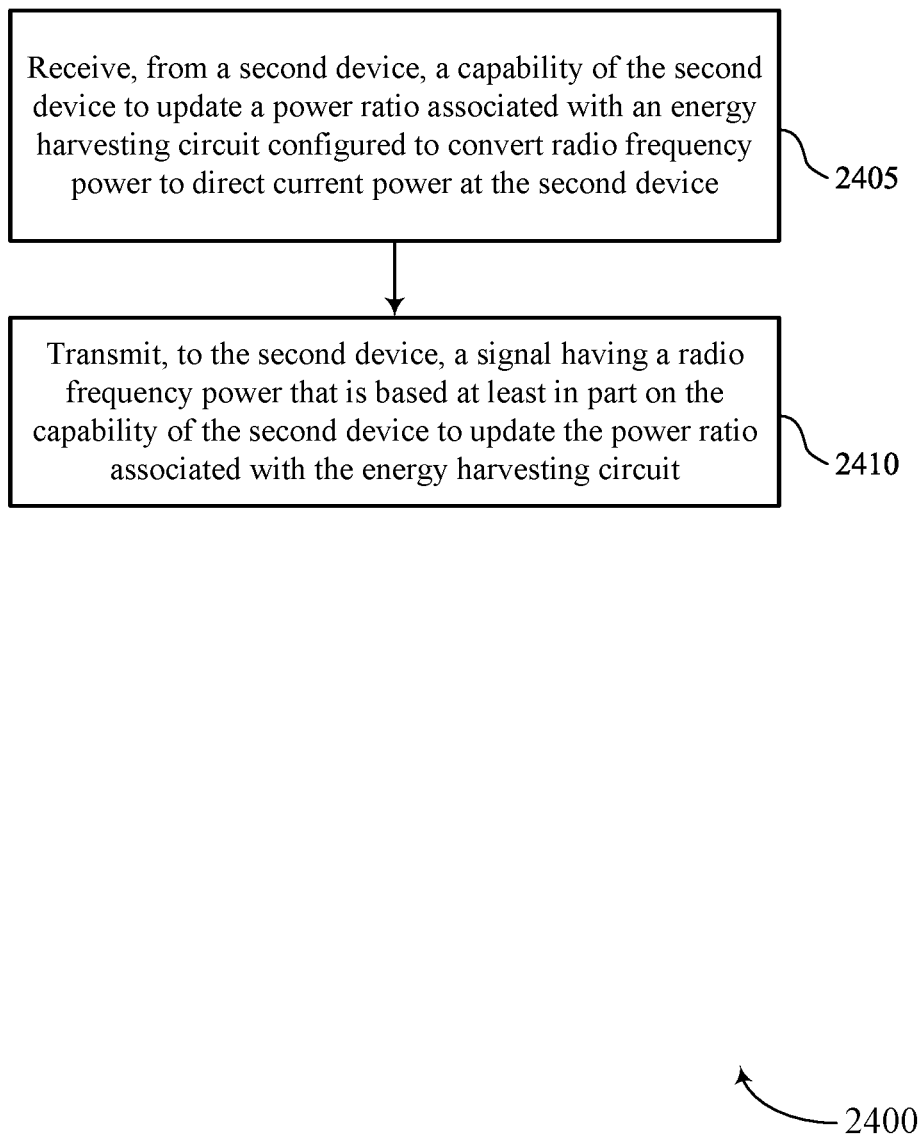

FIG. 24 shows a flowchart illustrating a method 2400 that supports channel reporting for energy harvesting at a device in accordance with one or more aspects of the present disclosure. The operations of the method 2400 may be implemented by a device or its components as described herein. For example, the operations of the method 2400 may be performed by a device as described with reference to FIGS. 1 through 16. In some examples, a device may execute a set of instructions to control the functional elements of the device to perform the described functions. Additionally or alternatively, the device may perform aspects of the described functions using special-purpose hardware.

At 2405, the method may include receiving, from a second device, a capability of the second device to update a power ratio associated with energy harvesting at the second device by converting radio frequency power to DC power. The operations of 2405 may be performed in accordance with examples as disclosed herein. In some examples, aspects of the operations of 2405 may be performed by a capability receiver 1565 as described with reference to FIG. 15.

At 2410, the method may include transmitting, to the second device, a signal having a radio frequency power that is based on the capability of the second device to update the power ratio associated with the energy harvesting. The operations of 2410 may be performed in accordance with examples as disclosed herein. In some examples, aspects of the operations of 2410 may be performed by a signal transmission manager 1570 as described with reference to FIG. 15.

Figure 25:
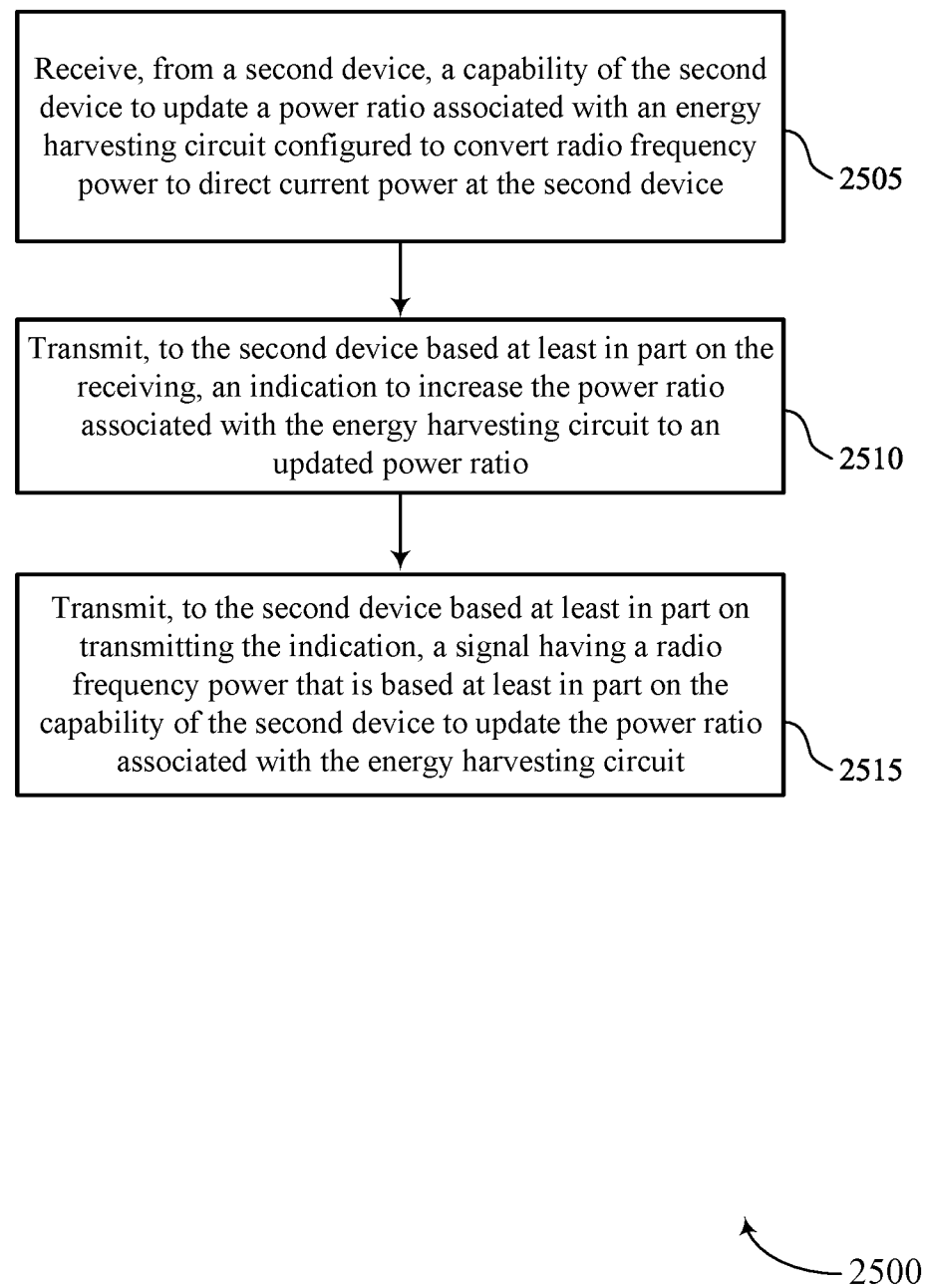

FIG. 25 shows a flowchart illustrating a method 2500 that supports channel reporting for energy harvesting at a device in accordance with one or more aspects of the present disclosure. The operations of the method 2500 may be implemented by a device or its components as described herein. For example, the operations of the method 2500 may be performed by a device as described with reference to FIGS. 1 through 16. In some examples, a device may execute a set of instructions to control the functional elements of the device to perform the described functions. Additionally or alternatively, the device may perform aspects of the described functions using special-purpose hardware.

At 2505, the method may include receiving, from a second device, a capability of the second device to update a power ratio associated with energy harvesting at the second device by converting radio frequency power to DC power. The operations of 2505 may be performed in accordance with examples as disclosed herein. In some examples, aspects of the operations of 2505 may be performed by a capability receiver 1565 as described with reference to FIG. 15.

At 2510, the method may include transmitting, to the second device based on the receiving, an indication to increase the power ratio associated with the energy harvesting to an updated power ratio. The operations of 2510 may be performed in accordance with examples as disclosed herein. In some examples, aspects of the operations of 2510 may be performed by a power ratio update transmitter 1580 as described with reference to FIG. 15.

At 2515, the method may include transmitting, to the second device based on transmitting the indication, a signal having a radio frequency power that is based on the capability of the second device to update the power ratio associated with the energy harvesting. The operations of 2515 may be performed in accordance with examples as disclosed herein. In some examples, aspects of the operations of 2515 may be performed by a signal transmission manager 1570 as described with reference to FIG. 15.

The following provides an overview of aspects of the present disclosure:

Aspect 1: A method for wireless communication at a first device, comprising: receiving, from a second device, a first indication of multiple power ratios associated with energy harvesting at the first device; receiving a reference signal from the second device based at least in part on receiving the first indication of the multiple power ratios; and transmitting, to the second device, a second indication of a channel quality metric associated with the reference signal for at least one of the multiple power ratios.

Aspect 2: The method of aspect 1, further comprising: transmitting, to the second device, a third indication of a set of power ratios associated with the energy harvesting, the receiving the first indication of the multiple power ratios based at least in part on transmitting the third indication.

Aspect 3: The method of any of aspects 1 through 2, further comprising: receiving, from the second device, a third indication of multiple sets of power ratios associated with the energy harvesting, the receiving the first indication of the multiple power ratios comprising: receiving the first indication of one set of the multiple sets of power ratios, the one set comprising the multiple power ratios.

Aspect 4: The method of aspect 3, the receiving the third indication of the multiple sets of power ratios comprising: receiving the third indication via a MAC-CE, RRC signaling, or a combination thereof.

Aspect 5: The method of any of aspects 1 through 4, the receiving the first indication of the multiple power ratios comprising: receiving the first indication via a RRC signaling, a MAC-CE, control information, or a combination thereof.

Aspect 6: The method of any of aspects 1 through 5, the receiving the first indication of the multiple power ratios comprising: receiving the first indication of resources corresponding to the reference signal, the multiple power ratios associated with the resources corresponding to the reference signal.

Aspect 7: The method of any of aspects 1 through 6, the transmitting the second indication comprising: transmitting, for each of the multiple power ratios, a first resource indicator associated with first resources of the reference signal having a first channel quality metric that is higher than channel quality metrics associated with remaining resources of the reference signal, a second resource indicator associated with second resources of the reference signal associated with an energy accumulation that is greater than energy accumulation associated with remaining resources of the reference signal, or a combination thereof, wherein the first channel quality metric or the second channel quality metric is the channel quality metric.

Aspect 8: The method of any of aspects 1 through 7, the transmitting the second indication comprising: transmitting the second indication based at least in part on the channel quality metric for the at least one of the multiple power ratios being higher than channel quality metrics for the remaining of the multiple power ratios.

Aspect 9: The method of any of aspects 1 through 8, wherein the at least one of the multiple power ratios comprises a first power ratio; and the first power ratio is associated with the channel quality metric that is higher than channel quality metrics associated with remaining power ratios of the multiple power ratios associated with one or more remaining of the multiple power ratios, an energy harvesting that is greater than the remaining power ratios, or a combination thereof.

Aspect 10: The method of any of aspects 1 through 9, wherein each of the multiple power ratios indicates a first portion of a radio frequency power associated with received signals directed to an energy harvesting circuit, a second portion of the radio frequency power associated with the received signals directed to a signal decoding circuit of the first device, or both.

Aspect 11: A method for wireless communication at a first device, comprising: receiving, from a second device, an indication associated with a PMI for a CSI report that is based at least in part on one or more of an energy accumulation associated with the PMI or a signal quality associated with the PMI; receiving, from the second device, a reference signal for the CSI report; determining, in accordance with the indication, the PMI based at least in part on one or more of the energy accumulation associated with applying the PMI to the reference signal and the signal quality associated with applying the PMI to the reference signal; and transmitting, to the second device, the CSI report indicating the PMI based at least in part on the determining.

Aspect 12: The method of aspect 11, the receiving the indication comprising: receiving a MAC-CE or RRC signaling indicating that the PMI for the CSI report is based at least in part on the energy accumulation associated with the PMI, the signal quality associated with the PMI, or both.

Aspect 13: The method of any of aspects 11 through 12, the receiving the indication comprising: receiving the indication of resources corresponding to the reference signal, the PMI for the CSI report being based at least in part on the energy accumulation associated with the PMI, the signal quality associated with the PMI, or both based at least in part on the resources corresponding to the reference signal.

Aspect 14: The method of any of aspects 11 through 13, wherein the indication associated with the PMI indicates that the PMI for the CSI report is based at least in part on the energy accumulation associated with the PMI; and determining the PMI comprises determining the PMI based at least in part on the energy accumulation associated with applying the PMI to the reference signal.

Aspect 15: The method of any of aspects 11 through 14, wherein the indication associated with the PMI indicates that the PMI for the CSI report is based at least in part on the signal quality associated with the PMI; and determining the PMI comprises determining the PMI based at least in part on the signal quality associated with applying the PMI to the reference signal.

Aspect 16: The method of any of aspects 11 through 15, the determining comprising: determining a first PMI based at least in part on the energy accumulation associated with applying the first PMI to the reference signal; and determining a second PMI based at least in part on the signal quality associated with applying the PMI to the reference signal, the CSI report indicating the first PMI, the second PMI, or both.

Aspect 17: A method for wireless communication at a first device, comprising: transmitting, to a second device, a capability of the first device to update a power ratio associated with energy harvesting at the first device; receiving, from the second device, a signal having a radio frequency power that is based at least in part on the capability of the first device to update the power ratio associated with the energy harvesting; and converting a portion of the radio frequency power according to an updated power ratio of the energy harvesting to DC power.

Aspect 18: The method of aspect 17, further comprising: receiving, from the second device based at least in part on the transmitting, an indication to increase the power ratio associated with the energy harvesting to the updated power ratio, the receiving the signal based at least in part on receiving the indication.

Aspect 19: The method of any of aspects 17 through 18, further comprising: increasing, based at least in part on the transmitting, the power ratio associated with the energy harvesting to the updated power ratio, the receiving the signal having the radio frequency power based at least in part on the increasing; and decreasing the updated power ratio of the energy harvesting to a decreased power ratio based at least in part receiving at least a portion of the signal.

Aspect 20: The method of aspect 19, the receiving the signal comprising: receiving a first portion of the signal via first resources associated with a cyclic prefix while the energy harvesting is associated with the updated power ratio; and receiving a second portion of the signal via second resources associated with data while the energy harvesting is associated with the decreased power ratio.

Aspect 21: The method of any of aspects 19 through 20, the receiving the signal comprising: receiving a first portion of the signal corresponding to a synchronization signal while the energy harvesting is associated with the updated power ratio; and receiving a second portion of the signal corresponding to a control channel while the energy harvesting is associated with the decreased power ratio.

Aspect 22: The method of any of aspects 17 through 21, wherein the capability of the first device to update the power ratio comprises a first indication of a time associated with updating the power ratio associated with the energy harvesting, a second indication of a set of possible power ratios associated with the energy harvesting, or a combination thereof.

Aspect 23: The method of any of aspects 17 through 22, wherein the signal comprises a synchronization signal, a TRS, a CSI-RS, a DMRS, or a combination thereof.

Aspect 24: The method of any of aspects 17 through 23, wherein the updated power ratio indicates the portion of the radio frequency power directed to an energy harvesting circuit, a second portion of the radio frequency power directed to a signal decoding circuit of the first device, or both.

Aspect 25: A method for wireless communication at a first device, comprising: receiving, from a second device, a capability of the second device to update a power ratio associated with energy harvesting at the second device by converting radio frequency power to DC power; and transmitting, to the second device, a signal having a radio frequency power that is based at least in part on the capability of the second device to update the power ratio associated with the energy harvesting.

Aspect 26: The method of aspect 25, further comprising: transmitting, to the second device based at least in part on the receiving, an indication to increase the power ratio associated with the energy harvesting to an updated power ratio, the transmitting the signal based at least in part on transmitting the indication.

Aspect 27: The method of aspect 26, wherein transmitting the indication comprises transmitting the indication via RRC signaling, a MAC-CE, control information, or a combination thereof.

Aspect 28: The method of any of aspects 25 through 27, wherein the capability of the second device to update the power ratio comprises a first indication of a time associated with updating the power ratio associated with the energy harvesting, a second indication of a set of possible power ratios associated with the energy harvesting, or a combination thereof.

Aspect 29: The method of any of aspects 25 through 28, the transmitting comprising: transmitting the signal via a set of synchronization beams, wherein a first transmission power of one or more synchronization beams from the set that are associated with transmissions to the second device is greater than a second transmission power of one or more remaining synchronization beams from the set.

Aspect 30: The method of any of aspects 25 through 29, wherein the signal comprises a synchronization signal, a TRS, a CSI-RS, a DMRS, or a combination thereof.

Aspect 31: An apparatus for wireless communication at a first device, comprising a processor; memory coupled to the processor, the processor and memory configured to perform a method of any of aspects 1 through 10.

Aspect 32: An apparatus for wireless communication at a first device, comprising at least one means for performing a method of any of aspects 1 through 10.

Aspect 33: A non-transitory computer-readable medium storing code for wireless communication at a first device, the code comprising instructions executable by a processor to perform a method of any of aspects 1 through 10.

Aspect 34: An apparatus for wireless communication at a first device, comprising a processor; memory coupled to the processor, the processor and memory configured to perform a method of any of aspects 11 through 16.

Aspect 35: An apparatus for wireless communication at a first device, comprising at least one means for performing a method of any of aspects 11 through 16.

Aspect 36: A non-transitory computer-readable medium storing code for wireless communication at a first device, the code comprising instructions executable by a processor to perform a method of any of aspects 11 through 16.

Aspect 37: An apparatus for wireless communication at a first device, comprising a processor; memory coupled to the processor, the processor and memory configured to perform a method of any of aspects 17 through 24.

Aspect 38: An apparatus for wireless communication at a first device, comprising at least one means for performing a method of any of aspects 17 through 24.

Aspect 39: A non-transitory computer-readable medium storing code for wireless communication at a first device, the code comprising instructions executable by a processor to perform a method of any of aspects 17 through 24.

Aspect 40: An apparatus for wireless communication at a first device, comprising a processor; memory coupled to the processor, the processor and memory configured to perform a method of any of aspects 25 through 30.

Aspect 41: An apparatus for wireless communication at a first device, comprising at least one means for performing a method of any of aspects 25 through 30.

Aspect 42: A non-transitory computer-readable medium storing code for wireless communication at a first device, the code comprising instructions executable by a processor to perform a method of any of aspects 25 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first device, comprising:
   one or more memories; and
   one or more processors coupled with the one or more memories and configured to cause the first device to:
      receive information indicative of one or more power ratios associated with energy harvesting at the first device, each of the one or more power ratios indicative of a ratio of an energy harvesting portion of radio frequency power to a signal decoding portion of the radio frequency power at the first device;
      receive a reference signal based at least in part on the reception of the information indicative of the one or more power ratios; and
      transmit a first indication of at least one channel quality metric of one or more channel quality metrics associated with the reference signal for at least one of the one or more power ratios,
   wherein the one or more channel quality metrics are determined at the first device, each channel quality metric based at least in part on a respective power ratio of the one or more power ratios.

2. The apparatus of claim 1, wherein the one or more processors are further configured to cause the first device to:
   transmit, to a second device, a second indication of a set of power ratios associated with the energy harvesting, the reception of the information indicative of the one or more power ratios based at least in part on the transmission of the second indication.

3. The apparatus of claim 1, wherein the one or more processors are further configured to cause the first device to:
   receive, from a second device, a second indication of multiple sets of power ratios associated with the energy harvesting, the reception of the information indicative of the one or more power ratios comprising:
      receive the information indicative of one set of the multiple sets of power ratios, the one set of the multiple sets of power ratios comprising the one or more power ratios.

4. The apparatus of claim 3, wherein to receive the second indication, the one or more processors are configured to cause the first device to:
   receive the second indication via a media access control-control element, a radio resource control signal, or a combination thereof.

5. The apparatus of claim 1, wherein to receive the information, the one or more processors are configured to cause the first device to:
   receive the information via a radio resource control signal, a media access control-control element, control information, or a combination thereof.

6. The apparatus of claim 1, wherein to receive the information, the one or more processors are configured to cause the first device to:
   receive the information for resources corresponding to the reference signal, the one or more power ratios associated with the resources corresponding to the reference signal.

7. The apparatus of claim 1, wherein to transmit the first indication, the one or more processors are configured to cause the first device to:
   transmit, for each of the one or more power ratios, a first resource indicator associated with first resources of the reference signal having a first channel quality metric that is higher than channel quality metrics associated with remaining resources of the reference signal, a second resource indicator associated with second resources of the reference signal associated with a first energy accumulation that is greater than a second energy accumulation associated with remaining resources of the reference signal, or a combination thereof, wherein the first resource indicator or the second resource indicator is the at least one channel quality metric.

8. The apparatus of claim 1, wherein to transmit the first indication, the one or more processors are configured to cause the first device to:
   transmit the first indication based at least in part on the at least one channel quality metric for the at least one of the one or more power ratios being higher than channel quality metrics for the remaining of the one or more power ratios.

9. The apparatus of claim 1, wherein:
   the at least one of the one or more power ratios comprises a first power ratio; and
   the first power ratio is associated with the at least one channel quality metric that is higher than channel quality metrics associated with remaining power ratios of the one or more power ratios associated with one or more remaining of the one or more power ratios, a first energy harvesting amount that is greater than one or more second energy harvesting amounts associated with the remaining power ratios, or a combination thereof.

10. A method for wireless communication at a first device, comprising:
    receiving information indicative of one or more power ratios associated with energy harvesting at the first device, each of the one or more power ratios indicative of a ratio of an energy harvesting portion of radio frequency power to a signal decoding portion of the radio frequency power at the first device;
    receiving a reference signal based at least in part on receiving the information indicative of the one or more power ratios; and
    transmitting a first indication of at least one channel quality metric of one or more channel quality metrics associated with the reference signal for at least one of the one or more power ratios, wherein the one or more channel quality metrics are determined at the first device, each channel quality metric based at least in part on a respective power ratio of the one or more power ratios.

11. The method of claim 10, further comprising:
    transmitting, to a second device, a second indication of a set of power ratios associated with the energy harvesting, the receiving the information indicative of the one or more power ratios based at least in part on transmitting the second indication.

12. The method of claim 10, further comprising:
receiving, from a second device, a second indication of multiple sets of power ratios associated with the energy harvesting, the receiving the information indicative of the one or more power ratios comprising:
receiving the information indicative of one set of the multiple sets of power ratios, the one set of the multiple sets of power ratios comprising the one or more power ratios.

13. The method of claim 12, the receiving the second indication comprising:
receiving the second indication via a media access control-control element, a radio resource control signal, or a combination thereof.

14. The method of claim 10, the receiving the information comprising:
receiving the information via a radio resource control signal, a media access control-control element, control information, or a combination thereof.

15. The method of claim 10, the receiving the information comprising:
receiving the information for resources corresponding to the reference signal, the one or more power ratios associated with the resources corresponding to the reference signal.

16. The method of claim 10, the transmitting the first indication comprising:
transmitting, for each of the one or more power ratios, a first resource indicator associated with first resources of the reference signal having a first channel quality metric that is higher than channel quality metrics associated with remaining resources of the reference signal, a second resource indicator associated with second resources of the reference signal associated with a first energy accumulation that is greater than a second energy accumulation associated with remaining resources of the reference signal, or a combination thereof, wherein the first resource indicator or the second resource indicator is the at least one channel quality metric.

17. The method of claim 10, the transmitting the first indication comprising:
transmitting the first indication based at least in part on the at least one channel quality metric for the at least one of the one or more power ratios being higher than channel quality metrics for the remaining of the one or more power ratios.

18. The method of claim 10, wherein:
the at least one of the one or more power ratios comprises a first power ratio; and
the first power ratio is associated with the at least one channel quality metric that is higher than channel quality metrics associated with remaining power ratios of the one or more power ratios associated with one or more remaining of the one or more power ratios, a first energy harvesting amount that is greater than one or more second energy harvesting amounts associated with the remaining power ratios, or a combination thereof.

19. A non-transitory computer-readable medium storing code for wireless communication at a first device, the code comprising instructions executable by one or more processors to:
receive information indicative of one or more power ratios associated with energy harvesting at the first device, each of the one or more power ratios indicative of a ratio of an energy harvesting portion of radio frequency power to a signal decoding portion of the radio frequency power at the first device;
receive a reference signal based at least in part on receiving the information indicative of the one or more power ratios; and
transmit a first indication of at least one channel quality metric of one or more channel quality metrics associated with the reference signal for at least one of the one or more power ratios, wherein the one or more channel quality metrics are determined at the first device, each channel quality metric based at least in part on a respective power ratio of the one or more power ratios.

20. The non-transitory computer-readable medium of claim 19, wherein the instructions are further executable by the one or more processors to:
transmit, to a second device, a second indication of a set of power ratios associated with the energy harvesting, the reception of the information indicative of the one or more power ratios based at least in part on the transmission of the second indication.

21. The non-transitory computer-readable medium of claim 19, wherein the instructions are further executable by the one or more processors to:
receive, from a second device, a second indication of multiple sets of power ratios associated with the energy harvesting, the reception of the information indicative of the one or more power ratios comprising:
receive the information indicative of one set of the multiple sets of power ratios, the one set of the multiple sets of power ratios comprising the one or more power ratios.

22. The non-transitory computer-readable medium of claim 21, wherein to receive the second indication, the instructions are further executable by the one or more processors to:
receive the second indication via a media access control-control element, a radio resource control signal, or a combination thereof.

23. The non-transitory computer-readable medium of claim 19, wherein to receive the information, the instructions are further executable by the one or more processors to:
receive the information via a radio resource control signal, a media access control-control element, control information, or a combination thereof.

24. The non-transitory computer-readable medium of claim 19, wherein to receive the information, the instructions are further executable by the one or more processors to:
receive the information for resources corresponding to the reference signal, the one or more power ratios associated with the resources corresponding to the reference signal.

25. The non-transitory computer-readable medium of claim 19, wherein to transmit the first indication, the instructions are further executable by the one or more processors to:
transmit, for each of the one or more power ratios, a first resource indicator associated with first resources of the reference signal having a first channel quality metric that is higher than channel quality metrics associated with remaining resources of the reference signal, a second resource indicator associated with second resources of the reference signal associated with a first energy accumulation that is greater than a second energy accumulation associated with remaining resources of the reference signal, or a combination thereof, wherein the first resource indicator or the second resource indicator is the at least one channel quality metric.

26. The non-transitory computer-readable medium of claim 19, wherein to transmit the first indication, the instructions are further executable by the one or more processors to:
transmit the first indication based at least in part on the at least one channel quality metric for the at least one of the one or more power ratios being higher than channel quality metrics for the remaining of the one or more multiple power ratios.

27. The non-transitory computer-readable medium of claim 19, wherein:
the at least one of the one or more power ratios comprises a first power ratio; and
the first power ratio is associated with the at least one channel quality metric that is higher than channel quality metrics associated with remaining power ratios of the one or more power ratios associated with one or more remaining of the one or more power ratios, a first energy harvesting amount that is greater than one or more second energy harvesting amounts associated with the remaining power ratios, or a combination thereof.

* * * * *